United States Patent
Ramli et al.

(10) Patent No.: US 8,409,697 B2
(45) Date of Patent: *Apr. 2, 2013

(54) MULTILAYER, HEAT-SHRINKABLE FILM COMPRISING A PLURALITY OF MICROLAYERS

(75) Inventors: Rafizi Ramli, Greer, SC (US); Larry Bikle McAllister, Spartanburg, SC (US); Anton L. Timmons, Mauldin, SC (US); Bradford E. Webster, Moore, SC (US); John R. Wolf, Greer, SC (US); Christopher Brown, Piedmont, SC (US); George D. Wofford, Duncan, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/536,171

(22) Filed: Jun. 28, 2012

(65) Prior Publication Data

US 2012/0270024 A1 Oct. 25, 2012

Related U.S. Application Data

(60) Continuation of application No. 13/290,432, filed on Nov. 7, 2011, now Pat. No. 8,241,736, which is a continuation of application No. 13/175,256, filed on Jul. 1, 2011, now Pat. No. 8,080,310, which is a division of application No. 12/381,135, filed on Mar. 6, 2009, now Pat. No. 8,012,572.

(51) Int. Cl.
*B32B 7/02* (2006.01)

(52) U.S. Cl. ...... 428/216; 428/35.2; 428/213; 428/35.7; 264/173.15

(58) Field of Classification Search .......... 428/35.2, 428/35.7, 213, 216; 264/173.15
See application file for complete search history.

(56) References Cited

U.S. PATENT DOCUMENTS

| | | | |
|---|---|---|---|
| 3,022,543 A | 2/1962 | Baird, Jr. et al. |
| 3,557,265 A | 1/1971 | Chisholm et al. |
| 3,565,985 A | 2/1971 | Schrenk et al. |
| 3,576,707 A | 4/1971 | Schrenk et al. |
| 3,773,882 A | 11/1973 | Schrenk |
| 3,801,429 A | 4/1974 | Schrenk et al. |
| 4,496,413 A | 1/1985 | Sharps, Jr. |
| 4,551,380 A | 11/1985 | Schoenberg |
| 4,643,943 A | 2/1987 | Schoenberg |
| 4,784,594 A | 11/1988 | Sharps, Jr. |
| 4,874,568 A | 10/1989 | Chau et al. |
| 4,895,744 A | 1/1990 | Briggs et al. |
| 4,908,278 A | 3/1990 | Bland et al. |
| 5,069,612 A | 12/1991 | Teutsch et al. |
| 5,076,776 A | 12/1991 | Yamada et al. |
| 5,094,788 A | 3/1992 | Schrenk et al. |
| 5,094,793 A | 3/1992 | Schrenk et al. |
| 5,269,995 A | 12/1993 | Ramanathan et al. |
| 5,336,549 A | 8/1994 | Nishimoto et al. |

(Continued)

FOREIGN PATENT DOCUMENTS

EP 0 692 374 A1 1/1996
EP 692374 A1 * 1/1996

(Continued)

*Primary Examiner* — David Sample
*Assistant Examiner* — Tahseen N Khan
(74) *Attorney, Agent, or Firm* — Thomas C. Lagaly

(57) ABSTRACT

A multilayer, heat-shrinkable film generally includes at least one bulk layer and a microlayer section comprising at least 10 microlayers, each of which has a thickness ranging from about 0.001 to 0.015 mil. The ratio of the thickness of any of the microlayers to the thickness of the bulk layer is at least about 1:2. The film has a total free shrink (ASTM D2732-03) of at least about 10% at 200° F.

9 Claims, 7 Drawing Sheets

U.S. PATENT DOCUMENTS

| | | | |
|---|---|---|---|
| 5,427,842 A | 6/1995 | Bland et al. | |
| 5,604,019 A | 2/1997 | Bland et al. | |
| 5,716,650 A | 2/1998 | Mavridis | |
| 5,762,971 A | 6/1998 | Schirmer | |
| 5,897,941 A | 4/1999 | Shah | |
| 6,000,926 A | 12/1999 | Schirmer | |
| 6,040,061 A | 3/2000 | Bland et al. | |
| 6,071,450 A | 6/2000 | Topolkaraev et al. | |
| 6,082,025 A | 7/2000 | Bonk et al. | |
| 6,190,152 B1 | 2/2001 | Cree | |
| 6,261,674 B1 | 7/2001 | Branham et al. | |
| 6,296,947 B1 | 10/2001 | Shah | |
| 6,413,595 B1 | 7/2002 | Schirmer | |
| 6,582,786 B1 | 6/2003 | Bonk et al. | |
| 6,638,461 B2 | 10/2003 | Davidson et al. | |
| 6,638,462 B2 | 10/2003 | Davidson et al. | |
| 6,638,463 B2 | 10/2003 | Davidson et al. | |
| 6,638,464 B2 | 10/2003 | Davidson et al. | |
| 6,837,698 B2 | 1/2005 | Floyd et al. | |
| 6,936,203 B2 | 8/2005 | Reilly et al. | |
| 8,012,572 B2 * | 9/2011 | Ramli et al. | 428/216 |
| 8,043,696 B2 | 10/2011 | Chen et al. | |
| 8,080,310 B2 * | 12/2011 | Ramli et al. | 428/213 |
| 8,241,736 B2 * | 8/2012 | Ramli et al. | 428/213 |
| 2003/0020204 A1 | 1/2003 | Davidson et al. | |
| 2003/0201565 A1 | 10/2003 | Cloeren | |
| 2004/0013834 A1 | 1/2004 | Bonk et al. | |
| 2005/0031816 A1 | 2/2005 | Chang et al. | |
| 2006/0115667 A1 | 6/2006 | Verrocchi | |
| 2007/0141282 A1 | 6/2007 | Chang et al. | |
| 2007/0187856 A1 | 8/2007 | Kitauji et al. | |
| 2008/0206502 A1 | 8/2008 | Chang et al. | |
| 2008/0254281 A1 | 10/2008 | Chen et al. | |
| 2009/0087654 A1 | 4/2009 | Ling et al. | |
| 2010/0072655 A1 | 3/2010 | Roberts et al. | |
| 2010/0227136 A1 * | 9/2010 | Ramli et al. | 428/216 |
| 2011/0039098 A1 | 2/2011 | Forloni et al. | |
| 2011/0260354 A1 * | 10/2011 | Ramli et al. | 264/171.1 |
| 2012/0052277 A1 * | 3/2012 | Ramli et al. | 428/216 |

FOREIGN PATENT DOCUMENTS

| | | |
|---|---|---|
| WO | WO 00/76765 A1 | 12/2000 |
| WO | WO 0076765 A1 * | 12/2000 |
| WO | WO 2006/047374 A1 | 5/2006 |
| WO | WO 2010/015402 A1 | 2/2010 |

* cited by examiner

US 8,409,697 B2

MULTILAYER, HEAT-SHRINKABLE FILM COMPRISING A PLURALITY OF MICROLAYERS

This application is a continuation of U.S. patent application Ser. No. 13/290,432, filed Nov. 7, 2011, now U.S. Pat. No. 8,241,736, which is a continuation of U.S. patent application Ser. No. 13/175,256, filed Jul. 1, 2011, now U.S. Pat. No. 8,080,310, which is a divisional of U.S. patent application Ser. No. 12/381,135, filed Mar. 6, 2009, now U.S. Pat. No. 8,012,572, the disclosures of which are hereby incorporated herein by reference thereto.

BACKGROUND OF THE INVENTION

The present invention relates to packaging materials of a type employing flexible, polymeric, heat-shrinkable films. More specifically, the invention pertains to multilayer, heat-shrinkable films comprising a plurality of microlayers.

One distinguishing feature of a heat-shrinkable film is the film's ability, upon exposure to a certain temperature, to shrink or, if restrained from shrinking, to generate shrink tension within the film.

The manufacture of shrink films is well known in the art, and may be generally accomplished by extrusion (single layer films) or coextrusion (multi-layer films) of thermoplastic polymeric materials which have been heated to their flow or melting point from an extrusion or coextrusion die, e.g., either in tubular or planer (sheet) form. After a post-extrusion quench to cool, e.g., by water immersion, the relatively thick "tape" extrudate is then reheated to a temperature within its orientation temperature range and stretched to orient or align the crystallites and/or molecules of the material. The orientation temperature range for a given material or materials will vary with the different resinous polymers and/or blends thereof which comprise the material. However, the orientation temperature range for a given thermoplastic material may generally be stated to be below the crystalline melting point of the material but above the second order transition temperature (sometimes referred to as the glass transition point) thereof. Within this temperature range, a film may effectively be oriented.

The terms "orientation" or "oriented" are used herein to generally describe the process step and resultant product characteristics obtained by stretching and immediately cooling a thermoplastic polymeric material which has been heated to a temperature within its orientation temperature range so as to revise the molecular configuration of the material by physical alignment of the crystallites and/or molecules of the material to impart certain mechanical properties to the film such as, for example, shrink tension (ASTM D-2838) and heat-shrinkability (expressed quantitatively as "free shrink" per ASTM D-2732). When the stretching force is applied in one direction, uniaxial orientation results. When the stretching force is applied in two directions, biaxial orientation results. The term oriented is also used herein interchangeably with the term "heat-shrinkable," with these terms designating a material which has been stretched and set by cooling while substantially retaining its stretched dimensions. An oriented (i.e., heat-shrinkable) material will tend to return to its original unstretched (unextended) dimensions when heated to an appropriate elevated temperature.

Returning to the basic process for manufacturing the film as discussed above, it can be seen that the film, once extruded (or coextruded if it is a multi-layer film) and initially cooled, e.g., by water quenching, is then reheated to within its orientation temperature range and oriented by stretching. The stretching to orient may be accomplished in many ways such as, for example, by the "blown bubble" or "tenter framing" techniques. These processes are well known to those in the art and refer to orientation procedures whereby the material is stretched in the cross or transverse direction (TD) and/or in the longitudinal or machine direction (MD). After being stretched, the film is quickly quenched while substantially retaining its stretched dimensions to rapidly cool the film and thus set or lock-in the oriented (aligned) molecular configuration.

The degree of stretching controls the degree or amount of orientation present in a given film. Greater degrees of orientation are generally evidenced by, for example, increased values of shrink tension and free shrink. That is, generally speaking, for films manufactured from the same material under otherwise similar conditions, those films which have been stretched, e.g. oriented, to a greater extent will exhibit larger values for free shrink and shrink tension.

In many cases, after being extruded but prior to being stretch-oriented, the film is irradiated, normally with electron beams, to induce cross-linking between the polymer chains that make up the film.

After setting the stretch-oriented molecular configuration, the film may then be stored in rolls and utilized to tightly package a wide variety of items. In this regard, the product to be packaged may first be enclosed in the heat shrinkable material by heat sealing the shrink film to itself to form a pouch or bag, then inserting the product therein and closing the bag or pouch by heat sealing or other appropriate means such as, for example, clipping. If the material was manufactured by the "blown bubble" technique, the material may still be in tubular form or it may have been slit and opened up to form a sheet of film material. Alternatively, a sheet of the material may be utilized to over-wrap the product, which may be in a tray.

After the enclosure step, the enclosed product is subjected to elevated temperatures by, for example, passing the enclosed product through a hot air or hot water tunnel. This causes the enclosing film to shrink around the product to produce a tight wrapping that closely conforms to the contour of the product.

The above general outline for the manufacturing and use of heat-shrinkable films is not intended to be all inclusive since such processes are well known to those of ordinary skill in the art. For example, see U.S. Pat. Nos. 3,022,543 and 4,551,380, the entire disclosures of which are hereby incorporated herein by reference.

While shrink films have been made and used in the foregoing manner for a number of years, there remains a need for improvement. Specifically, there is a need to reduce the amount of polymer used to make shrink films, while maintaining in such films the physical properties that are necessary for the films to perform their intended function as heat-shrinkable packaging films. Such a reduction in polymer usage would beneficially reduce the utilization of petroleum and natural gas resources, from which polymers employed in most shrink films are derived, and would also reduce the amount of material contributed to landfills by discarded shrink films. Moreover, a reduction in the usage of polymers for shrink films would beneficially reduce the material costs for such films.

SUMMARY OF THE INVENTION

The foregoing needs and challenges are met by the present invention, which provides a multilayer, heat-shrinkable film, comprising at least one bulk layer and a microlayer section comprising a plurality of microlayers. Each of the microlayers and the bulk layer have a thickness, and the ratio of the thickness of any of the microlayers to the thickness of the bulk layer ranges from about 1:2 to about 1:40.

In some embodiments, the heat-shrinkable film has a thickness of less than about 0.7 mil and an Elmendorf Tear value (ASTM D1922-06a) of at least 10 grams, as measured in at least one direction along a length or width dimension of the film.

In other embodiments, at least one of the microlayers comprises a blend of two more polymers and has a composition that is different from at least one other microlayer. Advantageously, regardless of thickness, such heat-shrinkable film will exhibit an Elmendorf Tear value (ASTM D1922-06a) of at least about 30 grams/mil, as measured in at least one direction along a length or width dimension of the film.

The foregoing embodiments represent significant improvements in Elmendorf Tear vs. conventional shrink films, i.e., those that do not have a microlayer section. Because of such improvements, shrink films may be made in accordance with the present invention that have less thickness, and therefore less polymer usage, than conventional shrink films, while still maintaining the properties necessary to perform their intended function.

In many embodiments, shrink films in accordance with the present invention have a total free shrink (ASTM D2732-03) of at least about 10% at 200° F.

In some embodiments, the microlayer section may comprise a repeating sequence of layers represented by the structure:

A/B, wherein,

A represents a microlayer comprising one or more polymers;

B represents a microlayer comprising a blend of two or more polymers; and

A has a composition that is different from that of B.

One method of making the multilayer, heat-shrinkable films as described above comprises:

a. extruding a bulk layer;

b. coextruding a plurality of microlayers to form a microlayer section;

c. merging the bulk layer and the microlayer section to form a multilayer film; and d. stretch-orienting the multilayer film under conditions that impart heat-shrinkability to the film;

wherein, each of the microlayers and the bulk layer have a thickness, the ratio of the thickness of any of the microlayers to the thickness of the bulk layer ranging from about 1:2 to about 1:40; and wherein, the film has a total free shrink (ASTM D2732-03) of at least about 10% at 200° F.

Another method of making multilayer, heat-shrinkable films in accordance with the present invention comprises:

a. directing a first polymer through a distribution plate and onto a primary forming stem, the distribution plate having a fluid inlet and a fluid outlet, the fluid outlet from the plate being in fluid communication with the primary forming stem and structured such that the first polymer is deposited onto the primary forming stem as a bulk layer;

b. directing at least a second polymer through a microlayer assembly, the microlayer assembly comprising a plurality of microlayer distribution plates and a microlayer forming stem, each of the microlayer plates having a fluid inlet and a fluid outlet, the fluid outlet from each of the microlayer plates being in fluid communication with the microlayer forming stem and structured to deposit a microlayer of polymer onto the microlayer forming stem, the microlayer plates being arranged to provide a predetermined order in which the microlayers are deposited onto the microlayer forming stem, thereby forming a substantially unified, microlayered fluid mass;

c. directing the microlayered fluid mass from the microlayer forming stem and onto the primary forming stem to merge the microlayered fluid mass with the bulk layer, thereby forming a multilayer film; and d. stretch-orienting the multilayer film under conditions that impart heat-shrinkability to the film.

These and other aspects and features of the invention may be better understood with reference to the following description and accompanying drawings.

DETAILED DESCRIPTION OF THE INVENTION

Figure 1:
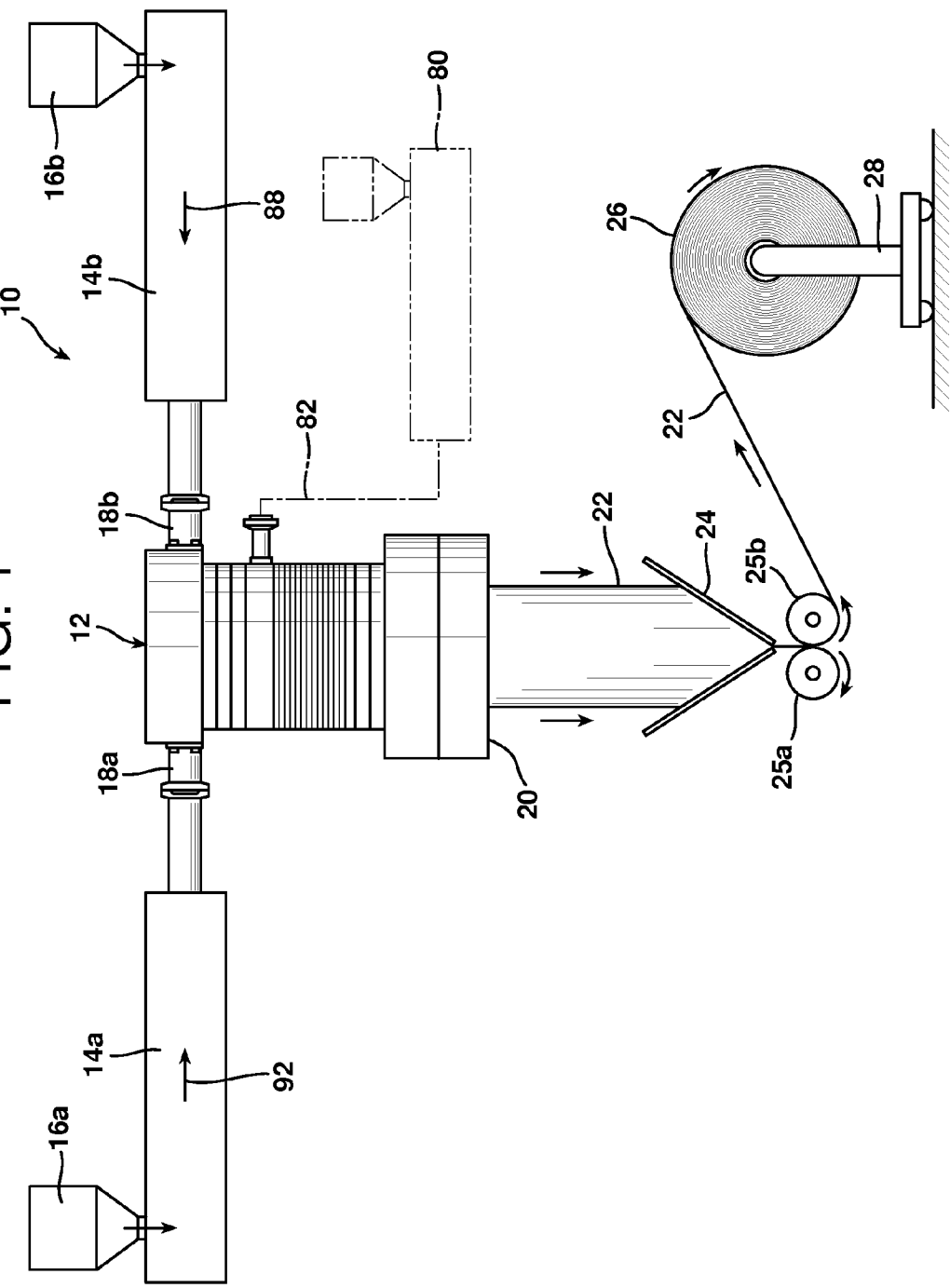
FIG. 1 is a schematic view of a system 10 in accordance with the present invention for coextruding a multilayer film.

FIG. 1 schematically illustrates a system 10 in accordance with the present invention for coextruding a plurality of fluid layers. Such fluid layers typically comprise fluidized polymeric layers, which are in a fluid state by virtue of being molten, i.e., maintained at a temperature above the melting point of the polymer(s) used in each layer.

System 10 generally includes a die 12 and one or more extruders 14a and 14b in fluid communication with the die 12 to supply one or more fluidized polymers to the die. As is conventional, the polymeric materials may be supplied to the extruders 14a, b in the solid-state, e.g., in the form of pellets or flakes, via respective hoppers 16a, b. Extruders 14a, b are maintained at a temperature sufficient to convert the solid-state polymer to a molten state, and internal screws within the extruders (not shown) move the molten polymer into and through die 12 via respective pipes 18a, b. As will be explained in further detail below, within die 12, the molten polymer is converted into thin film layers, and each of the layers are superimposed, combined together, and expelled from the die at discharge end 20, i.e., "coextruded," to form a tubular, multilayer film 22. Upon emergence from the die 12 at discharge end 20, the tubular, multilayer film 22 is exposed to ambient air or a similar environment having a temperature sufficiently low to cause the molten polymer from which the film is formed to transition from a liquid state to a solid state. Additional cooling/quenching of the film may be achieved by providing a liquid quench bath (not shown), and then directing the film through such bath.

The solidified tubular film 22 is then collapsed by a convergence device 24, e.g., a V-shaped guide as shown, which may contain an array of rollers to facilitate the passage of film 22 therethrough. A pair of counter-rotating drive rollers 25*a,b* may be employed as shown to pull the film 22 through the convergence device 24. The resultant collapsed tubular film 22 may then be wound into a roll 26 by a film winding device 28 as shown. The film 22 on roll 26 may subsequently be unwound for use, e.g., for packaging, or for further processing, e.g., stretch-orientation, irradiation, or other conventional film-processing techniques, which are used to impart desired properties as necessary for the intended end-use applications for the film.

Figure 2:
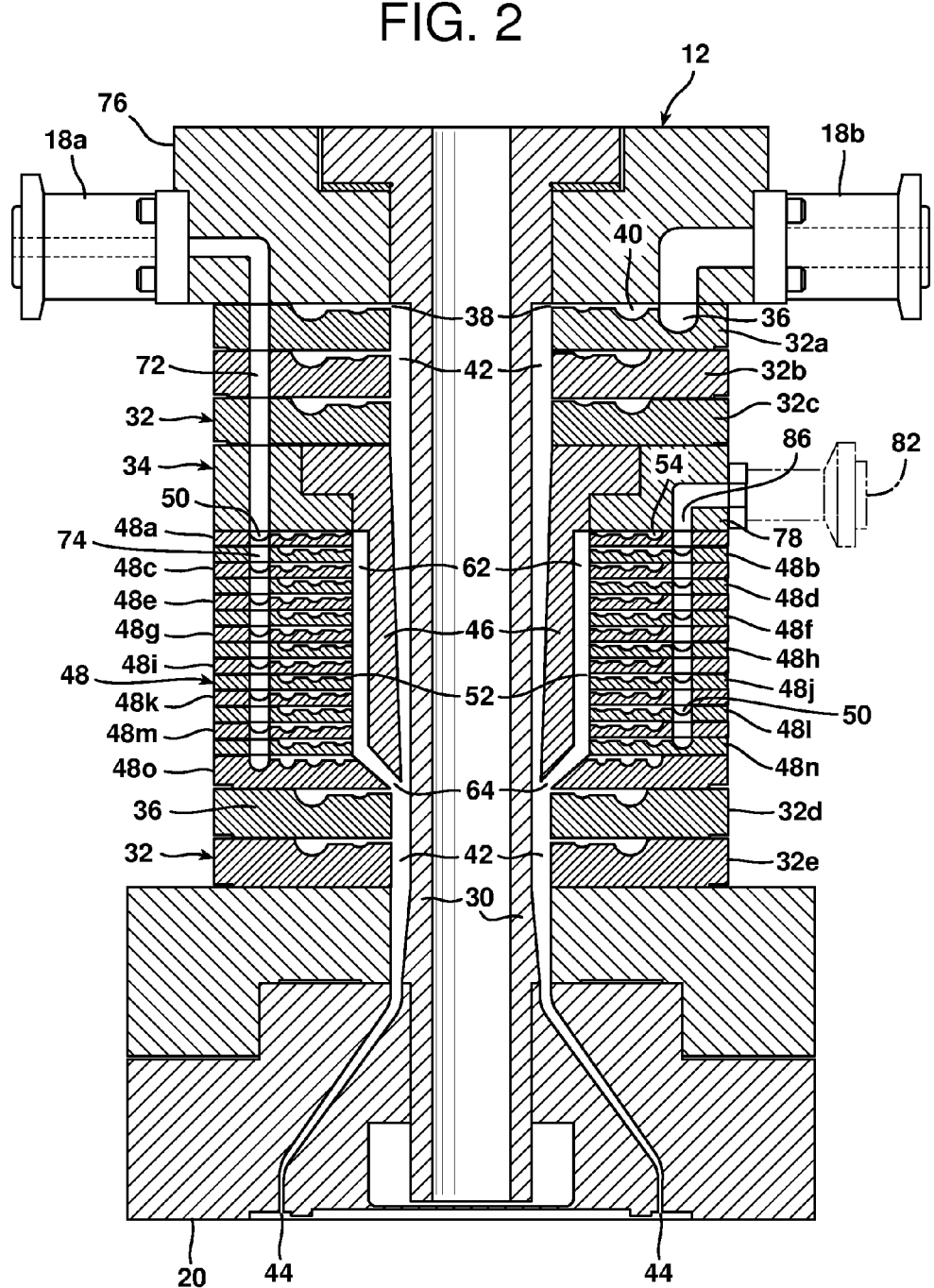
FIG. 2 is a cross-sectional view of the die 12 shown in FIG. 1.

Referring now to FIG. 2, die 12 will be described in further detail. As noted above, die 12 is adapted to coextrude a plurality of fluid layers, and generally includes a primary forming stem 30, one or more distribution plates 32, and a microlayer assembly 34. In the presently illustrated die, five distribution plates 32 are included, as individually indicated by the reference numerals 32*a-e*. A greater or lesser number of distribution plates 32 may be included as desired. The number of distribution plates in die 12 may range, e.g., from one to twenty, or even more then twenty if desired.

Each of the distribution plates 32 has a fluid inlet 36 and a fluid outlet 38 (the fluid inlet is only shown in plate 32*a*). The fluid outlet 38 from each of the distribution plates 32 is in fluid communication with the primary forming stem 30, and also is structured to deposit a layer of fluid onto the primary forming stem. The distribution plates 32 may be constructed as described in U.S. Pat. No. 5,076,776, the entire disclosure of which is hereby incorporated herein by reference thereto. As described in the '776 patent, the distribution plates 32 may have one or more spiral-shaped fluid-flow channels 40 to direct fluid from the fluid inlet 36 and onto the primary forming stem 30 via the fluid outlet 38. As the fluid proceeds along the channel 40, the channel becomes progressively shallower such that the fluid is forced to assume a progressively thinner profile. The fluid outlet 38 generally provides a relatively narrow fluid-flow passage such that the fluid flowing out of the plate has a final desired thickness corresponding to the thickness of the fluid outlet 38. Other channel configurations may also be employed, e.g., a toroid-shaped channel; an asymmetrical toroid, e.g., as disclosed in U.S. Pat. No. 4,832,589; a heart-shaped channel; a helical-shaped channel, e.g., on a conical-shaped plate as disclosed in U.S. Pat. No. 6,409,953, etc. The channel(s) may have a semi-circular or semi-oval cross-section as shown, or may have a fuller shape, such as an oval or circular cross-sectional shape.

Distribution plates 32 may have a generally annular shape such that the fluid outlet 38 forms a generally ring-like structure, which forces fluid flowing through the plate to assume a ring-like form. Such ring-like structure of fluid outlet 38, in combination with its proximity to the primary forming stem 30, causes the fluid flowing through the plate 32 to assume a cylindrical shape as the fluid is deposited onto the stem 30. Each flow of fluid from each of the distribution plates 32 thus forms a distinct cylindrical "bulk" layer on the primary forming stem 30, i.e. layers that have greater bulk, e.g., thickness, than those formed from the microlayer assembly 34 (as described below).

The fluid outlets 38 of the distribution plates 32 are spaced from the primary forming stem 30 to form an annular passage 42. The extent of such spacing is sufficient to accommodate the volume of the concentric fluid layers flowing along the forming stem 30.

The order in which the distribution plates 32 are arranged in die 12 determines the order in which the fluidized bulk layers are deposited onto the primary forming stem 30. For example, if all five distribution plates 32*a-e* are supplied with fluid, fluid from plate 32*a* will be the first to be deposited onto primary forming stem 30 such that such fluid will be in direct contact with the stem 30. The next bulk layer to be deposited onto the forming stem would be from distribution plate 32*b*. This layer will be deposited onto the fluid layer from plate 32*a*. Next, fluid from plate 32*c* will be deposited on top of the bulk layer from plate 32*b*. If microlayer assembly 34 were not present in the die, the next bulk layer to be deposited would be from distribution plate 32*d*, which would be layered on top of the bulk layer from plate 32*c*. Finally, the last and, therefore, outermost bulk layer to be deposited would be from plate 32*e*. In this example (again, ignoring the microlayer assembly 34), the resultant tubular film 22 that would emerge from the die would have five distinct bulk layers, which would be arranged as five concentric cylinders bonded together.

Accordingly, it may be appreciated that the fluid layers from the distribution plates 32 are deposited onto the primary forming stem 30 either directly (first layer to be deposited, e.g., from distribution plate 32*a*) or indirectly (second and subsequent layers, e.g., from plates 32*b-e*).

As noted above, the tubular, multilayer film 22 emerges from die 12 at discharge end 20. The discharge end 20 may thus include an annular discharge opening 44 to allow the passage of the tubular film 22 out of the die. The die structure at discharge end 20 that forms such annular opening is commonly referred to as a "die lip." As illustrated, the diameter of the annular discharge opening 44 may be greater than that of the annular passage 42, e.g., to increase the diameter of the tubular film 22 to a desired extent. This has the effect of decreasing the thickness of each of the concentric layers that make up the tubular film 22, i.e., relative to the thickness of such layers during their residence time within the annular passage 42. Alternatively, the diameter of the annular discharge opening 44 may be smaller than that of the annular passage 42.

Microlayer assembly 34 generally comprises a microlayer forming stem 46 and a plurality of microlayer distribution plates 48. In the presently illustrated embodiment, fifteen microlayer distribution plates 48*a-o* are shown. A greater or lesser number of microlayer distribution plates 48 may be included as desired. The number of microlayer distribution plates 48 in microlayer assembly 34 may range, e.g., from one to fifty, or even more then fifty if desired. In many embodiments of the present invention, the number of microlayer distribution plates 48 in microlayer assembly 34 will be at least about 5, e.g., 10, 15, 20, 25, 30, 35, 40, 45, 50, etc., or any number of plates in between the foregoing numbers.

Each of the microlayer plates 48 has a fluid inlet 50 and a fluid outlet 52. The fluid outlet 52 from each of the microlayer plates 48 is in fluid communication with microlayer forming stem 46, and is structured to deposit a microlayer of fluid onto the microlayer forming stem. Similar to the distribution plates 32, the microlayer plates 48 may also be constructed as described in the above-incorporated U.S. Pat. No. 5,076,776.

Figure 3:
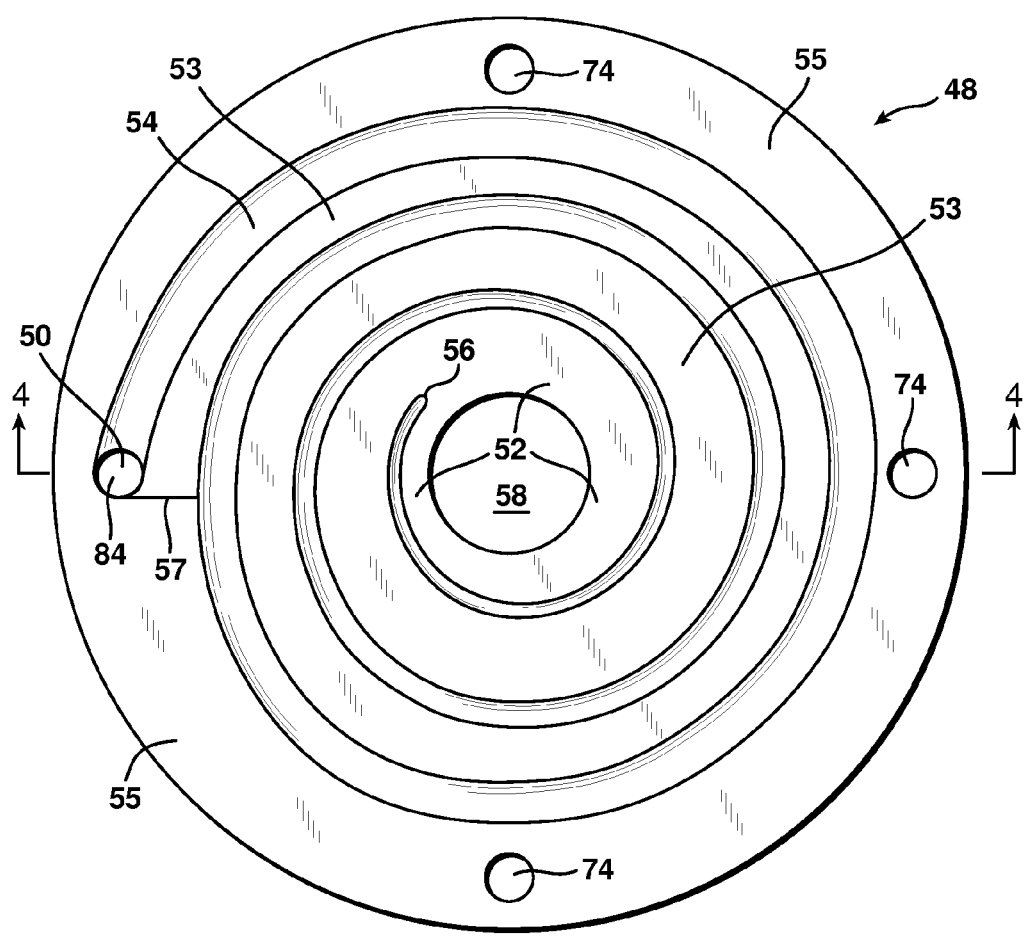
FIG. 3 is a plan view one of the microlayer plates 48 in die 12.

For example, as shown in FIG. 3, the microlayer plates 48 may have a spiral-shaped fluid-flow channel 54, which is supplied with fluid via fluid inlet 50. Alternatively, two or more fluid-flow channels may be employed in plate 48, which may be fed from separate fluid inlets or a single fluid inlet. Other channel configurations may also be employed, e.g., a toroid-shaped channel; an asymmetrical toroid, e.g., as disclosed in U.S. Pat. No. 4,832,589; a heart-shaped channel; a helical-shaped channel, e.g., on a conical-shaped plate as disclosed in U.S. Pat. No. 6,409,953; etc. The channel(s) may have a semi-circular or semi-oval cross-section as shown, or may have a fuller shape, such as an oval or circular cross-sectional shape.

Figure 4:
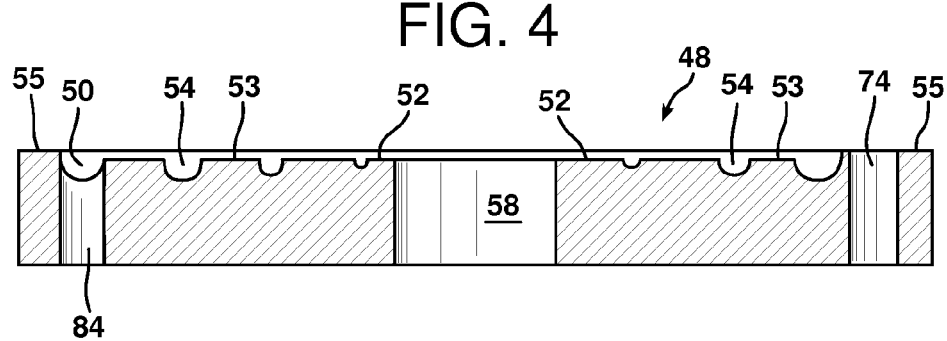
FIG. 4 is a cross-sectional view of the microlayer plate 48 shown in FIG. 3.
Figure 5:
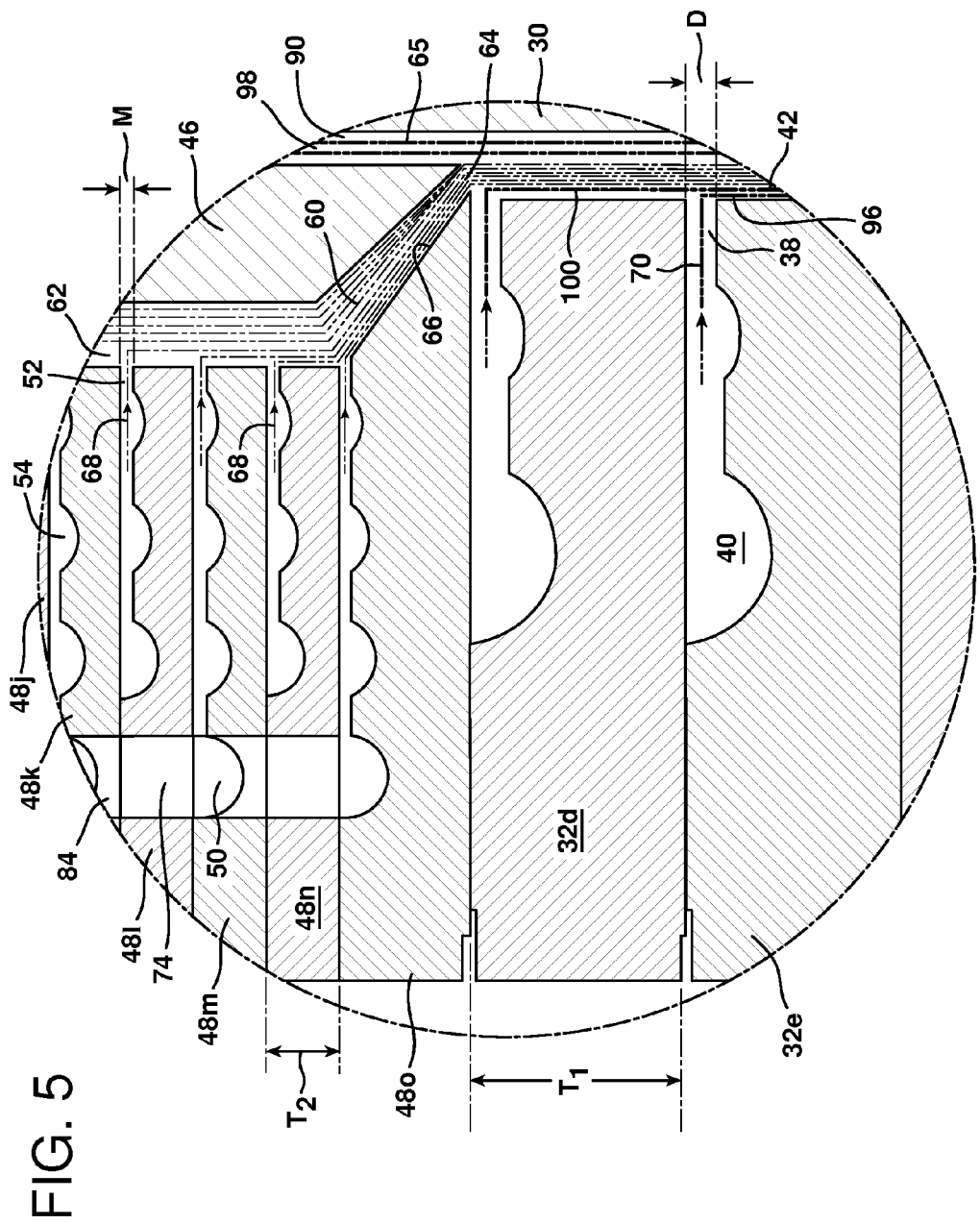
FIG. 5 is a magnified, cross-sectional view of die 12, showing the combined flows from the microlayer plates 48 and distribution plates 32.

Regardless of the particular configuration or pattern that is selected for the flow channel(s) 54, its function is to connect the fluid inlet(s) 50 with the fluid outlet 52 in such a manner that the flow of fluid through the microlayer assembly 34 is converted from a generally stream-like, axial flow to a generally film-like, convergent radial flow towards the microlayer forming stem 46. Microlayer plate 48 as shown in FIG. 3 may accomplish this in two ways. First, the channel 54 spirals inwards towards the center of the plate, and thus directs fluid from the fluid inlet 50, located near the periphery of the plate, towards the fluid outlet 52, which is located near the center of the plate. Secondly, the channel 54 may be fashioned with a progressively shallower depth as the channel approaches the fluid outlet 52. This has the effect of causing some of the fluid flowing through the channel 54 to overflow the channel and proceed radially-inward toward the fluid outlet 52 in a relatively flat, film-like flow. Such radial-inward flow may occur in overflow regions 53, which may be located between the spaced-apart spiral sections of channel 54. As shown in FIG. 4, the overflow regions 53 may be formed as recessed sections in plate 48, i.e., recessed relative to the thicker, non-recessed region 55 at the periphery of the plate. As shown in FIG. 3, overflow regions 53 may begin at step-down 57 and, e.g., spiral inwards towards fluid outlet 52 between the spirals of channel 54. The non-recessed, peripheral region 55 abuts against the plate or other structure above the plate, e.g., as shown in FIGS. 2 and 5, and thus prevents fluid from flowing outside the periphery of the plate. In this manner, the non-recessed, peripheral region 55 forces fluid entering the plate to flow radially inward toward fluid outlet 52. Step-down 57 thus represents a line or zone of demarcation between the 'no-flow' peripheral region 55 and the 'flow' regions 53 and 54. The fluid that remains in the channel 54 and reaches the end 56 of the channel flows directly into the fluid outlet 52.

The fluid outlet 52 generally provides a relatively narrow fluid-flow passage and generally determines the thickness of the microlayer flowing out of the microlayer plate 48. The thickness of the fluid outlet 52, and therefore the thickness of the microlayer flowing therethrough, may be determined, e.g., by the spacing between the plate surface at outlet 52 and the bottom of the plate or other structure (e.g., manifold 76 or 78) immediately above the plate surface at outlet 52.

With continuing reference to FIGS. 2-3, each of the microlayer distribution plates 48 may have an orifice 58 extending through the plate. The orifice 58 may be located substantially in the center of each microlayer plate 48, with the fluid outlet 52 of each plate positioned adjacent to such orifice 58. In this manner, the microlayer forming stem 46 may extend through the orifice 58 of each of the microlayer distribution plates 48. With such a configuration, the microlayer distribution plates 48 may have a generally annular shape such that the fluid outlet 52 forms a generally ring-like structure, which forces fluid flowing through the plate to exit the plate in a radially-convergent, ring-like flow pattern. Such ring-like structure of fluid outlet 52, in combination with its proximity to the microlayer forming stem 46, causes the fluid exiting the microlayer plates 48 to assume a cylindrical shape as the fluid is deposited onto the microlayer stem 46. Each flow of fluid from each of the microlayer distribution plates 48 thus deposits a distinct cylindrical microlayer on the microlayer forming stem 46.

The microlayer plates 48 may be arranged to provide a predetermined order in which the microlayers are deposited onto the microlayer forming stem 46. For example, if all fifteen microlayer distribution plates 48a-o are supplied with fluid, a microlayer of fluid from plate 48a will be the first to be deposited onto microlayer forming stem 46 such that such microlayer will be in direct contact with the stem 46. The next microlayer to be deposited onto the forming stem would be from microlayer plate 48b. This microlayer will be deposited onto the microlayer from plate 48a. Next, fluid from microlayer plate 48c will be deposited on top of the microlayer from plate 48b, etc. The last and, therefore, outermost microlayer to be deposited is from plate 48o. In this manner, the microlayers are deposited onto the microlayer forming stem 46 in the form of a substantially unified, microlayered fluid mass 60 (see FIG. 5). In the present example, such microlayered fluid mass 60 would comprise up to fifteen distinct microlayers (at the downstream end of stem 46), arranged as fifteen concentric cylindrical microlayers bonded and flowing together in a predetermined order (based on the ordering of the microlayer plates 48a-o) on microlayer forming stem 46.

It may thus be appreciated that the fluid layers from the microlayer distribution plates 48 are deposited onto the microlayer forming stem 46 either directly (the first layer to be deposited, e.g., from microlayer plate 48a) or indirectly (the second and subsequent layers, e.g., from microlayer plates 48b-o). The orifices 58 in each of the microlayer plates 48 are large enough in diameter to space the fluid outlets 52 of the microlayer plates 48 sufficiently from the microlayer forming stem 46 to form an annular passage 62 for the microlayers (FIG. 2). The extent of such spacing is preferably sufficient to accommodate the volume of the concentric microlayers flowing along the microlayer stem 46.

In accordance with the present invention, microlayer forming stem 46 is in fluid communication with primary forming stem 30 such that the microlayered fluid mass 60 flows from the microlayer forming stem 46 and onto the primary forming stem 30. This may be seen in FIG. 5, wherein microlayered fluid mass 60 from microlayer assembly 34 is shown flowing from microlayer forming stem 46 and onto primary forming stem 30. Fluid communication between the microlayer stem 46 and primary stem 30 may be achieved by including in die 12 an annular transfer gap 64 between the annular passage 62 for the microlayer stem 46 and the annular passage 42 for the primary stem 30 (see also FIG. 2). Such transfer gap 64 allows the microlayered fluid mass 60 to flow out of the annular passage 62 and into the annular passage 42 for the primary forming stem 30. In this manner, the microlayers from microlayer plates 48 are introduced as a unified mass into the generally larger volumetric flow of the thicker fluid layers from the distribution plates 32.

The microlayer forming stem 46 allows the microlayers from the microlayer plates 48 to assemble into the microlayered fluid mass 60 in relative calm, i.e., without being subjected to the more powerful sheer forces of the thicker bulk layers flowing from the distribution plates 32. As the microlayers assemble into the unified fluid mass 60 on stem 46, the interfacial flow instabilities created by the merger of each layer onto the fluid mass 60 are minimized because all the microlayers have a similar degree of thickness, i.e., relative to the larger degree of thickness of the bulk fluid layers from distribution plates 32. When fully assembled, the microlayered fluid mass 60 enters the flow of the thicker bulk layers from distribution plates 32 on primary stem 30 with a mass flow rate that more closely approximates that of such thicker layers, thereby increasing the ability of the microlayers in fluid mass 60 to retain their physical integrity and independent physical properties.

As shown in FIG. 2, primary forming stem 30 and microlayer forming stem 46 may be substantially coaxially aligned with one another in die 12, e.g., with the microlayer forming stem 46 being external to the primary forming stem 30. This construction provides a relatively compact configuration for die 12, which can be highly advantageous in view of the stringent space constraints that exist in the operating environment of many commercial coextrusion systems.

Such construction also allows die 12 to be set up in a variety of different configurations to produce a coextruded film having a desired combination of bulk layers and microlayers. For example, one or more distribution plates 32 may be located upstream of the microlayer assembly 34. In this embodiment, fluidized bulk layers from such upstream distribution plates are deposited onto primary forming stem 30 prior to the deposition of the microlayered fluid mass 60 onto the primary stem 30. With reference to FIG. 2, it may be seen that distribution plates 32a-c are located upstream of microlayer assembly 34 in die 12. Bulk fluid layers 65 from such upstream distribution plates 32a-c are thus interposed between the microlayered fluid mass 60 and the primary forming stem 30 (see FIG. 5).

Alternatively, the microlayer assembly 34 may be located upstream of the distribution plates 32, i.e., the distribution plates may be located downstream of the microlayer assembly 34 in this alternative embodiment. Thus, the microlayers from the microlayer assembly 34, i.e., the microlayered fluid mass 60, will be deposited onto primary forming stem 30 prior to the deposition thereon of the bulk fluid layers from the downstream distribution plates 32. With reference to FIG. 2, it may be seen that microlayer assembly 34 is located upstream of distribution plates 32d-e in die 12. As shown in FIG. 5, the microlayered fluid mass 60 is thus interposed between the bulk fluid layer(s) 70 from such distribution plates 32d-e and the primary forming stem 30.

As illustrated in FIG. 2, the microlayer assembly 34 may also be positioned between one or more upstream distribution plates, e.g., plates 32a-c, and one or more downstream distribution plates, e.g., plates 32d-e. In this embodiment, fluid(s) from upstream plates 32a-c are deposited first onto primary stem 30, followed by the microlayered fluid mass 60 from the microlayer assembly 34, and then further followed by fluid(s) from downstream plates 32d-e. In the resultant multilayered film, the microlayers from microlayer assembly 34 are sandwiched between thicker, bulk layers from both the upstream plates 32a-c and the downstream plates 32d-e.

In many embodiments of the invention, most or all of the microlayer plates 48 have a thickness that is less than that of the distribution plates 32. Thus, for example, the distribution plates 32 may have a thickness $T_1$ (see FIG. 5) ranging from about 0.5 to about 2 inches. The microlayer distribution plates 48 may have a thickness $T_2$ ranging from about 0.1 to about 0.5 inch. Such thickness ranges are not intended to be limiting in any way, but only to illustrate typical examples. All distribution plates 32 will not necessarily have the same thickness, nor will all of the microlayer plates 48. For example, microlayer plate 48o, the most downstream of the microlayer plates in the assembly 34, may be thicker than the other microlayer plates to accommodate a sloped contact surface 66, which may be employed to facilitate the transfer of microlayered fluid mass 60 through the annular gap 64 and onto the primary forming stem 30.

As also shown in FIG. 5, each of the microlayers flowing out of the plates 48 has a thickness "M" corresponding to the thickness of the fluid outlet 52 from which each microlayer emerges. The microlayers flowing from the microlayer plates 48 are schematically represented in FIG. 5 by the phantom arrows 68.

Similarly, each of the relatively thick bulk layers flowing out of the plates 32 has a thickness "D" corresponding to the thickness of the fluid outlet 38 from which each such layer emerges (see FIG. 5). The thicker/bulk layers flowing from the distribution plates 32 are schematically represented in FIG. 5 by the phantom arrows 70.

Generally, the thickness M of the microlayers will be less than the thickness D of the bulk layers from the distribution plates 32. The thinner that such microlayers are relative to the bulk layers from the distribution plates 32, the more of such microlayers that can be included in a multilayer film, for a given overall film thickness. Microlayer thickness M from each microlayer plate 48 will generally range from about 1-20 mils (1 mil=0.001 inch). Thickness D from each distribution plate 32 will generally range from about 20-100 mils.

The ratio of M:D may range from about 1:1 to about 1:8. Thickness M may be the same or different among the microlayers 68 flowing from microlayer plates 48 to achieve a desired distribution of layer thicknesses in the microlayer section of the resultant film. Similarly, thickness D may be the same or different among the thicker bulk layers 70 flowing from the distribution plates 32 to achieve a desired distribution of layer thicknesses in the bulk-layer section(s) of the resultant film.

The layer thicknesses M and D will typically change as the fluid flows downstream through the die, e.g., if the melt tube is expanded at annular discharge opening 44 as shown in FIG. 2, and/or upon further downstream processing of the tubular film, e.g., by stretching, orienting, or otherwise expanding the tube to achieve a final desired film thickness and/or to impart desired properties into the film. The flow rate of fluids through the plates will also have an effect on the final downstream thicknesses of the corresponding film layers.

As described above, the distribution plates 32 and microlayer plates 48 preferably have an annular configuration, such that primary forming stem 30 and microlayer stem 46 pass through the center of the plates to receive fluid that is directed into the plates. The fluid may be supplied from extruders, such as extruders 14a, b. The fluid may be directed into the die 12 via vertical supply passages 72, which receive fluid from feed pipes 18, and direct such fluid into the die plates 32 and 48. For this purpose, the plates may have one or more through-holes 74, e.g., near the periphery of the plate as shown in FIG. 3, which may be aligned to provide the vertical passages 72 through which fluid may be directed to one or more downstream plates.

Although three through-holes 74 are shown in FIG. 3, a greater or lesser number may be employed as necessary, e.g., depending upon the number of extruders that are employed. In general, one supply passage 72 may be used for each extruder 14 that supplies fluid to die 12. The extruders 14 may be arrayed around the circumference of the die, e.g., like the spokes of a wheel feeding into a hub, wherein the die is located at the hub position.

With reference to FIG. 1, die 12 may include a primary manifold 76 to receive the flow of fluid from the extruders 14 via feed pipes 18, and then direct such fluid into a designated vertical supply passage 72, in order to deliver the fluid to the intended distribution plate(s) 32 and/or microlayer plate(s) 48. The microlayer assembly 34 may optionally include a microlayer manifold 78 to receive fluid directly from one or more additional extruders 80 via feed pipe 82 (shown in phantom in FIG. 1).

In the example illustrated in FIGS. 1-2, extruder 14b delivers a fluid, e.g., a first molten polymer, directly to the fluid inlet 36 of distribution plate 32a via pipe 18b and primary manifold 76. In the presently illustrated embodiment, distribution plate 32a receives all of the output from extruder 14b, i.e., such that the remaining plates and microlayer plates in the die 12 are supplied, if at all, from other extruders. Alternatively, the fluid inlet 36 of distribution plate 32a may be configured to contain an outlet port to allow a portion of the supplied fluid to pass through to one or more additional plates, e.g., distribution plates 32 and/or microlayer plates 48, positioned downstream of distribution plate 32a.

For example, as shown in FIGS. 3-4 with respect to the illustrated microlayer plate 48, an outlet port 84 may be formed in the base of the fluid inlet 50 of the plate. Such outlet port 84 allows the flow of fluid delivered to plate 48 to be split: some of the fluid flows into channel 54 while the remainder passes through the plate for delivery to one or more additional downstream plates 48 and/or 32. A similar outlet port can be included in the base of the fluid inlet 36 of a distribution plate 32. Delivery of fluid passing through the outlet port 84 (or through a similar outlet port in a distribution plate 32) may be effected via a through-hole 74 in an adjacent plate (see FIG. 5), or via other means, e.g., a lateral-flow supply plate, to direct the fluid in an axial, radial, and/or tangential direction through die 12 as necessary to reach its intended destination.

Distribution plates 32b-c are being supplied with fluid via extruder(s) and supply pipe(s) and/or through-holes that are not shown in FIG. 2. The bulk fluid flow along primary forming stem 30 from distribution plates 32a-c is shown in FIG. 5, as indicated by reference numeral 65.

As shown in FIGS. 1-2, microlayer assembly 34 is being supplied with fluid by extruders 14a and 80. Specifically, microlayer plates 48a, c, e, g, i, k, m, and o are supplied by extruder 14a via supply pipe 18a and vertical pipe and/or passage 72. Microlayer plates 48b, d, f, h, j, l, and n are supplied with fluid by extruder 80 via feed pipe 82 and a vertical supply passage 86. In the illustrated embodiment, vertical passage 86 originates in microlayer manifold 78 and delivers fluid only within the microlayer assembly 34. In contrast, vertical passage 72 originates in manifold 76, extends through distribution plates 32a-c (via aligned through-holes 74 in such plates), then further extends through manifold 78 via manifold passage 79 before finally arriving at microlayer plate 48a.

Fluid from extruder 14a and vertical passage 72 enters microlayer plate 48a at fluid inlet 50. Some of the fluid passes from inlet 50 and into channel 54 (for eventual deposition on microlayer stem 46 as the first microlayer to be deposited on stem 46), while the remainder of the fluid passes through plate 48a via outlet port 84. Microlayer plate 48b may be oriented, i.e., rotated, such that a through-hole 74 is positioned beneath the outlet port 84 of microlayer plate 48a so that the fluid flowing out of the outlet port 84 flows through the microlayer plate 48b, and not into the channel 54 thereof. Microlayer plate 48c may be positioned such that the fluid inlet 50 thereof is in the same location as that of microlayer plate 48a so that fluid flowing out of through-hole 74 of microlayer plate 48b flows into the inlet 50 of plate 48c. Some of this fluid flows into the channel 54 of plate 48c while some of the fluid passes through the plate via outlet port 84, passes through a through-hole 74 in the next plate 48d, and is received by fluid inlet 50 of the next microlayer plate 48e, where some of the fluid flows into channel 54 and some passes out of the plate via outlet port 84. Fluid from extruder 14a continues to be distributed to remaining plates 48g, i, k, and m in this manner, except for microlayer plate 48o, which has no outlet port 84 so that fluid does not pass through plate 48o, except via channel 54 and fluid outlet 52.

In a similar manner, fluid from extruder 80 and vertical passage 86 passes through microlayer plate 48a via a through-hole 74 and then enters microlayer plate 48b at fluid inlet 50 thereof. Some of this fluid flows through the channel 54 and exits the plate at outlet 52, to become the second microlayer to be deposited onto microlayer stem 46 (on top of the microlayer from plate 48a), while the remainder of the fluid passes through the plate via an outlet port 84. Such fluid passes through microlayer plate 48c via a through-hole 74, and is delivered to plate 48d via appropriate alignment of its inlet 50 with the through-hole 74 of plate 48c. This fluid-distribution process may continue for plates 48f, h, j, and l, until the fluid reaches plate 48n, which has no outlet port 84 such that fluid does not pass through this plate except via its fluid outlet 52.

In this manner, a series of microlayers comprising alternating fluids from extruders 14a and 80 may be formed on microlayer stem 46. For example, if extruder 14a supplied EVOH and extruder 80 supplied PA6, the resultant microlayered fluid mass 60 would have the structure:

EVOH/PA6/EVOH/PA6/EVOH/PA6/EVOH/PA6/
EVOH/PA6/EVOH/PA6/EVOH/PA6/EVOH

The fluids from extruders 14a and 80 may be the same or different such that the resultant microlayers in microlayered fluid mass 60 may have the same or a different composition. Only one extruder may be employed to supply fluid to the entire microlayer assembly 34, in which case all of the resultant microlayers will have the same composition. Alternatively, three or more extruders may be used to supply fluid to the microlayer assembly 34, e.g., with each supplying a different fluid, e.g., polymer "a," polymer "b," and polymer "c," respectively, such that three different microlayer compositions are formed in microlayered fluid mass 60, in any desired order, to achieve any desired layer-combination, e.g., abcabc; abbcabbc; abacabac; etc.

Similarly, the fluid(s) directed through the distribution plate(s) 32 may be substantially the same as the fluid(s) directed through the microlayer assembly 34. Alternatively, the fluid(s) directed through the distribution plate(s) 32 may be different from the fluid(s) directed through the microlayer assembly. The resultant tubular film may have bulk layers and microlayers that have substantially the same composition. Alternatively, some of the bulk layers from distribution plates 32 may be the same as some or all of the microlayers from microlayer plates 48, while other bulk layers may be different from some or all of the microlayers.

In the illustrated example, the extruders and supply passages for distribution plates 32d-e are not shown. One or both of such plates may be supplied from extruder 14a, 14b, and/or 80 by appropriate arrangement of vertical supply passages 72, 86, through-holes 74, and/or outlet ports 84 of the upstream distribution plates 32 and/or microlayer plates 48. Alternatively, one or both distribution plates 32d-e may not be supplied at all, or may be supplied from a separate extruder, such as an extruder in fluid communication with primary manifold 76 and a vertical supply passage 72 that extends through distribution plates 32a-c and microlayer assembly 34, e.g., via appropriate alignment of the through-holes 74 of plates 32a-c and microlayer assembly 34 to create a fluid transport passage through die 12, leading to fluid inlet 50 of distribution plate 32d and/or 32e.

If desired, one or more of the distribution plates 32 and/or microlayer plates 48 may be supplied with fluid directly from one or more extruders, i.e., by directing fluid directly into the fluid inlet of the plate, e.g., from the side of the plate, without the fluid being first routed through one of manifolds 76 or 78 and/or without using a vertical supply passage 72, 86. Such direct feed of one or more plates 32 and/or 48 may be employed as an alternative or in addition to the use of manifolds and vertical supply passages as shown in FIG. 2.

The inventors have discovered that the system 10 is particularly advantageous when used to make a multilayer, heat-shrinkable film, i.e., films that have been stretch-oriented such that they shrink upon exposure to heat. Surprisingly, it was discovered that the inclusion of a plurality of microlayers in a heat-shrinkable film enabled the thickness, and therefore polymer usage, of such film to be reduced by up to 50%, yet still perform as well as an otherwise identical film having twice the thickness and twice the polymer usage. The plurality of microlayers in the film results from the microlayered fluid mass 60 as described above, which forms a microlayer section 60 in the film.

For example, heat-shrinkable films 94 in accordance with the present invention have at least one microlayer section 60, and one or more bulk layers, e.g., 90, 96, 98, and/or 100 (see, FIGS. 6 and 8), and preferably have a total free shrink (ASTM D2732-03) of at least about 10% at 200° F.

Such films may be formed from system 10 by directing a first polymer 88 through extruder 14*b* and distribution plate 32*a* of die 12, and onto primary forming stem 30 such that the first polymer 88 is deposited onto primary forming stem 30 as a first bulk layer 90 (see FIGS. 1, 2 and 5). At least a second polymer 92 may be directed through extruder 14*a* and microlayer assembly 34, e.g., via vertical passage 72, to form microlayered fluid mass 60 on microlayer forming stem 46. The microlayered fluid mass 60 is then directed from microlayer forming stem 46 and onto primary forming stem 30. In this manner, the microlayered fluid mass 60 is merged with first bulk layer 90 within die 12 (FIG. 5), thereby forming multilayer film 22 (FIG. 1) as a relatively thick "tape" extrudate, which comprises the bulk layer 90 and microlayer section 60 as solidified film layers resulting from the fluid (molten) polymer layer 90 and microlayered fluid mass 60 within die 12.

Figure 6:
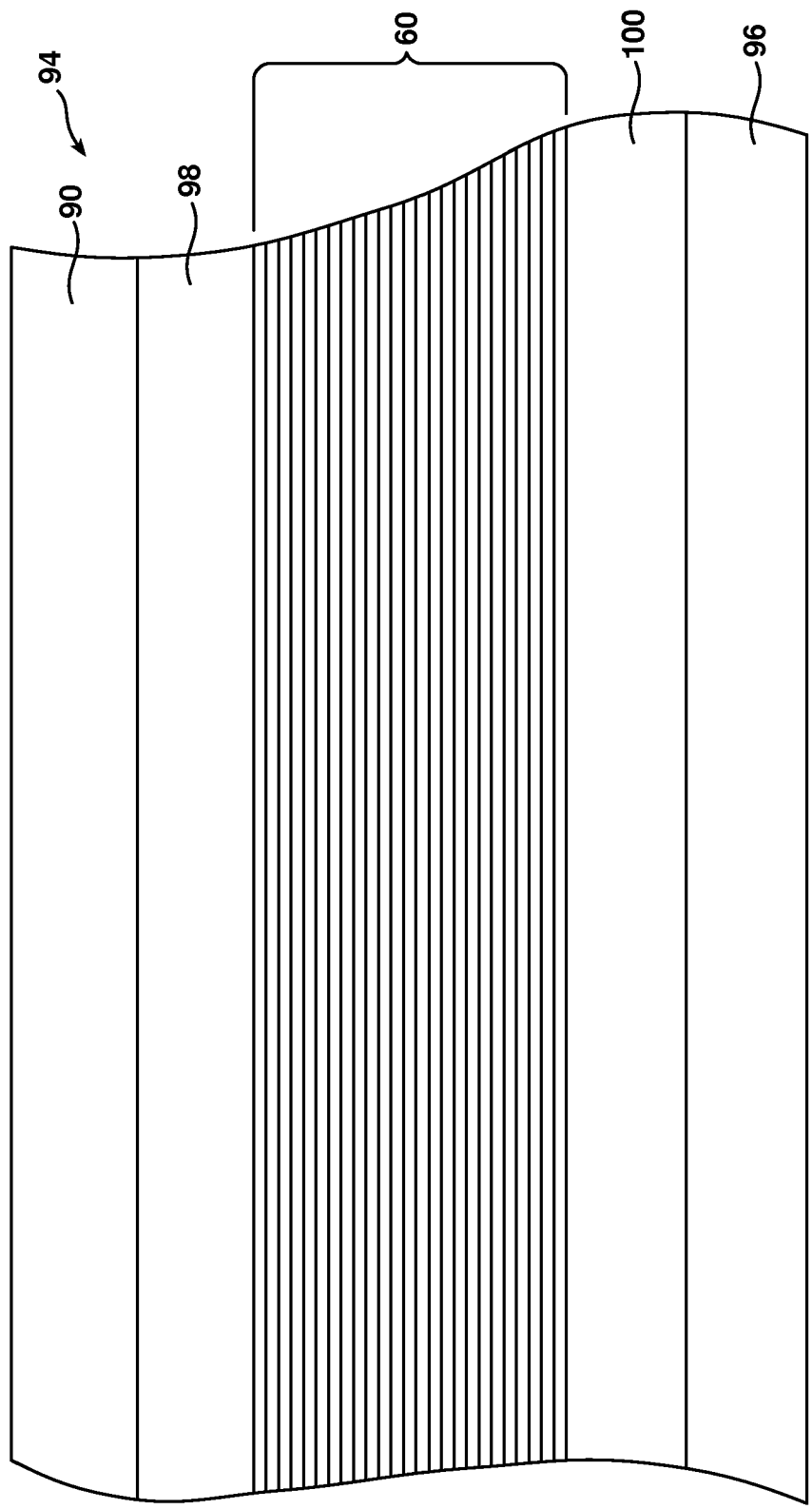
FIG. 6 is a cross-sectional view of a multilayer, heat-shrinkable film, which may be produced from die 12 as shown in FIG. 2.

As the coextruded, tubular multilayer "tape" 22 emerges from the discharge end 20 of die 12, it is quenched (e.g., via immersion in water) and then stretch-oriented under conditions that impart heat-shrinkability to the film. Such conditions, as described above in the Background section, may include reheating the multilayer "tape" to a temperature within its orientation temperature range, and then stretching the tape, e.g., as a blown bubble, to orient (align) the crystallites and/or molecules of the material, followed by quenching the film while substantially retaining its stretched dimensions to rapidly cool the film and thus lock-in the oriented molecular configuration. In this manner, the "tape" 22 is converted into a heat-shrinkable film 94, a cross-sectional view of which is shown in FIG. 6.

As may be appreciated, due to the stretching of the multilayer film or "tape" 22, the thickness of heat-shrinkable film 94 is significantly less than that of the tape 22. For example, while the tape 22 may have a thickness ranging from about 5 to about 50 mils, in many embodiments of the invention, the heat-shrinkable film 94 will have a thickness of less than 5 mils, such as 4 mils or less, 3 mils or less, 2 mils or less, etc. In some embodiments, the stretch-oriented shrink film 94 may be relatively very thin, i.e., less than 1 mil, e.g., less than about 0.9 mil, such as less than about 0.8 mil, less than about 0.7 mil, or less than about 0.6 mil, such as about 0.59 mil or less, 0.58 mil or less, 0.57 mil or less, 0.56 mil or less, 0.55 mil or less, 0.54 mil or less, 0.53 mil or less, etc. Advantageously, microlayers 60 in accordance with the present invention allow shrink film 94 to have an even lower thickness of 0.5 mil or less, such as less than 0.45 mil, or less than 0.40 mil, such as less than 0.39 mil, less than 0.38 mil, less than 0.37 mil, less than 0.36 mil, less than 0.35 mil, less than 0.34 mil, less than 0.33 mil, less than 0.32 mil, or less than 0.31 mil, such about 0.30 mil.

As shown in FIG. 5, first bulk layer 90 may be deposited onto primary forming stem 30 prior to the deposition of the microlayered fluid mass 60 onto the primary forming stem 30 such that the first layer 90 is interposed between the microlayered fluid mass 60 and the primary forming stem 30. If desired, a third polymer may be directed through a second distribution plate, e.g., distribution plate 32*e* (see FIG. 2; source of third polymer not shown). As shown in FIG. 5, the relatively thick flow 70 of such third polymer from distribution plate 32*e* may be merged with the microlayered fluid mass 60 to form a second bulk layer 96 for the multilayer film 94. In this manner, the microlayer section 60 may form a core for the multilayer film 94, with the first bulk layer 90 forming a first outer layer for the multilayer film 94 and the second bulk layer 96 forming a second outer layer therefor. Thus, in the embodiment illustrated in FIG. 6, heat-shrinkable film 94 comprises microlayer section 60 positioned between the first and second bulk, outer layers 90, 96.

The second polymer 92 may be substantially the same as the first polymer 88, such that the composition of the first bulk layer 90 may be substantially the same as that of the microlayers 60. Alternatively, the second polymer 92 may be different from the first polymer 88, such that the composition of the first layer 90 may be different from that of the microlayers 60. Similarly, the composition of second bulk layer 96 may be the same or different from that of first layer 90, and also the same or different from that of the microlayers 60.

As a further variation, a first intermediate bulk layer 98 may be interposed between the first outer layer 90 and the microlayer section 60 in shrink film 94. Similarly, a second intermediate bulk layer 100 may be interposed between the second outer layer 96 and the microlayer section 60. The composition of layers 90 and 98 may be the same or different. Similarly, the composition of layers 96 and 100 may be the same or different. First intermediate bulk layer 98 may be formed from polymer directed through distribution plate 32*b* while second intermediate bulk layer 100 may be formed from polymer directed through distribution plate 32*e* (see FIGS. 2 and 5). If the composition of layers 90 and 98 is the same, the same extruder 14*b* may be used to supply both of distribution plates 32*a* and 32*b*. If the composition of such layers is different, two different extruders are used to supply the distribution plates 32*a* and 32*b*. The foregoing also applies to the supply of polymer to distribution plates 32*d* and 32*e*.

To make the shrink film illustrated in FIG. 6, no polymer was supplied to distribution plate 32*c*. If polymer was supplied to distribution plate 32*c*, the resultant shrink film would have an additional intermediate bulk layer between layer 98 and microlayer section 60.

Shrink film 94, as illustrated in FIG. 6, is representative of many of the inventive shrink films described in the Examples below, in that such films have a total of twenty five (25) microlayers in the core of the film. The die used to make such films was essentially as illustrated in FIG. 2, except that twenty five (25) microlayer plates were included in the microlayer assembly 34. For simplicity of illustration, only fifteen (15) microlayer plates are shown in the microlayer assembly 34 of die 12 in FIG. 2. Generally, the microlayer section 60 may comprise any desired number of microlayers, e.g., between 2 and 50 microlayers, such as between 10 and 40 microlayers, etc.

Each of the microlayers 60 may have substantially the same composition. This would be the case, e.g., if all microlayer plates 48 were supplied with polymer by extruder 14a. Alternatively, at least one of the microlayers 60 may have a composition that is different from the composition of at least one other of the microlayers, i.e., two or more of the microlayers may have compositions that are different from one other. This can be accomplished, e.g., by employing extruder 80 to supply a different polymer (i.e., different from the polymer supplied by extruder 14a) to at least one of the microlayer plates 48. Thus, as shown in FIGS. 1 and 2, extruder 14a may supply the "odd" microlayer plates (i.e., plates 48a, c, e, etc.) with one type of polymeric composition, e.g., "composition A," while extruder 80 supplies the "even" microlayer plates (i.e., plates 48b, d, f, etc.) with another type of polymeric composition, e.g., "composition B," such that the microlayer section 60 will comprise alternating microlayers of "A" and "B", i.e., ABABAB . . . . A third extruder supplying a polymeric composition "C" could also be employed, e.g., to provide a repeating "ABC" ordering of the microlayers, i.e., ABCABC . . . . Numerous other variations are, of course, possible.

Each of the microlayers 60 in heat-shrinkable film 94 may have substantially the same thickness. Alternatively, at least one of the microlayers may have a thickness that is different from the thickness of at least one other of the microlayers. The thickness of the microlayers 60 in shrink film 94 will be determined by a number of factors, including the construction of the microlayer plates, e.g., the spacing "M" of the fluid outlet 52 (FIG. 5), the mass flow rate of fluidized polymer that is directed through each plate, the degree of stretching to which the tape 22/shrink film 94 is subjected during orientation, etc.

In accordance with the present invention, each of the microlayers 60 in shrink film 94 have a thickness that is significantly less than that of the bulk layers in the film, i.e., those produced by the relatively thick distribution plates 32. For example, the ratio of the thickness of any of the microlayers 60 to the thickness of bulk layer 90 may range from about 1:2 to about 1:40, e.g., from about 1:5 to about 1:30 (see, FIG. 6). The same thickness ratio range may apply to each of the microlayers 60 relative any of the other bulk layers in shrink film 94, e.g., second outer layer 96 or intermediate layers 98 and/or 100. Thus, for example, each of the microlayers 60 may have a thickness ranging from about 0.001 to about 0.015 mils, while each of the bulk layers 90, 96, 98 and/or 100 may have a thickness ranging from about 0.03 to about 0.5 mils.

During the stretch-orientation process to which the tape 22 is subjected to convert it into shrink film 94, the tape 22 may be oriented such that the film 94 has an orientation ratio of at least 3, as measured in at least one direction along a length or width dimension of the film, e.g., the transverse direction (TD) or machine direction (MD). Advantageously, the inclusion of microlayers in a heat-shrinkable film was found to provide the film with the ability to be stretched at even higher orientation ratios, e.g., an orientation of at least 5, as measured in at least one direction along a length or width dimension of the film. As shown in the Examples, films in accordance with the present invention were able to be oriented at a "5×5" ratio, i.e., the tape was stretched to five times its original width and five times its original length during the stretch-orientation process, such that the resultant film was not only rendered heat-shrinkable, but was twenty five (25) times its original size (surface area), when it was as an extruded tape emerging from die 12. Surprisingly, films in accordance with the present invention could even be stretched at an orientation ratio of 6×6, i.e., the resultant shrink film was stretched to thirty six (36) times its original size as when it was an extruded tape (see, Examples 13-15, 22, and 63-71). Such high orientation ratios are advantageous because they allow for a high degree of process efficiency in terms of through-put and polymer usage, which allows a greater amount of film to be produced from a given extrusion system. Conventional films (i.e., without microlayers) of comparable thickness could not be oriented at ratios any higher than 5×5 without destroying the film in the orientation process. Further, despite being stretched to a higher degree, the shrink films of the invention maintained physical properties that were on par with conventional films having a lower orientation ratio. Surprisingly, certain properties, such as instrumented impact strength (ASTM D3763-06), actually increased over those of the corresponding comparative film having a lower orientation ratio (compare, e.g., the instrumented impact strengths of Comparative Example 3 vs. Inventive Examples 63-71).

In many applications, shrink films are used in conjunction with automated shrink-wrap packaging machines. As generally known by those of ordinary skill in the art of shrink film packaging, Elemendorf Tear Resistance (as opposed to other types of tear strength tests) represents the most accurate predictive indicator of the tear performance of a shrink film in an automated shrink-wrap packaging machine. Elmendorf Tear values are determined in accordance with ASTM D1922-06a, entitled "Standard Test Method for Propagation Tear Resistance of Plastic Film and Thin Sheeting by Pendulum Method (Elmendorf Tear)." The D1922-06a Elmendorf Tear test measures the average force to propagate tearing through a specified length of plastic film after the tear has been started, using an Elmendorf-type tearing tester, which applies a tearing force to the film from the force of a falling pendulum.

In automated shrink-wrap packaging machines, shrink films are subjected to numerous folding and bending moves as the film is manipulated by the machine to envelop the object to be packaged, which initiate tears and place tear propagation stresses on the film. Shrink films having a relatively low Elemendorf Tear resistance exhibit a relatively high rate of tearing in automated shrink packaging machines; conversely, those having a relatively high Elemendorf Tear resistance have a relatively low rate of machine tearing. Applicants have determined that shrink films having an Elemendorf Tear value of at least 10 grams are capable of good performance with minimal tearing in almost all types and brands of shrink packaging equipment. When shrink films have an Elemendorf Tear resistance of lower than 10 grams, such films are limited in their use to either manually-operated shrink-wrap machinery, or highly refined and expensive machines that are designed to minimize the tear stresses placed on the shrink film.

An unexpected benefit that was found to result from the inclusion of microlayers in a shrink-film was an increase in Elemendorf Tear resistance. In a majority of the films produced in accordance with the present invention, this increase was found to be sufficiently significant that the thickness of such films could be reduced by 50% while still maintaining an Elemendorf Tear of greater than 10 grams, and also maintaining the other properties necessary for such films to perform successfully in automated shrink-film packaging equipment. As a result, the amount of polymer required to make such films can effectively be cut in half, thus saving petroleum and natural gas resources, as well as reducing landfill space and cost.

Figure 7:
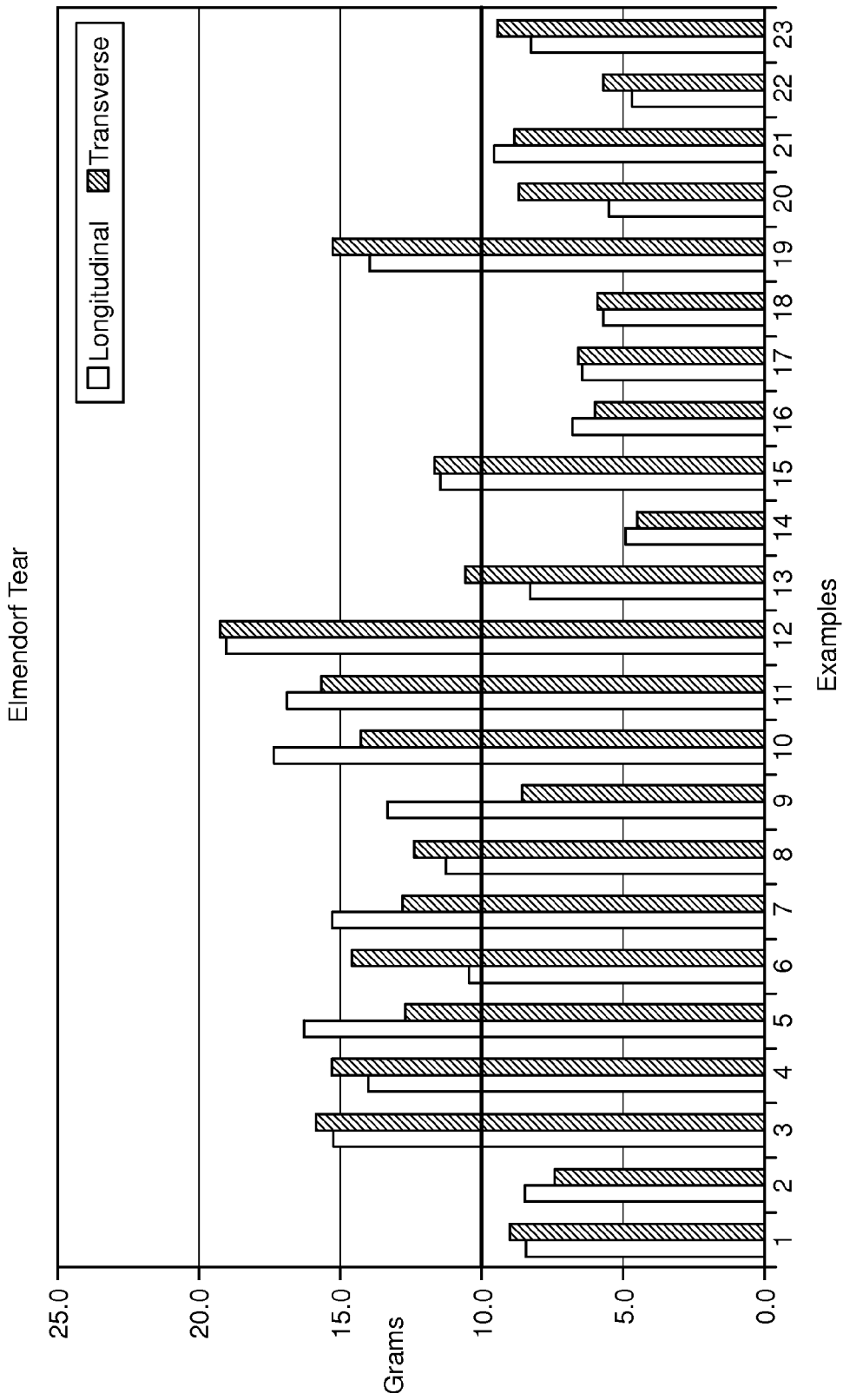
FIG. 7 is a graph showing Elemendorf tear-resistance strength for each of the films of Examples 1-23.

The foregoing is demonstrated in further detail in the Examples below. The Elmendorf Tear values for films 1-23 are shown graphically in FIG. 7. Films 1-3 are comparative films (no microlayers); films 4-23 are in accordance with the present invention (microlayered core). Comparative film 3 had a thickness of 0.6 mil while inventive films 4-23 had half that thickness—0.3 mil. As shown in FIG. 7, the majority of the films in accordance with the present invention, having a thickness of only 0.3 mils, had an Elmendorf Tear resistance of 10 grams or more, similar to the 0.6 mil film of comparative film 3. It is believed that this unexpectedly strong Elmendorf tear-resistance, even in shrink-films having a thickness of only 0.3 mil, is due to the presence of microlayers in such films.

In accordance with an advantageous embodiment of the present invention, therefore, heat-shrinkable film 94 may have a thickness of less than about 0.7 mil and an Elmendorf Tear value (ASTM D1922-06a) of at least 10 grams, as measured in at least one direction along a length or width dimension of film. In terms of material (polymer) savings, film 94 may have an even lower thickness, e.g., less than about 0.65 mil, such as less than about 0.6 mil, less than about 0.55 mil, less than about 0.5 mil, less than about 0.45 mil, less than about 0.4 mil, or less than about 0.35 mil, and still exhibit an Elmendorf Tear resistance of at least about 10 grams.

If desired, all of the microlayers 60 may comprise a single polymer. Alternatively, at least one of the microlayers 60 may comprise a blend of two or more polymers. As indicated in the Examples below, the films in which at least one of the microlayers included a blend of two polymers exhibited particularly good Elmendorf tear-resistance, despite a thickness of only 0.3 mil (see, Examples 4-13). Similarly, the Examples in which the microlayers alternated between two different polymeric compositions, i.e., with every other microlayer having a different composition, also exhibited particularly good Elmendorf Tear resistance.

Significantly, and regardless of the thickness of the shrink film, superior Elmendorf Tear results were found when at least one of the microlayers comprises a blend of two more polymers and has a composition that is different from at least one other microlayer. Thus, for example, microlayer section 60 may comprise a repeating sequence of layers represented by the structure:

A/B, wherein,

A represents a microlayer comprising one or more polymers,

B represents a microlayer comprising a blend of two or more polymers, and

A has a composition that is different from that of B.

The inventors have found that, when microlayer section 60 has the foregoing layer sequence, superior Elmendorf Tear results are obtained, regardless of the thickness of the film. Specifically, it was found that shrink films having the foregoing "A/B" sequence generally exhibit a "normalized" (independent of film thickness) Elmendorf Tear value (ASTM D1922-06a) of at least about 30 grams/mil, as measured in at least one direction along a length or width dimension of the film. This advantageous trend is shown below in Examples 4-13 (0.3 mil), 17 (0.3 mil), 45-49 (0.6 mil), 51 (0.5 mil), 53 (0.75 mil), 55-57 (1.0 mil), and 60-62 (2.0 mil), wherein the inventive films compare favorably with their respective Comparative Examples of the same film thickness.

Thus, for example, the 0.3 mil films of Examples 4-13 and 17 generally have significantly higher normalized Elmendorf Tear than that of the 0.3 mil Comparative Examples 1 and 2 (Tables 1-3). Similarly, the inventive 0.6 mil films of Examples 45-49 exhibit significantly higher normalized Elmendorf Tear than the 0.6 mil Comparative film 3 (Tables 9-10). Likewise, the 0.5 mil film of inventive Example 51 was far greater than that of 0.52 mil Comparative Example 50, while the 0.75 mil inventive films of Example 53 exhibited markedly higher Elmendorf Tear than the counterpart 0.75 mil Comparative Example 52 (Table 11). With respect to the 1 mil and 2 mil films described in the Examples, the same considerations apply, i.e., the Elmendorf Tear values of inventive films 55-57 and 60-62 are higher than the corresponding Comparative films 54 and 58-59, respectively (Tables 11-12). Interestingly, inventive Examples 55 and 60 exhibited improved Elmendorf Tear despite having recycled polymer ("Repro-1"), which conventionally results in reduced Elmendorf Tear.

Also noteworthy is that Examples 17-20 each contain recycled material ("Repro-1" or "Repro-2") in the microlayer section, but only in Example 17 does at least one of the microlayers have a composition that is different from at least one other microlayer. As a result, the Elmendorf Tear of Example 17 is higher than that of the other Examples 18-20. Surprisingly, while the addition of recycled polymer would normally be expected to reduce the Elmendorf Tear of a film, the Elmendorf Tear of Example 17 is higher than that of Comparative examples 1 and 2, which contain no recycled polymer. Similarly, the Elmendorf Tear of the films of Examples 45-47, which contain recycled polymer in the microlayer section, are surprisingly far superior to that of Comparative example 3, which contains no recycled polymer.

The repeating sequence of the "A/B" layers may, as shown in many of the Examples, have no intervening layers, i.e., wherein the microlayer section 60 contains only layers "A" and "B" as described above (with layer "B" being a blend of two or more polymers). Alternatively, one or more intervening layers may be present between the "A" and "B" layers, e.g., a microlayer "C", comprising a polymer or polymer blend that is different from those in the "A" and "B" microlayers, such that the repeating sequence of layers has the structure "A/B/C/A/B/C . . . ", "A/C/B/A/C/B . . . ", etc. Other sequences are, of course, also possible. For instance, the film of inventive Examples 45-46 have the pattern "A/A/B/A/A/B . . . ", while inventive Example 47 has the pattern "A/B/B/A/B/B . . . ." The "A/B" (or A/B/C, A/A/B, A/B/B, etc.) sequence may be repeated as many times as necessary to obtain a desired number of microlayers in microlayer section 60.

In Example 45, microlayer "B" is "Repro-1," which is a blend of recycled polymers. Microlayer B (or A) may comprise between 1 and 50 weight percent recycled polymer, based on the total weight of the film (the use of recycled polymers is described more fully below). More generally, as illustrated in the Examples, microlayers A and/or B may comprise one or more of ethylene/alpha-olefin copolymer, ethylene/vinyl acetate copolymer, polypropylene homopolymers or copolymer, ethylene/methacrylic acid copolymer, maleic anhydride-grafted polyethylene, polyamide, and/or low density polyethylene. The foregoing polymers may be obtained from "virgin" resin and/or from recycled polymer, and may be employed in each layer individually or as blends of two or more of the resins.

Still more generally, in the production of heat-shrinkable films in accordance with the present invention, the fluid layers coextruded by die 12, including both the bulk layers and microlayers, may comprise one or more molten thermoplastic polymers. Examples of such polymers include polyolefins, polyesters (e.g., PET and PETG), polystyrenes, (e.g., modified styrenic polymers such as SEBS, SBS, etc.), polyamide homopolymers and copolymers (e.g. PA6, PA12, PA6/12, etc.), polycarbonates, etc. Within the family of polyolefins, various polyethylene homopolymers and copolymers may be used, as well as polypropylene homopolymers and copolymers (e.g., propylene/ethylene copolymer). Polyethylene homopolymers may include low density polyethylene (LDPE) and high density polyethylene (HDPE). Suitable polyethylene copolymers may include a wide variety of polymers, such as, e.g., ionomers, ethylene/vinyl acetate (EVA), ethylene/vinyl alcohol (EVOH), and ethylene/alpha-olefins, including heterogeneous (Zeigler-Natta catalyzed) and homogeneous (metallocene, single-cite catalyzed) ethylene/alpha-olefin copolymers. Ethylene/alpha-olefin copolymers are copolymers of ethylene with one or more comonomers selected from $C_3$ to $C_{20}$ alpha-olefins, such as 1-butene, 1-pentene, 1-hexene, 1-octene, methyl pentene and the like, including linear low density polyethylene (LLDPE), linear medium density polyethylene (MDPE), very low density polyethylene (VLDPE), and ultra-low density polyethylene (ULDPE).

As alluded to above, a further advantage of the present invention pertains to the use of recycled polymer in heat-shrinkable films. In commercial film-manufacturing operations, the production and accumulation of scrap film is, and has always been, a logistical and economic problem. Scrap film results from a variety of sources—initial production of multilayer films prior to steady-state operation; out-of-spec (improperly formed) film; portions of film that are mechanically trimmed and separated from the main film web in order to achieve a predetermined web width; etc. As may be appreciated, scrap generally cannot be used for its originally-intended commercial application. However, it nevertheless represents an economic and resource investment in polymers derived from the Earth's petroleum and natural gas reserves.

Fortunately, scrap film can be reprocessed, e.g., by grinding, remelting, and pelletizing the scrap, and can then be blended with 'virgin' polymer in the production of many types of films. Unfortunately, the incorporation of such reprocessed scrap polymer in conventional shrink films, particularly thin shrink films having a thickness of less than about 1 mil, has proven quite difficult to achieve in meaningful amounts. For example, it was found that conventional shrink films, having a thickness of 0.6 mil, can include only up to about 16 wt. % recycled polymer. The inclusion of additional recycled polymer was found to result in film breakage during stretch-orientation, e.g., bubble rupture, when stretching using the blown bubble process. For shrink films having a lower thickness, even less recycled polymer can be included. For example, in conventional shrink films having a thickness of 0.3 mil, no recycled polymer could be added to the film; attempts to add any recycled polymer resulted in film breakage during stretch-orientation.

Surprisingly, the inventors discovered that microlayering allows a far greater percentage of recycled polymer to be included in shrink films than when such films are made in a conventional fashion, i.e., without microlayering. This unexpected benefit occurs when at least one of the microlayers comprises recycled polymer. For example, the microlayer section 60 may comprise between 1 and 50 weight percent recycled polymer, based on the total weight of the film. Perhaps even more surprising, the foregoing weight percentages of recycled polymer may be achieved in shrink films having a thickness of only about 0.3 mil, and yet the films did not break during stretch-orientation. As shown below in Example 5, for instance, twelve of the twenty five microlayers in the core contained a blend of 50 wt. % LLDPE and 50 wt. % recycled/reprocessed scrap polymer ("Repro-1"), for a total of about 12.5 wt. % recycled polymer in the film. Not only could the film of Example 5 be successfully stretch-oriented to make a shrink film having a thickness of 0.3 mil, but it exhibited Elemendorf Tear values in excess of 10 grams in both the machine direction and in the transverse direction.

Examples 17-20 were similarly able to be stretch-oriented into a 0.3 mil shrink film, but with much higher amounts of recycled polymer. Example 17 had 36 wt. % recycled polymer, while Example 18 had 40 wt. %, and both had Elmendorf Tear values in excess of 10 grams. Examples 19-20 each had 25 wt. % recycled polymer.

The beneficial increase in the amount of scrap/recycled polymer that can be incorporated into shrink films, as a result of including such recycled polymer in microlayers in accordance with the present invention, allows a further saving of petroleum and natural gas resources, as well as a reduction in landfill space and cost.

Another surprising result of the employment of microlayers in a shrink film is a significant increase in the tensile elongation at yield (ASTM D-882) along the longitudinal/machine direction of the film. As demonstrated in the Examples below, the tensile elongation of films in accordance with the present invention were found to be significantly higher than those of their corresponding comparative films. Such increase is advantage in that shrink films of the invention are less likely to break under a given load than a similar conventional shrink film.

A further unexpected benefit discovered by the inventors was that the employment of microlayers in a shrink film allows the use of less expensive polymers to achieve the same performance characteristics as comparable films having more expensive polymers. In the case of ethylene/alpha-olefin copolymers, for example, ethylene/octene copolymers are generally more expensive but higher-performing than ethylene/hexene copolymers. Examples 8, 9, 15, 19, and 23 below each employ ethylene/hexene copolymer(s) in the microlayered core of such films. As indicated by the test results in Examples 33 and 34, the performance characteristics of such films were on par with the films of the other Examples, which employed more expensive ethylene/octene copolymers in the core. Also, while Comparative film 59 exhibited fairly good Elmendorf Tear, it relies on the inclusion of a relatively expensive/exotic material, SBS (styrene-butadiene-styrene copolymer), in the core of the film, as opposed to the relatively lower-performing/less-expensive polyethylenes used in the inventive films of Examples 60-62. However, the microlayering of such polyethylenes in the shrink films of the present invention unexpectedly improved the Elmendorf Tear of such films, thereby eliminating the need to use expensive and exotic resins to achieve high performance.

Multilayer, heat-shrinkable films in accordance with the present invention preferably have a total free shrink (ASTM D2732-03) of at least about 10% at 200° F., such as about 15% or greater, about 20% or greater, etc. Total free shrink is the sum of the free shrink in both the TD and LD, as tested per ASTM D2732-03.

Figure 8:
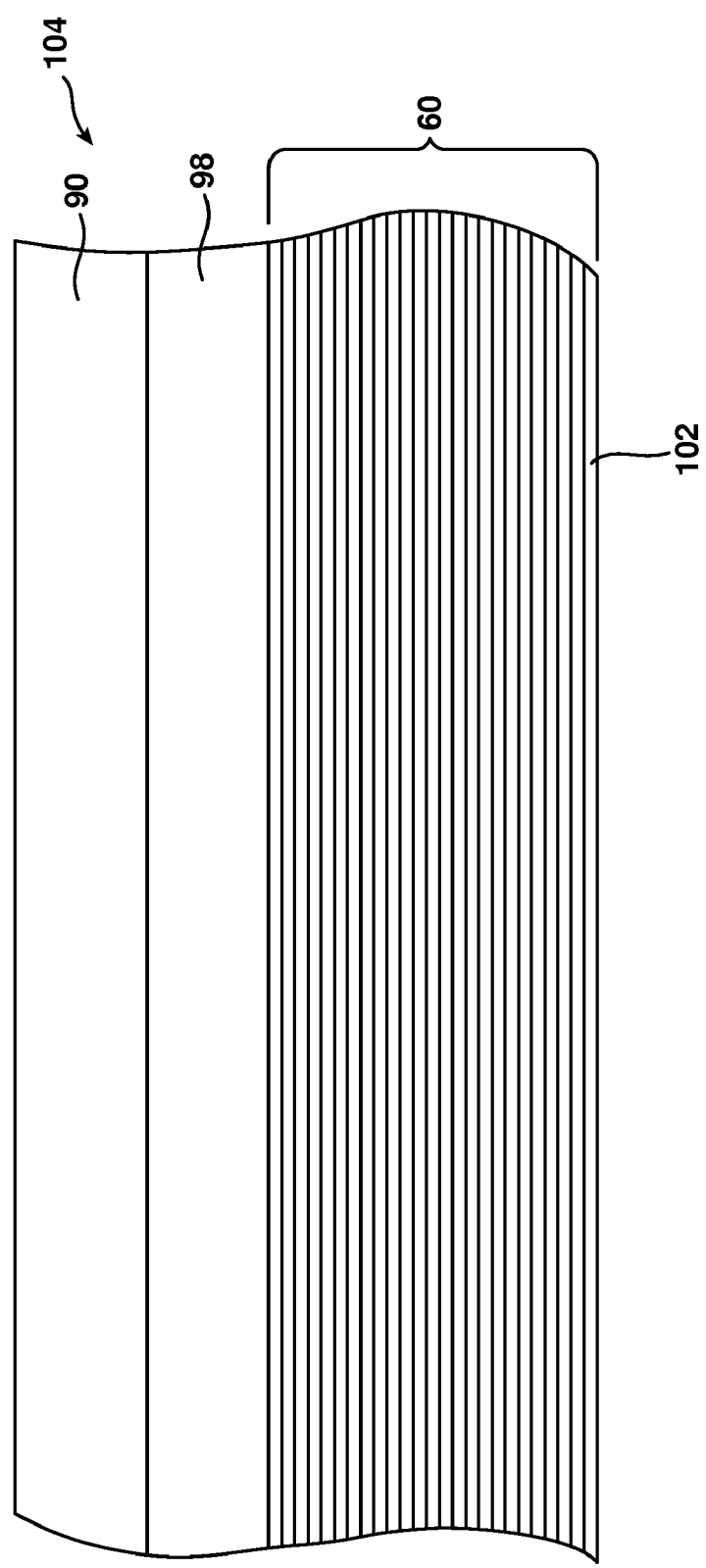
FIG. 8 is a cross-sectional view of an alternative multilayer, heat-shrinkable film, which may also be produced from die 12 as shown in FIG. 2.

FIG. 8 illustrates an alternative embodiment of the invention, in which the microlayer section 60 is positioned at an exterior surface of the film, such that one of the microlayers forms an outer layer 102 for the resultant heat-shrinkable, multilayer film 104. Thus, in contrast to shrink film 94, in which the microlayer section 60 is in the interior of the film, in shrink film 104, the microlayer section 60 is positioned at the outside of the film such that microlayer 102 forms an outer layer for the film. Film 104 may be formed from die 12 as described above in relation to film 94, except that no fluidized polymer would be directed through distribution plates 32d or 32e such that bulk layers 96 and 100 are omitted from the film structure. In the resultant tube 22 that emerges from die 12, bulk layer 90 would thus be the inner-most layer of the tube while microlayer 102 would form the outer-most layer. Such tube 22 is then stretch-oriented as described above, e.g., via the blown bubble or tenterframe process, to make shrink film 104.

As an alternative, shrink film 104 may be converted into a shrink film having a pair of microlayers 102 on both of the opposing outer layers of the film. To make such a film, die 12 may be configured as described immediately above, with the resultant tube 22 being stretch-oriented via the blown bubble process to make shrink film 104 in the form of a heat-shrinkable/expanded tube. Such expanded tube may then be collapsed and welded together such that the inner bulk layer 90 adheres to itself. The resultant shrink film has microlayer section 60 on both outer surfaces of the film, with a pair of bulk layers 90 in the center of the film, and a pair of intermediate bulk layers 98 spaced from one another by the pair of bulk layers 90. In this configuration, a pair of microlayers 102 forms both of the opposing outer layers for the film. Such film thus has microlayered "skins" with one or more bulk layers in the core. If desired, a material may be included at the inner-most layer of the tube to facilitate the welding of the tube to itself, e.g., a layer of EVA or an adhesive, e.g., anhydride-grafted polymer, which may be directed through plate 32a of die 12, with bulk layers 90 and 98 being formed from plates 32b and 32c, respectively. The films described below in Examples 72 and 74-76 were prepared in this manner.

If desired, a second microlayer assembly 34 may be added to die 12, which forms a second microlayer section in the resultant shrink film. Accordingly, another way to form a shrink film having a microlayer section at both outer surfaces of the film is to configure die 12 such the distribution plates 32 are sandwiched between both microlayer assemblies 34. Such configuration will produce a shrink film having microlayered skins with one or more bulk layers in the core, without the need to collapse and weld the inflated tube as described above.

An alternative configuration of die 12 will also result in shrink film 104 as shown in FIG. 8. In such configuration, the supply of fluidized polymer to die 12 may be arranged such that microlayered fluid mass 60 is deposited onto primary forming stem 30 prior to the deposition of bulk layer 90 onto the primary forming stem 30. In this manner, the microlayered fluid mass 60 is interposed between the bulk layer 90 and primary forming stem 30. In this case, with reference to FIG. 2, no fluidized polymer would be supplied to distribution plates 32a-c. Instead, the bulk layer 90 would be formed by supplying fluidized polymer to distribution plate 32e, and the intermediate bulk layer 98 would be formed by supplying fluidized polymer to distribution plate 32d. In the resultant tube 22 that emerges from die 12, bulk layer 90 would thus be the outer-most layer of the tube while microlayer 102 would form the inner-most layer. Such tube 22 is then stretch-oriented as described above, e.g., via the blown bubble or tenterframe process, to make shrink film 104.

The invention will now be further described in the following examples.

EXAMPLES

The materials used in the examples are identified below:
1. MDPE-1: Dowlex 2037; a homogeneous ethylene/octene copolymer medium density polyethylene, having a melt flow index of 2.5 g/10 min (ASTM D-1238), a specific gravity of 0.9350 g/cc (ASTM D-792), a melting point of 124.7° C. (Dow's Internal Method) and a Vicat softening point of 118.9° C. (ASTM D1525); purchased from Dow Chemicals.
2. MDPE-2: M3105; a homogeneous ethylene/octene copolymer medium density polyethylene, having a melt flow index of 2.2 g/10 min (ASTM D-1238), a density of 0.9360 g/cc (ASTM D-1505); purchased from Flint Hill Resources.
3. MDPE-3: Dowlex 2036G; a homogeneous ethylene/octene copolymer medium density polyethylene, having a melt flow index of 2.5 g/10 min (ASTM D-1238), a specific gravity of 0.9370 g/cc (ASTM D-792), a melting point of 125° C. (Dow's Internal Method) and a Vicat softening point of 118.9° C. (ASTM D1525); purchased from Dow Chemicals.
4. EVA-1: EVA 1335; an ethylene/vinyl acetate copolymer with 3.3% vinyl acetate content, giving a melt flow index of 2.0 g/10 min (ASTM D-1238), a density of 0.9240 g/cc (ASTM D-1505) and a melting point of 104.7° C.; purchased from Flint Hill Resources.
5. EVA-2: EF437AA; an ethylene/vinyl acetate copolymer with 2.5% vinyl acetate content, giving a melt flow index of 2.0 g/10 min (ASTM D-1238), a density of 0.9250 g/cc (ASTM D-1505); purchased from Westlake Chemicals.
6. EVA-3: Escorene LD318.92; an ethylene/vinyl acetate copolymer with 8.7% vinyl acetate content, giving a melt flow index of 2.0 g/10 min (ASTM D-1238), a density of 0.9300 g/cc (ASTM D-1505) and a Vicat softening point of 81.1° C. (ASTM D-1525); purchased from Exxon Mobil.
7. EVA-4: Escorene LD761.36; an ethylene/vinyl acetate copolymer with more than 20.0% vinyl acetate content, giving a melt flow index of 5.75 g/10 min (ASTM D-1238), a density of 0.9500 g/cc (ASTM D-1505) and a melting point of 72.0° C. (ASTM D-1525); purchased from Exxon Mobil.
8. MB1: an internally compounded Medium Density Polyethylene masterbatch containing 2.00% n,n'-ethylene bis-stearamide, 1.67% erucamide and 3.33% anhydrous aluminum silicate with a density of 0.955 g/cc (ASTM D-1505).
9. MB2: an internally compounded ethylene/vinyl acetate copolymer masterbatch with 3.29% n,n'-ethylene bis-stearamide, 1.35% erucamide, 1.1% zinc stearate, 1.4% amorphous silica with erucamide, 0.66% amorphous silica with oleamide and 0.70% alkali-alumino-silicate ceramic beads with a density of 0.938 g/cc (ASTM D-1505).
10. MB3: an internally compounded ethylene/vinyl acetate copolymer masterbatch with 1.8% n,n'-ethylene bis-stearamide, 3.8% erucamide, 1.9% oleamide and 1.0% zinc stearate with a density of 0.922 g/cc (ASTM D-1505).
11. MB4: an internally compounded Medium Density Polyethylene masterbatch containing 3.00% n,n'-ethylene bis-stearamide, 4.00% erucamide and 3.00% anhydrous aluminum silicate with a density of 0.955 g/cc (ASTM D-1505).
12. MB5: an internally compounded ethylene/vinyl acetate copolymer masterbatch with 3.30% n,n'-ethylene bis-stearamide, 1.70% diatomaceous earth.
13. MB6: an internally compounded ethylene/vinyl acetate copolymer masterbatch with 3.30% n,n'-ethylene bis-stearamide, 1.70% diatomaceous earth, 0.80% behenamide and 3.4% erucamide with a density of 0.933 g/cc.
14. VLDPE-1: Exceed 1012CA; an ethylene/hexene copolymer very low density polyethylene, produced by single site metallocene catalysis, with a melt index of 1.0 g/10 min (ASTM D-1238) and a density of 0.912 g/cc (ASTM D-1505); purchased from Exxon Mobil.
15. VLDPE-2: Affinity PF 1140G; a branched ethylene/octene copolymer very low density polyethylene, produced by INSITE technology, with a melt index of 1.60 g/10 min (ASTM D-1238) and a specific gravity of 0.8990 g/cc (ASTM D-792) having 14% octane content, a Vicat softening point of 77° C. (ASTM D-1525) and a melting point of 96.1° C. (Dow's Internal Method): purchased from Dow Chemicals.
16. VLDPE-3: Affinity PL 1881G; a branched ethylene/octene copolymer very low density polyethylene, produced by INSITE technology, with a melt index of 1.00 g/10 min (ASTM D-1238) and a specific gravity of 0.906 g/cc (ASTM D-79.2), a Vicat softening point of 86.1° C. (ASTM D-1525) and a melting point of 100° C. (Dow's Internal Method); purchased from Dow Chemicals.
17. VLDPE-4: Exact 3132; a linear ethylene/hexene copolymer very low density polyethylene, produced by single site catalyst, with a melt index of 1.20 g/10 min (ASTM D-1238) and a density of 0.900 g/cc (ASTM D-1505) a Vicat softening point of 87.6° C. and a melting point of 96.0° C.; purchased from ExxonMobil.
18. VLDPE-5: Attane 4203; a linear ethylene/octene copolymer very low density polyethylene, produced by Ziegler-Natta catalyst, with a melt index of 0.80 g/10 min (ASTM D-1238), a specific gravity of 0.9070 g/cc (ASTM D-792 a Vicat softening point of 83.8° C. (ASTM D-1525) and a melting point of 122.8° C. (Dow's Internal Method); purchased from Dow Chemicals.
19. SBS-1: Styroflex 2G 66: a styrene-butadiene block copolymer with at least 65% styrene content and at least 70% butadiene content having a melt flow of 12.5 g/cc (ASTM D-1238), a specific gravity of 1.000 g/cc (ASTM D-792) and a Vicat softening point of 47.8° C. (ASTM D-1525); purchased from BASF.
20. SBS-2: Styrolux HS 70; a styrene/butadiene copolymer having a melt flow of 13.0 g/cc (ASTM D-1238), a specific gravity of 1.020 g/cc (ASTM D-792) and a Vicat softening point of 72.2° C. (ASTM D-1525); purchased from BASF.
21. LLDPE-1: Dowlex 2045; a homogeneous ethylene/octene copolymer, having a melt flow index of 1.0 g/10 min (ASTM D-1238), a specific gravity of 0.9200 g/cc (ASTM D-792), a Vicat softening point of 107.8° C. (ASTM D-1525) and a melting temperature of 122.2° C. (Dow's Internal Method); purchased from Dow Chemicals.
22. LLDPE-2: LL 3001.63; a linear ethylene/hexene copolymer made using Ziegler-Natta catalyst in gas phase having a melt flow index of 1.0 g/10 min (ASTM D-1238), a density of 0.917 g/cc (ASTM D-1505) and a melting temperature of 125° C.; purchased from ExxonMobil.
23. LLDPE-3: SC74858-F; a linear ethylene/hexene copolymer made using Ziegler-Natta catalyst in gas phase having a melt flow index of 0.5 g/10 min (ASTM D-1238), a density of 0.917 g/cc (ASTM D-1505) and melting temperature of 121° C.; purchased from Westlake Chemical.
24. LLDPE-4: LL 10001.32; a linear ethylene/butene copolymer made using Ziegler-Natta catalyst in gas phase having a melt flow index of 1.0 g/10 min (ASTM D-1238), a density of 0.918 g/cc (ASTM D-1505) and a melting temperature of 121° C.; purchased from ExxonMobil.
25. Repro-1: an in-house reclaim of reprocessed, scrap multipurpose shrink film, which contained approximately 93.0% ethylene/octene copolymer, 6.0% ethylene/vinyl acetate copolymer and less than 1.0% other additives.
26. Repro-2: an in-house reclaim of reprocessed, scrap laminate films containing approximately 22% polypropylene, 8% linear low density polyethylene, 20% zinc neutralized ethylene methacrylic acid polymer, 15% maleic anhydride grafter polyethylene, 24% total polyamide 6 and 6/66 and 10% ethylene-vinyl acetate copolymer.
27. Repro-3: an in-house reclaim of reprocessed, scrap laminate films containing approximately 50.6% linear low density polyethylene, 13.5% low density polyethylene, 30.0% polyamide 6 and 5.9% hydrolyzed-ethylene-vinyl acetate copolymer.

Example 1

Comparative

A comparative multilayer film was made and had the following three-layer structure with a total film thickness of 0.30 mils:
Layer 1: 44% MDPE-1+40% EVA-1+16% MB1 (20% of total thickness of layers 1-3)
Layer 2: 60% LLDPE-1+40% MDPE-1 (60% of total thickness layers 1-3)
Layer 3: 44% MDPE-1+40% EVA-1+16% MB1 (20% of total thickness layers 1-3)

The film was fully coextruded and then stretch-oriented by the blown bubble coextrusion process as described above and, e.g., in U.S. Pat. Nos. 3,022,543 and 4,551,380. The film was first coextruded as tape using an annular 5-layer or 3-layer die, followed by a water quench upon exiting the die. The tape was then subjected to electron beam irradiation to promote cross-linking, at a dosage of between 15 and 35 kGy (approximated values), and then preheated in an oven for orientation. The tape was then oriented as a bubble at an orientation ratio of approximately 5×5 in both the Longitudinal Direction (LD) and Transverse Direction (TD). An air ring was used to quench the oriented film. The bubble was then collapsed and wound into a film roll.

Example 2

Comparative

A comparative multilayer film was made by the process described above for Comparative Example 1, and had the following five-layer structure with a total film thickness of 0.30 mils:
Layer 1: 44.5% LLDPE-1+22.1% MDPE-1+13.4% EVA-1+20% MB2 (12.5% of total thickness of layers 1-5)
Layer 2: 44.5% LLDPE-1+22.1% MDPE-1+13.4% EVA-1+20% MB3 (12.5% of total thickness of layers 1-5)
Layer 3: LLDPE-1 (50.0% of total thickness of layers 1-5)
Layer 4: 44.5% LLDPE-1+22.1% MDPE-1+13.4% EVA-1+20% MB3 (12.5% of total thickness of layers 1-5)
Layer 5: 44.5% LLDPE-1+22.1% MDPE-1+13.4% EVA-1+20% MB2 (12.5% of total thickness of layers 1-5)

Example 3

Comparative

A comparative multilayer film was made by the process described above for Comparative Example 1, and had the following five-layer structure with total film thickness of 0.60 mils:
Layer 1: 47.8% LLDPE-1+27.6% MDPE-1+14.5% EVA-1+14% MB2 (12.5% of total thickness of layers 1-5)
Layer 2: 47.8% LLDPE-1+27.6% MDPE-1+14.5% EVA-1+14% MB3 (12.5% of total thickness of layers 1-5)

Layer 3: LLDPE-1 (50.0% of total thickness of layers 1-5)
Layer 4: 47.8% LLDPE-1+27.6% MDPE-1+14.5% EVA-1+ 14% MB3 (12.5% of total thickness of layers 1-5)
Layer 5: 47.8% LLDPE-1+27.6% MDPE-1+14.5% EVA-1+ 14% MB2 (12.5% of total thickness of layers 1-5)

Example 4

A multilayer film in accordance with the present invention was made and had the following twenty nine-layer structure, with a total film thickness of 0.30 mils:
Layers 1, 2: 44% MDPE-1+40% EVA-1+16% MB1 (20% of total thickness of layers 1-29)
Layers 3, 5, 7, 9, 11, 13, 15, 17, 19, 21, 23, 25, 27:
 LLDPE-1 (1.54% of total thickness of layers 1-29)
Layers 4, 6, 8, 10, 12, 14, 16, 18, 20, 22, 24, 26:
 30% MDPE-1+70% LLDPE-1 (3.33% of total thickness of layers 1-29)
Layer 28, 29: 44% MDPE-1+40% EVA-1+16% MB1 (20% of total thickness of layers 1-29)

The film was fully coextruded and stretch-oriented via a blown bubble process as in Example 1. However, the film was first coextruded as a tape using an annular 29-layer multilayer die, followed by a water quench upon exiting the die. The die was as described above and illustrated in FIG. 2, except that the microlayer assembly included a total of 25 microlayer distribution plates. Fluidized (molten) polymer was supplied to each of the microlayer distribution plates. Fluidized polymer was supplied only to distribution plates 32*a*, *b*, *d*, and *e*; no polymer was supplied to plate 32*c*. The resultant 29-layer structure comprised a core with 25 microlayers (layers 3-27), plus 4 thicker layers (layers 1-2 and 28-29). Thick layers 1-2 were positioned on one side of the core and thick layers 28-29 were positioned on the other side of the core, with layer 1 forming one of the outer layers and layer 29 forming the other outer layer.

After extrusion, the tape was transported through a cross linking unit, in which it was irradiated with electron beams at between 15 and 35 kGy (approximated values), and then heated to its orientation temperature in an oven. The tape was then oriented into a bubble at an orientation ratio of approximately 5×5 in the Longitudinal Direction (LD) and the Transverse Direction (TD) upon exiting the oven, and cooled by air blown from an annular ring. The bubble was then collapsed and wound into a film roll.

Example 5

A multilayer film in accordance with the present invention was made by the process described above for Inventive Example 4, and had the following twenty nine-layer structure with total film thickness of 0.30 mils:
Layer 1: 44.5% LLDPE-1+22.1% MDPE-1+13.4% EVA-1+ 20% MB2 (12.5% of total thickness of layers 1-29)
Layer 2: 44.5% LLDPE-1+22.1% MDPE-1+13.4% EVA-1+ 20% MB3 (12.5% of total thickness of layers 1-29)
Layers 3, 5, 7, 9, 11, 13, 15, 17, 19, 21, 23, 25, 27:
 LLDPE-1 (1.92% of total thickness of layers 1-29)
Layers 4, 6, 8, 10, 12, 14, 16, 18, 20, 22, 24, 26:
 50% LLDPE-1+50% Repro-1 (2.09% of total thickness of layers 1-29)
Layer 28: 44.5% LLDPE-1+22.1% MDPE-1+13.4% EVA-1+20% MB3 (12.5% of total thickness of layers 1-29)
Layer 29: 44.5% LLDPE-1+22.1% MDPE-1+13.4% EVA-1+20% MB2 (12.5% of total thickness of layers 1-29)

Example 6

A multilayer film in accordance with the present invention was made by the process described above for Inventive Example 4, and had the following twenty nine-layer structure with total film thickness of 0.30 mils:
Layers 1, 2: 42% MDPE-1+38% EVA-1+20% MB4 (25.0% of total thickness of layers 1-29)
Layers 3, 5, 7, 9, 11, 13, 15, 17, 19, 21, 23, 25, 27:
 VLDPE-3 (1.92% of total thickness of layers 1-29)
Layers 4, 6, 8, 10, 12, 14, 16, 18, 20, 22, 24, 26:
 60% LLDPE-1+40% MDPE-1 (2.08% of total thickness of layers 1-29)
Layer 28, 29: 42% MDPE-1+38% EVA-1+20% MB4 (25.0% of total thickness of layers 1-29)

Example 7

A multilayer film in accordance with the present invention was made by the process described above for Inventive Example 4, and had the following twenty nine-layer structure with total film thickness of 0.30 mils:
Layers 1, 2: 42%-44% MDPE-2 (or 42%-44% MDPE-3)+ 38%-40% EVA-2+16%-20% MB4 (20.0% of total thickness of layers 1-29)
Layers 3, 5, 7, 9, 11, 13, 15, 17, 19, 21, 23, 25, 27:
 LLDPE-1 (1.5% of total thickness of layers 1-29)
Layers 4, 6, 8, 10, 12, 14, 16, 18, 20, 22, 24, 26:
 40% MDPE-2 (or 40% of MDPE-3)+60% LLDPE-1 (3.3% of total thickness of layers 1-29)
Layer 28, 29: 42%-44% MDPE-2 (or 42%-44% MDPE-3)+ 38%-40% EVA-2+16%-20% MB4 (20.0% of total thickness of layers 1-29)

Example 8

A multilayer film in accordance with the present invention was made by the process described above for Inventive Example 4, and had the following twenty nine-layer structure with total film thickness of 0.30 mils:
Layers 1, 2: 42% MDPE-1+38% EVA-1+20% MB4 (20.0% of total thickness of layers 1-29)
Layers 3, 5, 7, 9, 11, 13, 15, 17, 19, 21, 23, 25, 27:
 50% VLDPE-1+50% LLDPE-2 (2.31% of total thickness of layers 1-29)
Layers 4, 6, 8, 10, 12, 14, 16, 18, 20, 22, 24, 26:
 LLDPE-2 (2.50% of total thickness of layers 1-29)
Layer 28, 29: 42% MDPE-1+38% EVA-1+22% MB4 (20.0% of total thickness of layers 1-29)

Example 9

A multilayer film in accordance with the present invention was made by the process described above for Inventive Example 4, and had the following twenty nine-layer structure with total film thickness of 0.30 mils:
Layers 1, 2: 42% MDPE-1+38% EVA-1+20% MB4 (20.0% of total thickness of layers 1-29)
Layers 3, 5, 7, 9, 11, 13, 15, 17, 19, 21, 23, 25, 27:
 50% VLDPE-4+50% LLDPE-3 (2.31% of total thickness of layers 1-29)
Layers 4, 6, 8, 10, 12, 14, 16, 18, 20, 22, 24, 26:
 LLDPE-3 (2.5% of total thickness of layers 1-29)
Layer 28, 29: 42% MDPE-1+38% EVA-1+20% MB4 (20.0% of total thickness of layers 1-29)

Example 10

A multilayer film in accordance with the present invention was made by the process described above for Inventive Example 4, and had the following twenty nine-layer structure with total film thickness of 0.30 mils:
Layers 1, 2: 42% MDPE-1+38% EVA-1+20% MB4 (20.0% of total thickness of layers 1-29)
Layers 3, 5, 7, 9, 11, 13, 15, 17, 19, 21, 23, 25, 27:
  50% VLDPE-5+50% LLDPE-1 (1.92% of total thickness of layers 1-29)
Layers 4, 6, 8, 10, 12, 14, 16, 18, 20, 22, 24, 26:
  LLDPE-1 (2.92% of total thickness of layers 1-29)
Layer 28, 29: 42% MDPE-1+38% EVA-1+20% MB4 (20.0% of total thickness of layers 1-29)

Example 11

A multilayer film in accordance with the present invention was made by the process described above for Inventive Example 4, and had the following twenty nine-layer structure with total film thickness of 0.30 mils:
Layers 1, 2: 42% MDPE-1+38% EVA-1+20% MB4 (20.0% of total thickness of layers 1-29)
Layers 3, 5, 7, 9, 11, 13, 15, 17, 19, 21, 23, 25, 27:
  VLDPE-5 (1.54% of total thickness of layers 1-29)
Layers 4, 6, 8, 10, 12, 14, 16, 18, 20, 22, 24, 26:
  60% LLDPE-1+40% MDPE-2 (3.33% of total thickness of layers 1-29)
Layer 28, 29: 42% MDPE-1+38% EVA-1+20% MB4 (20.0% of total thickness of layers 1-29)

Example 12

A multilayer film in accordance with the present invention was made by the process described above for Inventive Example 4, and had the following twenty nine-layer structure with total film thickness of 0.30 mils:
Layers 1, 2: 42% MDPE-1+38% EVA-1+20% MB4 (25.0% of total thickness of layers 1-29)
Layers 3, 5, 7, 9, 11, 13, 15, 17, 19, 21, 23, 25, 27:
  60% LLDPE-1+40% VLDPE-2 (1.92% of total thickness of layers 1-29)
Layers 4, 6, 8, 10, 12, 14, 16, 18, 20, 22, 24, 26:
  50% MDPE-2+50% LLDPE-1 (2.08% of total thickness of layers 1-29)
Layer 28, 29: 42% MDPE-1+38% EVA-1+20% MB4 (25.0% of total thickness of layers 1-29)

Example 13

A multilayer film in accordance with the present invention was made by the process described above for Example 4, except stretch oriented as a bubble at an orientation ratio of 6×6 (TD×LD). The film had the following twenty nine-layer structure with total film thickness of 0.30 mils:
Layers 1, 2: 44% MDPE-1+40% EVA-1+16% MB1 (20% of total thickness of layers 1-29)
Layers 3, 5, 7, 9, 11, 13, 15, 17, 19, 21, 23, 25, 27:
  LLDPE-1 (2.31% of total thickness of layers 1-29)
Layers 4, 6, 8, 10, 12, 14, 16, 18, 20, 22, 24, 26:
  50% MDPE-1+50% LLDPE-1 (2.50% of total thickness of layers 1-29)
Layer 28, 29: 44% MDPE-1+40% EVA-1+16% MB1 (20% of total thickness of layers 1-29)

Example 14

A multilayer film in accordance with the present invention was made by the process described above for Example 4, except stretch oriented as a bubble at an orientation ratio of 6×6 (TD×LD). The film had the following twenty nine-layer structure with total film thickness of 0.30 mils:
Layer 1: 44.5% LLDPE-1+22.1% MDPE-1+13.4% EVA-1+20% MB2 (12.5% of total thickness of layers 1-29)
Layer 2: 44.5% LLDPE-1+22.1% MDPE-1+13.4% EVA-1+20% MB3 (12.5% of total thickness of layers 1-29)
Layers 3 to 27:
  LLDPE-1 (2.0% of total thickness of layers 1-29)
Layer 28: 44.5% LLDPE-1+22.1% MDPE-1+13.4% EVA-1+20% MB3 (12.5% of total thickness of layers 1-29)
Layer 29: 44.5% LLDPE-1+22.1% MDPE-1+13.4% EVA-1+20% MB2 (12.5% of total thickness of layers 1-29)

Example 15

A multilayer film in accordance with the present invention was made by the process described above for Example 4, except stretch oriented as a bubble at an orientation ratio of 6×6 (TD×LD). The film had the following twenty nine-layer structure with total film thickness of 0.30 mils:
Layer 1: 40% MDPE-1+40% EVA-1+20% MB4 (20% of total thickness of layers 1-29)
Layer 2: 40% MDPE-1 (or 40% MDPE-2)+60% LLDPE-1 (10% of total thickness of layers 1-29)
Layers 3, 5, 7, 9, 11, 13, 15, 17, 19, 21, 23, 25, 27:
  VLDPE-1 (1.54% of total thickness of layers 1-29)
Layers 4, 6, 8, 10, 12, 14, 16, 18, 20, 22, 24, 26:
  LLDPE-1 (1.67% of total thickness of layers 1-29)
Layer 28: 40% MDPE-1 (or 40% MDPE-2)+60% LLDPE-1 (10% of total thickness of layers 1-29)
Layer 29: 40% MDPE-1+40% EVA-1+20% MB4 (20% of total thickness of layers 1-29)

Example 16

A multilayer film in accordance with the present invention was made by the process described above for Inventive Example 4, and had the following twenty nine-layer structure with total film thickness of 0.30 mils:
Layer 1: 44.5% LLDPE-1+22.1% MDPE-1+13.4% EVA-1+20% MB2 (12.5% of total thickness of layers 1-29)
Layer 2: 44.5% LLDPE-1+22.1% MDPE-1+13.4% EVA-1+20% MB3 (12.5% of total thickness of layers 1-29)
Layers 3 to 27:
  LLDPE-1 (2.0% of total thickness of layers 1-29)
Layer 28: 44.5% LLDPE-1+22.1% MDPE-1+13.4% EVA-1+20% MB3 (12.5% of total thickness of layers 1-29)
Layer 29: 44.5% LLDPE-1+22.1% MDPE-1+13.4% EVA-1+20% MB2 (12.5% of total thickness of layers 1-29)

Example 17

A multilayer film in accordance with the present invention was made by the process described above for Inventive Example 4, except that 36 wt. % recycled material ("Repro-1") was added to the microlayer section; the resultant film had the following twenty nine-layer structure with total film thickness of 0.30 mils:
Layer 1: 42% MDPE-1+38% EVA-2+20% MB4 (10% of total thickness of layers 1-29)
Layer 2: 42% MDPE-1+38% EVA-2+20% MB4 (10% of total thickness of layers 1-29)
Layers 3, 5, 7, 9, 11, 13, 15, 17, 19, 21, 23, 25, 27:
  LLDPE-1 (1.54% of total thickness of layers 1-29)
Layers 4, 6, 8, 10, 12, 14, 16, 18, 20, 22, 24, 26:
  10% LLDPE-1+90% Repro-1 (3.33% of total thickness of layers 1-29)

Layer 28: 42% MDPE-1+38% EVA-2+20% MB4 (10% of total thickness of layers 1-29)
Layer 29: 42% MDPE-1+38% EVA-2+20% MB4 (10% of total thickness of layers 1-29)

Example 18

A multilayer film in accordance with the present invention was made by the process described above for Inventive Example 4, except that 40 wt. % recycled material ("Repro-1") was added to the microlayer section; the resultant film had the following twenty nine-layer structure with total film thickness of 0.30 mils:
Layer 1: 42% MDPE-1+38% EVA-2+20% MB4 (10% of total thickness of layers 1-29)
Layer 2: 42% MDPE-1+38% EVA-2+20% MB4 (10% of total thickness of layers 1-29)
Layers 3, 5, 7, 9, 11, 13, 15, 17, 19, 21, 23, 25, 27:
  60% LLDPE-1+40% Repro-1 (1.54% of total thickness of layers 1-29)
Layers 4, 6, 8, 10, 12, 14, 16, 18, 20, 22, 24, 26:
  20% LLDPE-1+80% Repro-1 (3.33% of total thickness of layers 1-29)
Layer 28: 42% MDPE-1+38% EVA-2+20% MB4 (10% of total thickness of layers 1-29)
Layer 29: 42% MDPE-1+38% EVA-2+20% MB4 (10% of total thickness of layers 1-29)

Example 19

A multilayer film in accordance with the present invention was made by the process described above for Inventive Example 4, except that 25 wt. % recycled material ("Repro-1") was added to the microlayer section; the resultant film had the following twenty nine-layer structure with total film thickness of 0.30 mils:
Layer 1: 44.5% LLDPE-1+22.1% MDPE-1+13.4% EVA-1+20% MB2 (12.5% of total thickness of layers 1-29)
Layer 2: 44.5% LLDPE-1+22.1% MDPE-1+13.4% EVA-1+20% MB3 (12.5% of total thickness of layers 1-29)
Layers 3 to 27:
  50% LLDPE-1+50% Repro-1 (2.0% of total thickness of layers 1-29)
Layer 28: 44.5% LLDPE-1+22.1% MDPE-1+13.4% EVA-1+20% MB3 (12.5% of total thickness of layers 1-29)
Layer 29: 44.5% LLDPE-1+22.1% MDPE-1+13.4% EVA-1+20% MB2 (12.5% of total thickness of layers 1-29

Example 20

A multilayer film in accordance with the present invention was made by the process described above for Inventive Example 4, except that 25 wt. % recycled material ("Repro-2") was added to the microlayer section; the resultant film had the following twenty nine-layer structure with total film thickness of 0.30 mils:
Layer 1: 44.5% LLDPE-1+22.1% MDPE-1+13.4% EVA-1+20% MB2 (12.5% of total thickness of layers 1-29)
Layer 2: 44.5% LLDPE-1+22.1% MDPE-1+13.4% EVA-1+20% MB3 (12.5% of total thickness of layers 1-29)
Layers 3 to 27:
  50% LLDPE-1+50% Repro-2 (2.0% of total thickness of layers 1-29)
Layer 28: 44.5% LLDPE-1+22.1% MDPE-1+13.4% EVA-1+20% MB3 (12.5% of total thickness of layers 1-29)
Layer 29: 44.5% LLDPE-1+22.1% MDPE-1+13.4% EVA-1+20% MB2 (12.5% of total thickness of layers 1-29)

Example 21

A multilayer film in accordance with the present invention was made by the process described above for Inventive Example 4, and had the following twenty nine-layer structure with total film thickness of 0.30 mils:
Layer 1: 40% MDPE-1+40% EVA-1+20% MB4 (20% of total thickness of layers 1-29)
Layer 2: 40% MDPE-1 (or 40% MDPE-2)+60% LLDPE-1 (10% of total thickness of layers 1-29)
Layers 3, 5, 7, 9, 11, 13, 15, 17, 19, 21, 23, 25, 27:
  LLDPE-1 (1.54% of total thickness of layers 1-29)
Layers 4, 6, 8, 10, 12, 14, 16, 18, 20, 22, 24, 26:
  VLDPE-1 (1.67% of total thickness of layers 1-29)
Layer 28: 40% MDPE-1 (or 40% MDPE-2)+60% LLDPE-1 (10% of total thickness of layers 1-29)
Layer 29: 40% MDPE-1+40% EVA-1+20% MB4 (20% of total thickness of layers 1-29)

Example 22

A multilayer film in accordance with the present invention was made by the process described above for Example 4, except stretch oriented as a bubble at an orientation ratio of 6×6 (TD×LD). The film had the following twenty nine-layer structure with total film thickness of 0.30 mils:
Layers 1, 2: 42% MDPE-1+38% EVA-1+20% MB4 (25.91% of total thickness of layers 1-29)
Layers 3, 5, 7, 9, 11, 13, 15, 17, 19, 21, 23, 25, 27:
  VLDPE-2 (2.21% of total thickness of layers 1-29)
Layers 4, 6, 8, 10, 12, 14, 16, 18, 20, 22, 24, 26:
  SBS-2 (1.62% of total thickness of layers 1-29)
Layer 28, 29: 42% MDPE-1+38% EVA-1+20% MB4 (25.91% of total thickness of layers 1-29)

Example 23

A multilayer film in accordance with the present invention was made by the process described above for Inventive Example 4, and had the following twenty nine-layer structure with total film thickness of 0.30 mils:
Layers 1, 2: 42% MDPE-1+38% EVA-1+20% MB4 (25.0% of total thickness of layers 1-29)
Layers 3, 5, 7, 9, 11, 13, 15, 17, 19, 21, 23, 25, 27:
  VLDPE-3 (1.92% of total thickness of layers 1-29)
Layers 4, 6, 8, 10, 12, 14, 16, 18, 20, 22, 24, 26:
  LLDPE-1 (2.08% of total thickness of layers 1-29)
Layer 28, 29: 42% MDPE-1+38% EVA-1+20% MB4 (25.0% of total thickness of layers 1-29)

Example 24

A multilayer film in accordance with the present invention was made by the process described above for Inventive Example 4, and had the following twenty nine-layer structure with total film thickness of 0.30 mils:
Layers 1, 2: 42% MDPE-1+38% EVA-1+20% MB4 (25.0% of total thickness of layers 1-29)
Layers 3, 5, 7, 9, 11, 13, 15, 17, 19, 21, 23, 25, 27:
  EVA-3 (1.92% of total thickness of layers 1-29)

Layers 4, 6, 8, 10, 12, 14, 16, 18, 20, 22, 24, 26:
  MDPE-2 (2.08% of total thickness of layers 1-29)
Layer 28, 29: 42% MDPE-1+38% EVA-1+20% MB4 (25.0% of total thickness of layers 1-29)

Example 25

A multilayer film in accordance with the present invention was made by the process described above for Inventive Example 4, and had the following twenty nine-layer structure with total film thickness of 0.30 mils:
Layers 1, 2: 42% MDPE-1+38% EVA-1+20% MB4 (20.0% of total thickness of layers 1-29)
Layers 3, 5, 7, 9, 11, 13, 15, 17, 19, 21, 23, 25, 27:
  VLDPE-1 (1.54% of total thickness of layers 1-29)
Layers 4, 6, 8, 10, 12, 14, 16, 18, 20, 22, 24, 26:
  LLDPE-2 (3.33% of total thickness of layers 1-29)
Layer 28, 29: 42% MDPE-1+38% EVA-1+20% MB4 (20.0% of total thickness of layers 1-29

In the following Examples 26-35, the described films were made in accordance with Example 4, except that "melt ripples" (areas of non-uniform thickness) in the tape prevented the tape from being oriented as a bubble. It is believed that such melt ripples resulted from excessive differences in the viscosities of adjacently-positioned polymers in the microlayer section. Melt rippling can thus be avoided by routine experimentation, e.g., by selecting polymers for adjacent positioning in the microlayer section that have melt flow indices that are as close as possible while still providing the properties desired of such polymers.

Example 26

A multilayer film was coextruded through an annular 29-layer die, and had the following structure:
Layers 1, 2: 42% MDPE-1+38% EVA-1+20% MB4 (25% of total thickness of layers 1-29)
Layers 3, 5, 7, 9, 11, 13, 15, 17, 19, 21, 23, 25, 27:
  VLDPE-2 (2.68% of total thickness of layers 1-29)
Layers 4, 6, 8, 10, 12, 14, 16, 18, 20, 22, 24, 26:
  SBS-2 (1.26% of total thickness of layers 1-29)
Layer 28, 29: 42% MDPE-1+38% EVA-1+20% MB4 (25% of total thickness of layers 1-29)

Example 27

A multilayer film was coextruded through an annular 29-layer die, and had the following structure:
Layers 1, 2: 42% MDPE-1+38% EVA-1+20% MB4 (25.0% of total thickness of layers 1-29)
Layers 3, 5, 7, 9, 11, 13, 15, 17, 19, 21, 23, 25, 27:
  VLDPE-2 (1.9% of total thickness of layers 1-29)
Layers 4, 6, 8, 10, 12, 14, 16, 18, 20, 22, 24, 26:
  MDPE-1 (2.1% of total thickness of layers 1-29)
Layer 28, 29: 42% MDPE-1+38% EVA-1+20% MB4 (25.0% of total thickness of layers 1-29)

Example 28

A multilayer film was coextruded through an annular 29-layer die, and had the following structure:
Layers 1, 2: 42% MDPE-1+38% EVA-1+20% MB4 (20.0% of total thickness of layers 1-29)
Layers 3, 5, 7, 9, 11, 13, 15, 17, 19, 21, 23, 25, 27:
  VLDPE-4 (1.54% of total thickness of layers 1-29)
Layers 4, 6, 8, 10, 12, 14, 16, 18, 20, 22, 24, 26:
  LLDPE-2 or LLDPE-3 (3.33% of total thickness of layers 1-29)
Layer 28, 29: 42% MDPE-1+38% EVA-1+20% MB4 (20.0% of total thickness of layers 1-29)

Example 29

A multilayer film was coextruded through an annular 29-layer die, and had the following structure:
Layers 1, 2: 42% MDPE-1+38% EVA-1+20% MB4 (20.0% of total thickness of layers 1-29)
Layers 3, 5, 7, 9, 11, 13, 15, 17, 19, 21, 23, 25, 27:
  40% VLDPE-2+60% LLDPE-1 (3.08% of total thickness of layers 1-29)
Layers 4, 6, 8, 10, 12, 14, 16, 18, 20, 22, 24, 26:
  MDPE-2 (1.67% of total thickness of layers 1-29)
Layer 28, 29: 42% MDPE-1+38% EVA-1+22% MB4 (20.0% of total thickness of layers 1-29)

Example 30

A multilayer film was coextruded through an annular 29-layer die, and had the following structure:
Layers 1, 2: 44% MDPE-1+40% EVA-1+16% MB1 (20.0% of total thickness of layers 1-29)
Layers 3, 5, 7, 9, 11, 13, 15, 17, 19, 21, 23, 25, 27:
  LLDPE-1 (2.77% of total thickness of layers 1-29)
Layers 4, 6, 8, 10, 12, 14, 16, 18, 20, 22, 24, 26:
  MDPE-1 (2.00% of total thickness of layers 1-29)
Layer 28, 29: 44% MDPE-1+40% EVA-1+16% MB1 (20.0% of total thickness of layers 1-29)

Example 31

A multilayer film was coextruded through an annular 29-layer die, and had the following structure:
Layers 1, 2: 44% MDPE-1+40% EVA-1+16% MB1 (20.0% of total thickness of layers 1-29)
Layers 3, 5, 7, 9, 11, 13, 15, 17, 19, 21, 23, 25, 27:
  LLDPE-1 (2.31% of total thickness of layers 1-29)
Layers 4, 6, 8, 10, 12, 14, 16, 18, 20, 22, 24, 26:
  80% MDPE-1+20% LLDPE-1 (2.50% of total thickness of layers 1-29)
Layer 28, 29: 44% MDPE-1+40% EVA-1+16% MB1 (20.0% of total thickness of layers 1-29)

Example 32

A multilayer film was coextruded through an annular 29-layer die, and had the following structure:
Layer 1: 40% MDPE-1+40% EVA-1+20% MB4 (20% of total thickness of layers 1-29)
Layer 2: MDPE-1 (10% of total thickness of layers 1-29)
Layers 3, 5, 7, 9, 11, 13, 15, 17, 19, 21, 23, 25, 27:
  VLDPE-1 (1.54% of total thickness of layers 1-29)
Layers 4, 6, 8, 10, 12, 14, 16, 18, 20, 22, 24, 26:
  LLDPE-1 (1.67% of total thickness of layers 1-29)
Layer 28: MDPE-1 (10% of total thickness of layers 1-29)
Layer 29: 40% MDPE-1+40% EVA-1+20% MB4 (20% of total thickness of layers 1-29)

Example 33

A multilayer film was coextruded through an annular 29-layer die, and had the following structure:
Layer 1: 40% MDPE-1+40% EVA-1+20% MB4 (16.5% of total thickness of layers 1-29)
Layer 2: 40% MDPE-1+40% VLDPE-1+20% MB4 (13% of total thickness of layers 1-29)
Layers 3, 5, 7, 9, 11, 13, 15, 17, 19, 21, 23, 25, 27:
    SBS-1 (1.53% of total thickness of layers 1-29)
Layers 4, 6, 8, 10, 12, 14, 16, 18, 20, 22, 24, 26:
    50% MDPE-1+50% VLDPE-1 (1.75% of total thickness of layers 1-29)
Layer 28: 40% MDPE-1+40% VLDPE-1+20% MB4 (13% of total thickness of layers 1-29)
Layer 29: 40% MDPE-1+40% EVA-1+20% MB4 (16.5% of total thickness of layers 1-29)

Example 34

A multilayer film was coextruded through an annular 29-layer die, and had the following structure:
Layer 1: 40% MDPE-1+40% EVA-1+20% MB4 (16.5% of total thickness of layers 1-29)
Layer 2: 40% MDPE-1+40% VLDPE-1+20% MB4 (13% of total thickness of layers 1-29)
Layers 3, 5, 7, 9, 11, 13, 15, 17, 19, 21, 23, 25, 27:
    70% SBS-1+30% SBS-2 (1.53% of total thickness of layers 1-29)
Layers 4, 6, 8, 10, 12, 14, 16, 18, 20, 22, 24, 26:
    50% MDPE-1+50% VLDPE-1 (1.75% of total thickness of layers 1-29)
Layer 28: 40% MDPE-1+40% VLDPE-1+20% MB4 (13% of total thickness of layers 1-29)
Layer 29: 40% MDPE-1+40% EVA-1+20% MB4 (16.5% of total thickness of layers 1-29)

Example 35

A multilayer film was coextruded through an annular 29-layer die, and had the following structure with a targeted film thickness of 0.30 mil:
Layer 1: 47.8% LLDPE-1+23.7% MDPE-1+14.5% EVA-1+14% MB-1 (12.5% of total thickness of layers 1-29);
Layer 2: 47.8% LLDPE-1+23.7% MDPE-1+14.5% EVA-1+14% MB-2 (12.5% of total thickness of layers 1-29);
Layers 3-27:
    50% LLDPE-1+50% Repro-3 (2.0% of total thickness of layers 1-29);
Layer 28: 47.8% LLDPE-1+23.7% MDPE-1+14.5% EVA-1+14% MB-2 (12.5% of total thickness of layers 1-29);
Layer 29: 47.8% LLDPE-1+23.7% MDPE-1+14.5% EVA-1+14% MB-1 (12.5% of total thickness of layers 1-29);

Example 36

The films of Examples 1-25 were subjected to the following tests:

1) Tensile Strength and Elongation at yield: tested in both the machine direction (MD) and transverse direction (TD) in accordance with ASTM D-882; tensile strength is expressed in psi (pounds/in$^2$) and elongation is expressed in %.

2) Young's Modulus: tested in both the machine direction (MD) and transverse direction (TD) in accordance with ASTM D-882; expressed in psi (pounds/in$^2$).

3) Propagation Tear Resistance by Pendulum Method (Elmendorf Tear): tested in both the machine direction (MD) and transverse direction (TD) in accordance with ASTM D-1922-06a to measure the average force to propagate tearing through a length of film after the tear has been started, using an Elmendorf-type tearing tester; Elmendorf Tear is expressed in grams/mil (normalized, based on thickness of tested film) and in grams (actual value, i.e., regardless of the thickness of tested film).

4) Instrumented Impact Strength: tested in accordance with ASTM D3763-06 to measure high speed puncture properties of plastics using load and displacement sensors; designed to provide load versus deformation response of plastics under essentially multiaxial deformation conditions at impact velocities; reported as peak load and expressed in pounds force ($lb_f$—actual) and in $lb_f$/mil (normalized).

5) Initiation Tear Resistance (Graves Tear): tested in both the machine direction (MD) and transverse direction (TD) in accordance with ASTM D-1004 to measure the force to initiate tearing; Graves Tear is expressed in grams/mil.

6) Tear-Propagation Resistance (Trouser Tear): tested in both the machine direction (MD) and transverse direction (TD) in accordance with ASTM D-1938; expressed in grams/mil.

7) Free Shrink: tested in both the machine direction (MD) and transverse direction (TD) in accordance with ASTM D-2732-03; free shrink is expressed in %.

8) Haze: tested in accordance with ASTM D-1003; expressed in %.

9) Clarity: tested in accordance with ASTM D-1746; expressed in %.

10) Gloss: tested in accordance with ASTM D2457; expressed in %

The results are summarized in Tables 1-4.

TABLE 1

| | Examples | | | | | |
|---|---|---|---|---|---|---|
| Test | $1^{3,4}$ | $2^3$ | $3^{3,5}$ | 4 | 5 | 6 |
| Resin 1 in microlayer | LLDPE-1 + | LLDPE-1 | LLDPE-1 | LLDPE-1 | LLDPE-1 | VLDPE-3 |
| Resin 2 in microlayer | MDPE-1 | | | MDPE-1 + LLDPE-1 | LLDPE-1 + Repro-1 | LLDPE-1 + MDPE-2 |
| Film Thickness (mils) | 0.3 | 0.3 | 0.6 | 0.3 | 0.3 | 0.3 |
| Tensile Strength at yield$^1$ (psi × 1000) | 20.5/20.6 | 20.6/19.6 | 17.9/19.3 | 21.2/22.3 | 21.9/16.0 | 14.9/17.4 |
| Tensile Elongation at yield$^1$ (%) | 85/110 | 94/100 | 94/100 | 96/85 | 95/86 | 120/84 |

TABLE 1-continued

| Test | Examples | | | | | |
|---|---|---|---|---|---|---|
| | 1[3,4] | 2[3] | 3[3,5] | 4 | 5 | 6 |
| Elmendorf Tear[1] (g/mil) | 26.8/28.1 | 25.9/22.3 | 25.6/26.4 | 46.9/49.0 | 54.5/41.6 | 29.1/36.5 |
| Elmendorf Tear[1] (grams) | 8.4/9.0 | 8.5/7.4 | 15.2/15.9 | 14.0/15.3 | 16.3/12.7 | 10.5/14.6 |
| Young's Modulus[1] (psi × 1000) | 81.9/82.5 | 60.6/63.2 | 61.0/78.9 | 61.0/78.9 | 66.4/66.6 | 53.3/75.2 |
| Tear Resistance (Graves Tear)[1] (g/mil) | 412/459 | 538/491 | 497/481 | 515/662 | 423/662 | 396/359 |
| Tear Propagation (Trouser Tear)[1] (g/mil) | 5.5/8.2 | 4.3/5.2 | 6.4/8.5 | 6.5/8.4 | 7.5/7.6 | 8.4/8.3 |
| Instrumented Impact Strength[2] (lb$_f$) | 8.5 | 9.2 | 18.3 | 9.3 | 7.0 | 6.8 |
| Total Free Shrink (%) measured at 200° F. | 23 | 29 | 28 | 26 | 23 | 29 |
| Haze[2] (%) | 2.3 | 3.1 | 3.0 | 2.5 | 3.3 | 3.6 |
| Gloss[2] (%) | 85.0 | 82.0 | 87.4 | 87.0 | 81.0 | 84.0 |
| Clarity[2] (%) | 86.2 | 82.0 | 79.7 | 87.3 | 80.0 | 82.6 |

[1] measured at 73° F. MD/TD
[2] measured at 73° F.
[3] Comparative examples 1-3 were made using a standard annular plate die, e.g., as described in U.S. Pat. No. 5,076,776; the resin types indicated in the table reflect the resins used in the single, relatively thick core layer of these comparative films.
[4] Values are derived from average of 8 samples
[5] Values are derived from average of 5 samples

TABLE 2

| Test | Examples | | | | | |
|---|---|---|---|---|---|---|
| | 7[3] | 8 | 9 | 10 | 11 | 12 |
| Resin 1 in microlayer | LLDPE-1 | LLDPE-2 + VLDPE-1 | LLDPE-3 + VLDPE-4 | VLDPE-5 + LLDPE-1 | VLDPE-5 | LLDPE-1 + VLDPE-2 |
| Resin 2 in microlayer | MDPE-2 + LLDPE-1 | LLDPE-2 | LLDPE-3 | LLDPE-1 | LLDPE-1 + MDPE-2 | LLDPE-1 + MDPE-2 |
| Film Thickness (mils) | 0.3 | 0.3 | 0.3 | 0.3 | 0.3 | 0.3 |
| Tensile Strength at yield[1] (psi × 1000) | 18.5/23.6 | 19.7/18.4 | 15.9/17.3 | 21.0/21.3 | 20.2/22.0 | 18.9/19.7 |
| Tensile Elongation at yield[1] (%) | 100/98 | 120/100 | 93/110 | 120/83 | 110/80 | 100/100 |
| Elmendorf Tear[1] (g/mil) | 41.1/33.6 | 32.2/33.6 | 45.0/28.6 | 53.2/44.4 | 46.3/42.1 | 49.8/50.9 |
| Elmendorf Tear[1] (grams) | 15.3/12.6 | 11.3/12.4 | 13.4/8.6 | 17.4/14.3 | 16.9/15.7 | 19.1/19.3 |
| Young's Modulus[1] (psi × 1000) | 68.1/75.6 | 57.6/61.7 | 61.4/56.5 | 55.0/74.0 | 62.1/68.6 | 61.4/66.2 |
| Tear Resistance (Graves Tear)[1] (g/mil) | 443/420 | 366/493 | 452/362 | 362/314 | 431/476 | 516/477 |
| Tear Propagation (Trouser Tear)[1] (g/mil) | 6.9/5.4 | 8.8/8.5 | 20.6/8.4 | 9.8/11.6 | 7.8/7.9 | 6.9/6.6 |
| Instrumented Impact Strength[2] (lb$_f$) | 11.7 | 8.7 | 5.7 | 7.5 | 10.3 | 8.5 |
| Total Free Shrink (%) measured at 200° F. | 25 | 22 | 26 | 31 | 28 | 26 |
| Haze[2] (%) | 2.9 | 3.4 | 2.6 | 2.8 | 2.7 | 3.8 |
| Gloss[2] (%) | 87.0 | 85.0 | 91.0 | 88.0 | 85.0 | 81.0 |
| Clarity[2] (%) | 86.7 | 86.5 | 86.7 | 85.5 | 87.3 | 84.0 |

[1] measured at 73° F. MD/TD
[2] measured at 73° F.
[3] Values are derived from average of 3 samples

TABLE 3

| Test | Examples | | | | | | |
|---|---|---|---|---|---|---|---|
| | 13[3] | 14[3] | 15[3] | 16 | 17 | 18 | 19[4] |
| Resin 1 in microlayer | LLDPE-1 | LLDPE-1 | LLDPE-1 | LLDPE-1 | LLDPE-1 | LLDPE-1 + Repro-1 | LLDPE-1 + Repro-1 |
| Resin 2 in microlayer | MDPE-1 + LLDPE-1 | LLDPE-1 | VLDPE-1 | LLDPE-1 | LLDPE-1 + Repro-1 | LLDPE-1 + Repro-1 | LLDPE-1 + Repro-1 |
| Film Thickness (mils) | 0.3 | 0.3 | 0.3 | 0.3 | 0.3 | 0.3 | 0.3 |
| Tensile Strength at yield[1] (psi × 1000) | 21.0/22.6 | 22.2/23.5 | 22.0/15.6 | 20.6/19.6 | 18.5/21.3 | 20.7/19.8 | 20.1/17.7 |
| Tensile Elongation at yield[1] (%) | 73/84 | 91/76 | 86/84 | 94/100 | 98/100 | 96/120 | 93/105 |
| Elmendorf Tear[1] (g/mil) | 25.4/30.9 | 15.0/13.5 | 34.4/35.9 | 25.9/22.3 | 33.1/29.5 | 28.3/28.9 | 18.7/18.3 |
| Elmendorf Tear[1] (grams) | 8.3/10.6 | 4.9/4.5 | 11.5/11.7 | 6.8/6.0 | 11.2/10.0 | 10.4/11.5 | 6.5/6.6 |
| Young's Modulus[1] (psi × 1000) | 70.9/90.1 | 65.3/83.0 | 73.5/68.6 | 60.6/63.2 | 62.5/75.1 | 71.0/69.3 | 65.7/62.2 |
| Tear Resistance (Graves Tear)[1] (g/mil) | 830/634 | 569/511 | 335/378 | 538/491 | 333/371 | 206/334 | 437/536 |
| Tear Propagation (Trouser Tear)[1] (g/mil) | 5.7/9.1 | 8.8/7.4 | 7.2/6.2 | 4.3/5.2 | 6.0/7.4 | 9.8/8.5 | 5.9/7.9 |
| Instrumented Impact Strength[2] ($lb_f$) | 8.3 | 9.2 | 7.6 | 9.2 | 9.6 | 9.5 | 9.3 |
| Total Free Shrink (%) measured at 200° F. | 22 | 25 | 27 | 29 | 18 | 18 | 32 |
| Haze[2] (%) | 3.1 | 2.1 | 3.7 | 3.1 | 82.8 | 82.6 | 4.0 |
| Gloss[2] (%) | 83.0 | 85.0 | 85.0 | 82.0 | 82.0 | 82.0 | 81.0 |
| Clarity[2] (%) | 86.7 | 84.5 | 86.8 | 82.0 | 3.6 | 4.1 | 72.9 |

[1]measured at 73° F. MD/TD
[2]measured at 73° F.
[3]Orientation ratio = 6 × 6
[4]Values are derived from an average of 2 samples

TABLE 4

| Test | Examples | | | | | |
|---|---|---|---|---|---|---|
| | 20 | 21 | 22[3] | 23 | 24 | 25 |
| Resin 1 in microlayer | LLDPE-1 + Repro-2 | LLDPE-1 | VLDPE-2 | VLDPE-3 | EVA-3 | VLDPE-1 |
| Resin 2 in microlayer | LLDPE-1 + Repro-2 | VLDPE-1 | SBS-2 | LLDPE-1 | MDPE-2 | LLDPE-2 |
| Film Thickness (mils) | 0.3 | 0.3 | 0.3 | 0.3 | 0.3 | 0.3 |
| Tensile Strength at yield[1] (psi × 1000) | 17.5/13.8 | 17.3/17.5 | 15.0/13.2 | 15.7/14.0 | 16.4/17.8 | 19.9/18.2 |
| Tensile Elongation at yield[1] (%) | 79/86 | 93/95 | 75/86 | 95/71 | 120/93 | 100/110 |
| Elmendorf Tear[1] (g/mil) | 16.5/17.0 | 41.4/45.7 | 14.9/22.4 | 27.5/25.6 | 13.3/15.0 | 23.8/28.3 |
| Elmendorf Tear[1] (grams) | 5.7/5.9 | 14.0/15.3 | 5.5/8.7 | 9.6/8.9 | 4.7/5.7 | 8.3/9.5 |
| Young's Modulus[1] (psi × 1000) | 72.4/71.3 | 65.5/62.5 | 107.0/97.5 | 47.8/58.7 | 70.7/89.8 | 58.5/55.4 |
| Tear Resistance (Graves Tear)[1] (g/mil) | 414/410 | 382/328 | 264/331 | 399/369 | 465/381 | 397/389 |
| Tear Propagation (Trouser Tear)[1] (g/mil) | 5.6/10.5 | 8.9/6.9 | 4.9/5.9 | 7.4/6.2 | 6.3/7.4 | 8.7/10.0 |
| Instrumented Impact Strength[2] ($lb_f$) | 7.4 | 8.5 | 4.3 | 7.7 | 7.0 | 8.1 |
| Total Free Shrink (%) measured at 200° F. | 22 | 26 | 29 | 29 | 23 | 27 |
| Haze[2] (%) | 2.6 | 3.5 | 3.3 | 3.7 | 3.6 | 3.6 |
| Gloss[2] (%) | 88.0 | 82.0 | 88.0 | 82.0 | 85.0 | 84.0 |
| Clarity[2] (%) | 74.6 | 86.9 | 85.5 | 83.0 | 85.0 | 82.5 |

[1]measured at 73° F. MD/TD
[2]measured at 73° F.
[3]Orientation ratio = 6 × 6

Example 37

In this example, the films of the Examples 1-25 were subjected to an automated shrink-wrap packaging test. Wooden test boxes, each having the dimension 10"×7"×2", were conveyed through a Shanklin OMNI SLRS automated wrapping and sealing machine, wherein each box was automatically wrapped and heat-sealed within an enclosure formed by each of the films of Examples 1-25. The machine effected wrapping by directing the film at a transverse angle to the direction of box movement, then center-folding and changing the direction of film travel so that a moving, center-folded envelopment of each box took place. The machine then sealed closed the open longitudinal edge in the vicinity of each box to effect a "side seal," then made transverse seals ("end seals") upstream and downstream of each box to complete the enclosure.

Each of the enclosed boxes was then conveyed from the OMNI SLRS wrapping/sealing machine and into a Shanklin GT-71 shrink tunnel, wherein heated air was directed against the enclosed boxes, causing the film to shrink tightly and uniformly around the boxes.

The settings for the Shanklin OMNI SLRS wrapping/sealing machine were:
  i. Side seal temperature=350-400° F.
  ii. End seal temperature=350-400° F.
  iii. Speed=40 fpm ("feet per minute")

The settings for shrink tunnel Shanklin GT-71
  i. Tunnel temperatures=250° F., 275° F., 300° F., 325° F., 350° F.
  ii. Tunnel speed=40 fpm, 70 fpm, 100 fpm For each of the films in Examples 1-25, the test boxes were wrapped and sealed with films using the Shanklin OMNI SLRS machine at the given settings. The wrapped boxes were then passed through the shrink tunnel at 250° F. at 40 fpm. A total of 10 wrapped boxes were passed through the tunnel at this temperature and speed. Maintaining the temperature, another 10 wrapped boxes were run through the tunnel 70 fpm, and 10 more boxes at 100 fpm. The whole process was repeated at higher shrink tunnel temperature at 25° F. interval until maximum temperature of 350° F. was reached.

In this manner, 150 packages were made for each of the films of Examples 1-25, which were then subjected to the following evaluations
  1. Burn outs—the total number of packages in which the film melted and opened due to excessive heat (usually on top), wherein a hole size larger than a dime resulted.
  2. Scorches—the total number of areas in each of the packages wherein the film turned white (also called ghosting) generally due to thin film areas after the shrinking process exposed to high heat.
  3. Seal failures—the total number of packages with seal breaks having a length or diameter greater than ⅛ inch.

The results are summarized in Table 5-8.

TABLE 5

| Test | 1[1,2] | 2[1] | 3[1,3] | 4 | 5 | 6 |
|---|---|---|---|---|---|---|
| Resin 1 in microlayer | LLDPE-1 + | LLDPE-1 | LLDPE-1 | LLDPE-1 | LLDPE-1 | VLDPE-3 |
| Resin 2 in microlayer | MDPE-1 | | | MDPE-1 + LLDPE-1 | LLDPE-1 + Repro-1 | LLDPE-1 + MDPE-2 |
| Film Thickness (mils) | 0.3 | 0.3 | 0.6 | 0.3 | 0.3 | 0.3 |
| Total number of burn outs | 13 | 2 | 5 | 3 | 7 | 0 |
| Total number of scorches | 27 | 22 | 3 | 0 | 0 | 2 |
| Total number of seal failures | 2 | 0 | 10 | 0 | 0 | 23 |

[1]Comparative examples 1-3 were made using a standard annular plate die, e.g., as described in U.S. Pat. No. 5,076,776; the resin types indicated in the table reflect the resins used in the single, relatively thick core layer of these comparative films.
[2]Values are derived from an average of 6 samples
[3]Values are derived from an average of 3 samples

TABLE 6

| Test | 7 | 8 | 9 | 10 | 11 | 12 |
|---|---|---|---|---|---|---|
| Resin 1 in microlayer | LLDPE-1 | LLDPE-2 + VLDPE-1 | LLDPE-3 + VLDPE-4 | VLDPE-5 + LLDPE-1 | VLDPE-5 | LLDPE-1 + VLDPE-2 |
| Resin 2 in microlayer | MDPE-2 + LLDPE-1 | LLDPE-2 | LLDPE-3 | LLDPE-1 | LLDPE-1 + MDPE-2 | LLDPE-1 + MDPE-2 |
| Film Thickness (mils) | 0.3 | 0.3 | 0.3 | 0.3 | 0.3 | 0.3 |
| Total number of burn outs | 1 | 12 | 3 | 1 | 1 | 4 |
| Total number of scorches | 22 | 44 | 65 | 58 | 57 | 56 |
| Total number of seal failures | 6 | 0 | 0 | 0 | 0 | 0 |

TABLE 7

| Test | Examples | | | | | | |
|---|---|---|---|---|---|---|---|
| | 13 | 14 | 15 | 16 | 17 | 18 | 19 |
| Resin 1 in microlayer | LLDPE-1 | LLDPE-1 | LLDPE-1 | LLDPE-1 | LLDPE-1 | LLDPE-1 + Repro-1 | LLDPE-1 + Repro-1 |
| Resin 2 in microlayer | MDPE-1 + LLDPE-1 | LLDPE-1 | VLDPE-1 | LLDPE-1 | LLDPE-1 + Repro-1 | LLDPE-1 + Repro-1 | LLDPE-1 + Repro-1 |
| Film Thickness (mils) | 0.3 | 0.3 | 0.3 | 0.3 | 0.3 | 0.3 | 0.3 |
| Total number of burn outs | 3 | 5 | 9 | 1 | 1 | 11 | 8 |
| Total number of scorches | 28 | 0 | 12 | 0 | 39 | 54 | 0 |
| Total number of seal failures | 0 | 0 | 0 | 0 | 0 | 0 | 0 |

TABLE 8

| Test | Examples | | | | | |
|---|---|---|---|---|---|---|
| | 20 | 21 | 22 | 23 | 24 | 25 |
| Resin 1 in microlayer | LLDPE-1 + Repro-2 | LLDPE-1 | VLDPE-2 | VLDPE-3 | EVA-3 | VLDPE-1 |
| Resin 2 in microlayer | LLDPE-1 + Repro-2 | VLDPE-1 | SBS-2 | LLDPE-1 | MDPE-2 | LLDPE-2 |
| Film Thickness (mils) | 0.3 | 0.3 | 0.3 | 0.3 | 0.3 | 0.3 |
| Total number of burn outs | 15 | 7 | 15 | 4 | 0 | 19 |
| Total number of scorches | 0 | 49 | 35 | 42 | 26 | 37 |
| Total number of seal failures | 0 | 0 | 0 | 0 | 5 | 0 |

The foregoing results indicate that heat-shrinkable films in accordance with the present invention have sufficient heat-resistance and toughness to withstand the rigors of commercial shrink film packaging equipment.

Example 38

A multilayer film in accordance with the present invention was made by the process described above for Inventive Example 4, and had the following twenty nine-layer structure with total film thickness of 0.60 mils:
Layer 1: 47.8% LLDPE-1+23.7% MDPE-1+14.5% EVA-1+ 14% MB-2 (12.5% of total thickness of layers 1-29);
Layer 2: 47.8% LLDPE-1+23.7% MDPE-1+14.5% EVA-1+ 14% MB-3 (12.5% of total thickness of layers 1-29);
Layers 3-27: LLDPE-1 (2.0% of total thickness of layers 1-29);
Layer 28: 47.8% LLDPE-1+23.7% MDPE-1+14.5% EVA-1+14% MB-3 (12.5% of total thickness of layers 1-29);
Layer 29: 47.8% LLDPE-1+23.7% MDPE-1+14.5% EVA-1+14% MB-2 (12.5% of total thickness of layers 1-29)

Example 39

A multilayer film in accordance with the present invention was made by the process described above for Inventive Example 4, and had the following twenty nine-layer structure with total film thickness of 0.60 mils:
Layer 1: 47.8% LLDPE-1+23.7% MDPE-1+14.5% EVA-1+ 14% MB-2 (12.5% of total thickness of layers 1-29);
Layer 2: 47.8% LLDPE-1+23.7% MDPE-1+14.5% EVA-1+ 14% MB-3 (12.5% of total thickness of layers 1-29);
Layers 3-27: 50% LLDPE-1+50% Repro-1 (2.0% of total thickness of layers 1-29);
Layer 28: 47.8% LLDPE-1+23.7% MDPE-1+14.5% EVA-1+14% MB-3 (12.5% of total thickness of layers 1-29);
Layer 29: 47.8% LLDPE-1+23.7% MDPE-1+14.5% EVA-1+14% MB-2 (12.5% of total thickness of layers 1-29)

Example 40

A multilayer film in accordance with the present invention was made by the process described above for Inventive Example 4, and had the following twenty nine-layer structure with total film thickness of 0.60 mils:
Layer 1: 47.8% LLDPE-1+23.7% MDPE-1+14.5% EVA-1+ 14% MB-2 (12.5% of total thickness of layers 1-29);
Layer 2: 47.8% LLDPE-1+23.7% MDPE-1+14.5% EVA-1+ 14% MB-3 (12.5% of total thickness of layers 1-29);
Layers 3-27: LLDPE-4 (2.0% of total thickness of layers 1-29);
Layer 28: 47.8% LLDPE-1+23.7% MDPE-1+14.5% EVA-1+14% MB-3 (12.5% of total thickness of layers 1-29);
Layer 29: 47.8% LLDPE-1+23.7% MDPE-1+14.5% EVA-1+14% MB-2 (12.5% of total thickness of layers 1-29)

Example 41

A multilayer film in accordance with the present invention was made by the process described above for Inventive Example 4, and had the following twenty nine-layer structure with total film thickness of 0.60 mils:
Layer 1: 47.8% LLDPE-1+23.7% MDPE-1+14.5% EVA-1+ 14% MB-2 (12.5% of total thickness of layers 1-29);
Layer 2: 47.8% LLDPE-1+23.7% MDPE-1+14.5% EVA-1+ 14% MB-3 (12.5% of total thickness of layers 1-29);
Layers 3-27: LLDPE-2 (2.0% of total thickness of layers 1-29);

Layer 28: 47.8% LLDPE-1+23.7% MDPE-1+14.5% EVA-1+14% MB-3 (12.5% of total thickness of layers 1-29);
Layer 29: 47.8% LLDPE-1+23.7% MDPE-1+14.5% EVA-1+14% MB-2 (12.5% of total thickness of layers 1-29)

Example 42

A multilayer film in accordance with the present invention was made by the process described above for Inventive Example 4, and had the following twenty nine-layer structure with total film thickness of 0.60 mils:
Layer 1: 47.8% LLDPE-1+23.7% MDPE-1+14.5% EVA-1+14% MB-2 (12.5% of total thickness of layers 1-29);
Layer 2: 47.8% LLDPE-1+23.7% MDPE-1+14.5% EVA-1+14% MB-3 (12.5% of total thickness of layers 1-29);
Layers 3-27: 50% LLDPE-1+50% Repro-3 (2.0% of total thickness of layers 1-29);
Layer 28: 47.8% LLDPE-1+23.7% MDPE-1+14.5% EVA-1+14% MB-3 (12.5% of total thickness of layers 1-29);
Layer 29: 47.8% LLDPE-1+23.7% MDPE-1+14.5% EVA-1+14% MB-2 (12.5% of total thickness of layers 1-29)

Example 43

A multilayer film in accordance with the present invention was made by the process described above for Inventive Example 4, except that the tape was not cross-linked; the film had the following twenty nine-layer structure with a total film thickness of 0.60 mils:
Layer 1: 47.8% LLDPE-1+23.7% MDPE-1+14.5% EVA-1+14% MB-2 (12.5% of total thickness of layers 1-29);
Layer 2: 47.8% LLDPE-1+23.7% MDPE-1+14.5% EVA-1+14% MB-3 (12.5% of total thickness of layers 1-29);
Layers 3-27: LLDPE-1 (2.0% of total thickness of layers 1-29);
Layer 28: 47.8% LLDPE-1+23.7% MDPE-1+14.5% EVA-1+14% MB-3 (12.5% of total thickness of layers 1-29);
Layer 29: 47.8% LLDPE-1+23.7% MDPE-1+14.5% EVA-1+14% MB-2 (12.5% of total thickness of layers 1-29)

Example 44

A multilayer film in accordance with the present invention was made by the process described above for Inventive Example 4, except that the tape was cross-linked at between 45 and 90 kGy; the film had the following twenty nine-layer structure with a total film thickness of 0.60 mils:
Layer 1: 47.8% LLDPE-1+23.7% MDPE-1+14.5% EVA-1+14% MB-2 (12.5% of total thickness of layers 1-29);
Layer 2: 47.8% LLDPE-1+23.7% MDPE-1+14.5% EVA-1+14% MB-3 (12.5% of total thickness of layers 1-29);
Layers 3-27: LLDPE-1 (2.0% of total thickness of layers 1-29);
Layer 28: 47.8% LLDPE-1+23.7% MDPE-1+14.5% EVA-1+14% MB-3 (12.5% of total thickness of layers 1-29);
Layer 29: 47.8% LLDPE-1+23.7% MDPE-1+14.5% EVA-1+14% MB-2 (12.5% of total thickness of layers 1-29)

Example 45

A multilayer film in accordance with the present invention was made by the process described above for Inventive Example 4, and had the following twenty nine-layer structure with total film thickness of 0.60 mils:
Layer 1: 47.8% LLDPE-1+23.7% MDPE-1+14.5% EVA-1+14% MB-2 (12.5% of total thickness of layers 1-29);
Layer 2: 47.8% LLDPE-1+23.7% MDPE-1+14.5% EVA-1+14% MB-3 (7.1% of total thickness of layers 1-29);
Layers 3, 6, 9, 12, 15, 18, 21, 24, 27:
LLDPE-1 (2.78% of total thickness of layers 1-29);
Layers 4, 7, 10, 13, 16, 19, 22, 25:
LLDPE-1 (2.24% of total thickness of layers 1-29);
Layers 5, 8, 11, 14, 17, 20, 23, 26:
Repro-1 (0.89% of total thickness of layers 1-29);
Layer 28: 47.8% LLDPE-1+23.7% MDPE-1+14.5% EVA-1+14% MB-3 (17.9% of total thickness of layers 1-29);
Layer 29: 47.8% LLDPE-1+23.7% MDPE-1+14.5% EVA-1+14% MB-2 (12.5% of total thickness of layers 1-29)

Example 46

A multilayer film in accordance with the present invention was made by the process described above for Inventive Example 4, and had the following twenty nine-layer structure with total film thickness of 0.60 mils:
Layer 1: 47.8% LLDPE-1+23.7% MDPE-1+14.5% EVA-1+14% MB-2 (12.5% of total thickness of layers 1-29);
Layer 2: 47.8% LLDPE-1+23.7% MDPE-1+14.5% EVA-1+14% MB-3 (7.1% of total thickness of layers 1-29);
Layers 3, 6, 9, 12, 15, 18, 21, 24, 27:
LLDPE-1 (2.78% of total thickness of layers 1-29);
Layers 4, 7, 10, 13, 16, 19, 22, 25:
LLDPE-1 (2.24% of total thickness of layers 1-29);
Layers 5, 8, 11, 14, 17, 20, 23, 26:
50% LLDPE-1+50% Repro-1 (0.89% of total thickness of layers 1-29);
Layer 28: 47.8% LLDPE-1+23.7% MDPE-1+14.5% EVA-1+14% MB-2 (17.9% of total thickness of layers 1-29);
Layer 29: 47.8% LLDPE-1+23.7% MDPE-1+14.5% EVA-1+14% MB-2 (12.5% of total thickness of layers 1-29)

Example 47

A multilayer film in accordance with the present invention was made by the process described above for Inventive Example 4, and had the following twenty nine-layer structure with total film thickness of 0.60 mils:
Layer 1: 47.8% LLDPE-1+23.7% MDPE-1+14.5% EVA-1+14% MB-2 (12.5% of total thickness of layers 1-29);
Layer 2: 47.8% LLDPE-1+23.7% MDPE-1+14.5% EVA-1+14% MB-3 (7.1% of total thickness of layers 1-29);
Layers 3, 6, 9, 12, 15, 18, 21, 24, 27:
LLDPE-1 (2.38% of total thickness of layers 1-29);
Layers 4, 7, 10, 13, 16, 19, 22, 25:
50% LLDPE-1+50% Repro-1 (1.79% of total thickness of layers 1-29);
Layers 5, 8, 11, 14, 17, 20, 23, 26:
50% LLDPE-1+50% Repro-1 (1.79% of total thickness of layers 1-29);
Layer 28: 47.8% LLDPE-1+23.7% MDPE-1+14.5% EVA-1+14% MB-2 (17.9% of total thickness of layers 1-29);
Layer 29: 47.8% LLDPE-1+23.7% MDPE-1+14.5% EVA-1+14% MB-2 (12.5% of total thickness of layers 1-29)

Example 48

A multilayer film in accordance with the present invention was made by the process described above for Inventive Example 4, and had the following twenty nine-layer structure with total film thickness of 0.60 mils:
Layer 1: 47.8% LLDPE-1+23.7% MDPE-1+14.5% EVA-1+14% MB-2 (12.5% of total thickness of layers 1-29);

Layer 2: 47.8% LLDPE-1+23.7% MDPE-1+14.5% EVA-1+ 14% MB-3 (12.5% of total thickness of layers 1-29);
Layers 3, 5, 7, 9, 11, 13, 15, 17, 19, 21, 23, 25, 27: LLDPE-1 (1.92% of total thickness of layers 1-29);
Layers 4, 6, 8, 10, 12, 14, 16, 18, 20, 22, 24, 26
60% LLDPE-1+40% MDPE-1 (2.08% of total thickness of layers 1-29);
Layer 28: 47.8% LLDPE-1+23.7% MDPE-1+14.5% EVA-1+14% MB-3 (12.5% of total thickness of layers 1-29);
Layer 29: 47.8% LLDPE-1+23.7% MDPE-1+14.5% EVA-1+14% MB-2 (12.5% of total thickness of layers 1-29)

Example 49

A multilayer film in accordance with the present invention was made by the process described above for Inventive Example 4, and had the following twenty nine-layer structure with total film thickness of 0.60 mils:
Layer 1: 47.8% LLDPE-1+23.7% MDPE-1+14.5% EVA-1+ 14% MB-2 (12.5% of total thickness of layers 1-29);
Layer 2: 47.8% LLDPE-1+23.7% MDPE-1+14.5% EVA-1+ 14% MB-3 (12.5% of total thickness of layers 1-29);
Layers 3, 5, 7, 9, 11, 13, 15, 17, 19, 21, 23, 25, 27: LLDPE-1 (1.92% of total thickness of layers 1-29);
Layers 4, 6, 8, 10, 12, 14, 16, 18, 20, 22, 24, 26
55.6% LLDPE-1+27.6% MDPE-1+16.8% EVA-1 (2.08% of total thickness of layers 1-29);
Layer 28: 47.8% LLDPE-1+23.7% MDPE-1+14.5% EVA-1+14% MB-3 (12.5% of total thickness of layers 1-29);
Layer 29: 47.8% LLDPE-1+23.7% MDPE-1+14.5% EVA-1+14% MB-2 (12.5% of total thickness of layers 1-29)

Example 50

Comparative

A multilayer film in accordance with the present invention was made by the process described above for Comparative Example 1, and had the following five-layer structure with total film thickness of 0.52 mils:
Layer 1: 47.8% LLDPE-1+23.7% MDPE-1+14.5% EVA-1+ 14% MB-2 (12.5% of total thickness of layers 1-29);
Layer 2: 47.8% LLDPE-1+23.7% MDPE-1+14.5% EVA-1+ 14% MB-3 (12.5% of total thickness of layers 1-29);
Layer 3: LLDPE-1 (50.0% of total thickness of layers 1-29);
Layer 4: 47.8% LLDPE-1+23.7% MDPE-1+14.5% EVA-1+ 14% MB-3 (12.5% of total thickness of layers 1-29);
Layer 5: 47.8% LLDPE-1+23.7% MDPE-1+14.5% EVA-1+ 14% MB-2 (12.5% of total thickness of layers 1-29)

Example 51

A multilayer film in accordance with the present invention was made by the process described above for Inventive Example 4, and had the following twenty nine-layer structure with total film thickness of 0.50 mils:
Layer 1: 47.8% LLDPE-1+23.7% MDPE-1+14.5% EVA-1+ 14% MB-2 (12.5% of total thickness of layers 1-29);
Layer 2: 47.8% LLDPE-1+23.7% MDPE-1+14.5% EVA-1+ 14% MB-3 (12.5% of total thickness of layers 1-29);
Layers 3, 5, 7, 9, 11, 13, 15, 17, 19, 21, 23, 25, 27: LLDPE-1 (1.92% of total thickness of layers 1-29);
Layers 4, 6, 8, 10, 12, 14, 16, 18, 20, 22, 24, 26
50% LLDPE-1+50% Repro-1 (2.08% of total thickness of layers 1-29);
Layer 28: 47.8% LLDPE-1+23.7% MDPE-1+14.5% EVA-1+14% MB-3 (12.5% of total thickness of layers 1-29);
Layer 29: 47.8% LLDPE-1+23.7% MDPE-1+14.5% EVA-1+14% MB-2 (12.5% of total thickness of layers 1-29)

Example 52

Comparative

A multilayer film in accordance with the present invention was made by the process described above for Comparative Example 1, and had the following five-layer structure with total film thickness of 0.75 mils:
Layer 1: 47.8% LLDPE-1+23.7% MDPE-1+14.5% EVA-1+ 14% MB-2 (12.5% of total thickness of layers 1-5);
Layer 2: 47.8% LLDPE-1+23.7% MDPE-1+14.5% EVA-1+ 14% MB-3 (12.5% of total thickness of layers 1-5);
Layer 3: LLDPE-1 (50.0% of total thickness of layers 1-5);
Layer 4: 47.8% LLDPE-1+23.7% MDPE-1+14.5% EVA-1+ 14% MB-3 (12.5% of total thickness of layers 1-5);
Layer 5: 47.8% LLDPE-1+23.7% MDPE-1+14.5% EVA-1+ 14% MB-2 (12.5% of total thickness of layers 1-5)

Example 53

A multilayer film in accordance with the present invention was made by the process described above for Inventive Example 4, and had the following twenty nine-layer structure with total film thickness of 0.75 mils:
Layer 1: 47.8% LLDPE-1+23.7% MDPE-1+14.5% EVA-1+ 14% MB-2 (12.5% of total thickness of layers 1-29);
Layer 2: 47.8% LLDPE-1+23.7% MDPE-1+14.5% EVA-1+ 14% MB-3 (12.5% of total thickness of layers 1-29);
Layers 3, 5, 7, 9, 11, 13, 15, 17, 19, 21, 23, 25, 27: LLDPE-1 (1.92% of total thickness of layers 1-29);
Layers 4, 6, 8, 10, 12, 14, 16, 18, 20, 22, 24, 26
50% LLDPE-1+50% Repro-1 (2.08% of total thickness of layers 1-29);
Layer 28: 47.8% LLDPE-1+23.7% MDPE-1+14.5% EVA-1+14% MB-3 (12.5% of total thickness of layers 1-29);
Layer 29: 47.8% LLDPE-1+23.7% MDPE-1+14.5% EVA-1+14% MB-2 (12.5% of total thickness of layers 1-29)

Example 54

Comparative

A multilayer film in accordance with the present invention was made by the process described above for Comparative Example 1, and had the following five-layer structure with total film thickness of 1.00 mils:
Layer 1: 50.04% LLDPE-1+24.84% MDPE-1+15.12% EVA-1+10.00% MB-2 (7.9% of total thickness of layers 1-5);
Layer 2: 50.04% LLDPE-1+24.84% MDPE-1+15.12% EVA-1+10.00% MB-3 (14.6% of total thickness of layers 1-5);
Layer 3: LLDPE-1 (55.0% of total thickness of layers 1-5);
Layer 4: 50.04% LLDPE-1+24.84% MDPE-1+15.12% EVA-1+10.00% MB-3 (14.6% of total thickness of layers 1-5);
Layer 5: 50.04% LLDPE-1+24.84% MDPE-1+15.12% EVA-1+10.00% MB-2 (7.9% of total thickness of layers 1-5)

Example 55

A multilayer film in accordance with the present invention was made by the process described above for Inventive Example 4, and had the following twenty nine-layer structure with total film thickness of 1.00 mils:
Layer 1: 50.04% LLDPE-1+24.84% MDPE-1+15.12% EVA-1+10.00% MB-2 (7.9% of total thickness of layers 1-29)
Layer 2: 50.04% LLDPE-1+24.84% MDPE-1+15.12% EVA-1+10.00% MB-3 (14.6% of total thickness of layers 1-29);
Layers 3, 5, 7, 9, 11, 13, 15, 17, 19, 21, 23, 25, 27: LLDPE-1 (2.12% of total thickness of layers 1-29);
Layers 4, 6, 8, 10, 12, 14, 16, 18, 20, 22, 24, 26 50% LLDPE-1+50% Repro-1 (2.29% of total thickness of layers 1-29);
Layer 28: 50.04% LLDPE-1+24.84% MDPE-1+15.12% EVA-1+10.00% MB-3 (14.6% of total thickness of layers 1-29);
Layer 29: 50.04% LLDPE-1+24.84% MDPE-1+15.12% EVA-1+10.00% MB-2 (7.9% of total thickness of layers 1-29)

Example 56

A multilayer film in accordance with the present invention was made by the process described above for Inventive Example 4, and had the following twenty nine-layer structure with total film thickness of 1.00 mils:
Layer 1: 50.04% LLDPE-1+24.84% MDPE-1+15.12% EVA-1+10.00% MB-2 (7.9% of total thickness of layers 1-29);
Layer 2: 50.04% LLDPE-1+24.84% MDPE-1+15.12% EVA-1+10.00% MB-3 (14.6% of total thickness of layers 1-29);
Layers 3, 5, 7, 9, 11, 13, 15, 17, 19, 21, 23, 25, 27: LLDPE-1 (1.48% of total thickness of layers 1-29);
Layers 4, 6, 8, 10, 12, 14, 16, 18, 20, 22, 24, 26 60% LLDPE-1+40% MDPE-1 (2.98% of total thickness of layers 1-29);
Layer 28: 50.04% LLDPE-1+24.84% MDPE-1+15.12% EVA-1+10.00% MB-3 (14.6% of total thickness of layers 1-29);
Layer 29: 50.04% LLDPE-1+24.84% MDPE-1+15.12% EVA-1+10.00% MB-2 (7.9% of total thickness of layers 1-29)

Example 57

A multilayer film in accordance with the present invention was made by the process described above for Inventive Example 4, and had the following twenty nine-layer structure with total film thickness of 1.00 mils:
Layer 1: 50.04% LLDPE-1+24.84% MDPE-1+15.12% EVA-1+10.00% MB-2 (7.9% of total thickness of layers 1-29);
Layer 2: 50.04% LLDPE-1+24.84% MDPE-1+15.12% EVA-1+10.00% MB-3 (14.6% of total thickness of layers 1-29);
Layers 3, 5, 7, 9, 11, 13, 15, 17, 19, 21, 23, 25, 27: LLDPE-1 (2.12% of total thickness of layers 1-29);
Layers 4, 6, 8, 10, 12, 14, 16, 18, 20, 22, 24, 26 55.6% LLDPE-1+27.6% MDPE-1+16.8% EVA-1 (2.29% of total thickness of layers 1-29);
Layer 28: 50.04% LLDPE-1+24.84% MDPE-1+15.12% EVA-1+10.00% MB-3 (14.6% of total thickness of layers 1-29);
Layer 29: 50.04% LLDPE-1+24.84% MDPE-1+15.12% EVA-1+10.00% MB-2 (7.9% of total thickness of layers 1-29)

Example 58

Comparative

A multilayer film in accordance with the present invention was made by the process described above for Comparative Example 1, except that the film was oriented at a ratio of 4×4; the film had the following three-layer structure with a total film thickness of 2.00 mils:
Layer 1: 50.0% LLDPE-1+25.0% MDPE-1+17.0% EVA-1+8.0% MB-5 (17.5% of total thickness of layers 1-3);
Layer 2: LLDPE-1 (65.0% of total thickness of layers 1-3);
Layer 3: 50.0% LLDPE-1+25.0% MDPE-1+17.0% EVA-1+8.0% MB-5 (17.5% of total thickness of layers 1-3)

Example 59

Comparative

A multilayer film in accordance with the present invention was made by the process described above for Comparative Example 1, except that the film was oriented at a ratio of 3.5×3.5; the film had the following five-layer structure with total film thickness of 2.00 mils:
Layer 1: 50.0% LLDPE-1+40.0% EVA-1+10.0% MB-6 (20.0% of total thickness of layers 1-5);
Layer 2: 80% VLDPE-1+20% EVA-1 (25.0% of total thickness of layers 1-5);
Layer 3: SBS-2 (10.0% of total thickness of layers 1-5);
Layer 4: 80% VLDPE-1+20% EVA-1 (25.0% of total thickness of layers 1-5);
Layer 5: 50.0% LLDPE-1+40.0% EVA-1+10.0% MB-6 (20.0% of total thickness of layers 1-5)

Example 60

A multilayer film in accordance with the present invention was made by the process described above for Inventive Example 4, except that the film was oriented at a ratio of 4×4; the film had the following twenty nine-layer structure with total film thickness of 2.00 mils:
Layer 1: 50.04% LLDPE-1+24.84% MDPE-1+15.12% EVA-1+10.00% MB-2 (7.9% of total thickness of layers 1-29);
Layer 2: 50.04% LLDPE-1+24.84% MDPE-1+15.12% EVA-1+10.00% MB-3 (14.6% of total thickness of layers 1-29);
Layers 3, 5, 7, 9, 11, 13, 15, 17, 19, 21, 23, 25, 27: LLDPE-1 (2.12% of total thickness of layers 1-29);
Layers 4, 6, 8, 10, 12, 14, 16, 18, 20, 22, 24, 26 50% LLDPE-1+50% Repro-1 (2.29% of total thickness of layers 1-29);
Layer 28: 50.04% LLDPE-1+24.84% MDPE-1+15.12% EVA-1+10.00% MB-3 (14.6% of total thickness of layers 1-29);
Layer 29: 50.04% LLDPE-1+24.84% MDPE-1+15.12% EVA-1+10.00% MB-2 (7.9% of total thickness of layers 1-29)

Example 61

A multilayer film in accordance with the present invention was made by the process described above for Inventive Example 4, except that the film was oriented at a ratio of 4×4; the film had the following twenty nine-layer structure with total film thickness of 2.00 mils:
Layer 1: 50.04% LLDPE-1+24.84% MDPE-1+15.12% EVA-1+10.00% MB-2 (7.9% of total thickness of layers 1-29);
Layer 2: 50.04% LLDPE-1+24.84% MDPE-1+15.12% EVA-1+10.00% MB-3 (14.6% of total thickness of layers 1-29);
Layers 3, 5, 7, 9, 11, 13, 15, 17, 19, 21, 23, 25, 27: LLDPE-1 (1.48% of total thickness of layers 1-29);
Layers 4, 6, 8, 10, 12, 14, 16, 18, 20, 22, 24, 26 60% LLDPE-1+40% MDPE-1 (2.98% of total thickness of layers 1-29);
Layer 28: 50.04% LLDPE-1+24.84% MDPE-1+15.12% EVA-1+10.00% MB-3 (14.6% of total thickness of layers 1-29);
Layer 29: 50.04% LLDPE-1+24.84% MDPE-1+15.12% EVA-1+10.00% MB-2 (7.9% of total thickness of layers 1-29)

Example 62

A multilayer film in accordance with the present invention was made by the process described above for Inventive Example 4, except that the film was oriented at a ratio of 4×4; the film had the following twenty nine-layer structure with total film thickness of 2.00 mils:
Layer 1: 50.04% LLDPE-1+24.84% MDPE-1+15.12% EVA-1+10.00% MB-2 (7.9% of total thickness of layers 1-29);
Layer 2: 50.04% LLDPE-1+24.84% MDPE-1+15.12% EVA-1+10.00% MB-3 (14.6% of total thickness of layers 1-29);
Layers 3, 5, 7, 9, 11, 13, 15, 17, 19, 21, 23, 25, 27: LLDPE-1 (2.12% of total thickness of layers 1-29);
Layers 4, 6, 8, 10, 12, 14, 16, 18, 20, 22, 24, 26 55.6% LLDPE-1+27.6% MDPE-1+16.8% EVA-1 (2.29% of total thickness of layers 1-29);
Layer 28: 50.04% LLDPE-1+24.84% MDPE-1+15.12% EVA-1+10.00% MB-3 (14.6% of total thickness of layers 1-29);
Layer 29: 50.04% LLDPE-1+24.84% MDPE-1+15.12% EVA-1+10.00% MB-2 (7.9% of total thickness of layers 1-29)

Example 63

A multilayer film in accordance with the present invention was made by the process described above for Example 4, except stretch oriented as a bubble at an orientation ratio of 6×6 (TD×LD). The film had the following twenty nine-layer structure with total film thickness of 0.60 mils:
Layer 1: 47.8% LLDPE-1+23.7% MDPE-1+14.5% EVA-1+14% MB-2 (12.5% of total thickness of layers 1-29);
Layer 2: 47.8% LLDPE-1+23.7% MDPE-1+14.5% EVA-1+14% MB-3 (12.5% of total thickness of layers 1-29);
Layers 3, 5, 7, 9, 11, 13, 15, 17, 19, 21, 23, 25, 27: LLDPE-1 (1.92% of total thickness of layers 1-29);
Layers 4, 6, 8, 10, 12, 14, 16, 18, 20, 22, 24, 26 50% LLDPE-1+50% Repro-1 (2.08% of total thickness of layers 1-29);
Layer 28: 47.8% LLDPE-1+23.7% MDPE-1+14.5% EVA-1+14% MB-3 (12.5% of total thickness of layers 1-29);
Layer 29: 47.8% LLDPE-1+23.7% MDPE-1+14.5% EVA-1+14% MB-2 (12.5% of total thickness of layers 1-29)

Example 64

A multilayer film in accordance with the present invention was made by the process described above for Example 4, except stretch oriented as a bubble at an orientation ratio of 6×6 (TD×LD). The film had the following twenty nine-layer structure with total film thickness of 0.60 mils:
Layer 1: 47.8% LLDPE-1+23.7% MDPE-1+14.5% EVA-1+14% MB-2 (12.5% of total thickness of layers 1-29);
Layer 2: 47.8% LLDPE-1+23.7% MDPE-1+14.5% EVA-1+14% MB-3 (12.5% of total thickness of layers 1-29);
Layers 3, 5, 7, 9, 11, 13, 15, 17, 19, 21, 23, 25, 27: LLDPE-1 (1.92% of total thickness of layers 1-29);
Layers 4, 6, 8, 10, 12, 14, 16, 18, 20, 22, 24, 26 60% LLDPE-1+40% MDPE-1 (2.08% of total thickness of layers 1-29);
Layer 28: 47.8% LLDPE-1+23.7% MDPE-1+14.5% EVA-1+14% MB-3 (12.5% of total thickness of layers 1-29);
Layer 29: 47.8% LLDPE-1+23.7% MDPE-1+14.5% EVA-1+14% MB-2 (12.5% of total thickness of layers 1-29)

Example 65

A multilayer film in accordance with the present invention was made by the process described above for Example 4, except stretch oriented as a bubble at an orientation ratio of 6×6 (TD×LD). The film had the following twenty nine-layer structure with total film thickness of 0.59 mils:
Layer 1: 47.8% LLDPE-1+23.7% MDPE-1+14.5% EVA-1+14% MB-2 (12.5% of total thickness of layers 1-29);
Layer 2: 47.8% LLDPE-1+23.7% MDPE-1+14.5% EVA-1+14% MB-3 (12.5% of total thickness of layers 1-29);
Layers 3, 5, 7, 9, 11, 13, 15, 17, 19, 21, 23, 25, 27: LLDPE-1 (1.92% of total thickness of layers 1-29);
Layers 4, 6, 8, 10, 12, 14, 16, 18, 20, 22, 24, 26 55.6% LLDPE-1+27.6% MDPE-1+16.8% EVA-1 (2.08% of total thickness of layers 1-29);
Layer 28: 47.8% LLDPE-1+23.7% MDPE-1+14.5% EVA-1+14% MB-3 (12.5% of total thickness of layers 1-29);
Layer 29: 47.8% LLDPE-1+23.7% MDPE-1+14.5% EVA-1+14% MB-2 (12.5% of total thickness of layers 1-29)

Example 66

A multilayer film in accordance with the present invention was made by the process described above for Example 4, except stretch oriented as a bubble at an orientation ratio of 6×6 (TD×LD). The film had the following twenty nine-layer structure with total film thickness of 0.69 mils:
Layer 1: 47.8% LLDPE-1+23.7% MDPE-1+14.5% EVA-1+14% MB-2 (12.5% of total thickness of layers 1-29);
Layer 2: 47.8% LLDPE-1+23.7% MDPE-1+14.5% EVA-1+14% MB-3 (12.5% of total thickness of layers 1-29);
Layers 3, 5, 7, 9, 11, 13, 15, 17, 19, 21, 23, 25, 27: LLDPE-1 (1.92% of total thickness of layers 1-29);
Layers 4, 6, 8, 10, 12, 14, 16, 18, 20, 22, 24, 26 50% LLDPE-1+50% Repro-1 (2.08% of total thickness of layers 1-29);
Layer 28: 47.8% LLDPE-1+23.7% MDPE-1+14.5% EVA-1+14% MB-3 (12.5% of total thickness of layers 1-29);
Layer 29: 47.8% LLDPE-1+23.7% MDPE-1+14.5% EVA-1+14% MB-2 (12.5% of total thickness of layers 1-29)

Example 67

A multilayer film in accordance with the present invention was made by the process described above for Example 4, except stretch oriented as a bubble at an orientation ratio of 6×6 (TD×LD). The film had the following twenty nine-layer structure with total film thickness of 0.71 mils:
Layer 1: 47.8% LLDPE-1+23.7% MDPE-1+14.5% EVA-1+ 14% MB-2 (12.5% of total thickness of layers 1-29);
Layer 2: 47.8% LLDPE-1+23.7% MDPE-1+14.5% EVA-1+ 14% MB-3 (12.5% of total thickness of layers 1-29);
Layers 3, 5, 7, 9, 11, 13, 15, 17, 19, 21, 23, 25, 27: LLDPE-1 (1.92% of total thickness of layers 1-29);
Layers 4, 6, 8, 10, 12, 14, 16, 18, 20, 22, 24, 26 60% LLDPE-1+40% MDPE-1 (2.08% of total thickness of layers 1-29);
Layer 28: 47.8% LLDPE-1+23.7% MDPE-1+14.5% EVA-1+14% MB-3 (12.5% of total thickness of layers 1-29);
Layer 29: 47.8% LLDPE-1+23.7% MDPE-1+14.5% EVA-1+14% MB-2 (12.5% of total thickness of layers 1-29)

Example 68

A multilayer film in accordance with the present invention was made by the process described above for Example 4, except stretch oriented as a bubble at an orientation ratio of 6×6 (TD×LD). The film had the following twenty nine-layer structure with total film thickness of 0.76 mils:
Layer 1: 47.8% LLDPE-1+23.7% MDPE-1+14.5% EVA-1+ 14% MB-2 (12.5% of total thickness of layers 1-29);
Layer 2: 47.8% LLDPE-1+23.7% MDPE-1+14.5% EVA-1+ 14% MB-3 (12.5% of total thickness of layers 1-29);
Layers 3, 5, 7, 9, 11, 13, 15, 17, 19, 21, 23, 25, 27: LLDPE-1 (1.92% of total thickness of layers 1-29);
Layers 4, 6, 8, 10, 12, 14, 16, 18, 20, 22, 24, 26 55.6% LLDPE-1+27.6% MDPE-1+16.8% EVA-1 (2.08% of total thickness of layers 1-29);
Layer 28: 47.8% LLDPE-1+23.7% MDPE-1+14.5% EVA-1+14% MB-3 (12.5% of total thickness of layers 1-29);
Layer 29: 47.8% LLDPE-1+23.7% MDPE-1+14.5% EVA-1+14% MB-2 (12.5% of total thickness of layers 1-29)

Example 69

A multilayer film in accordance with the present invention was made by the process described above for Example 4, except stretch oriented as a bubble at an orientation ratio of 6×6 (TD×LD). The film had the following twenty nine-layer structure with total film thickness of 0.68 mils:
Layer 1: 47.8% LLDPE-1+23.7% MDPE-1+14.5% EVA-1+ 14% MB-2 (12.5% of total thickness of layers 1-29);
Layer 2: 47.8% LLDPE-1+23.7% MDPE-1+14.5% EVA-1+ 14% MB-3 (12.5% of total thickness of layers 1-29);
Layers 3, 5, 7, 9, 11, 13, 15, 17, 19, 21, 23, 25, 27: LLDPE-1 (1.92% of total thickness of layers 1-29);
Layers 4, 6, 8, 10, 12, 14, 16, 18, 20, 22, 24, 26 50% LLDPE-1+50% Repro-1 (2.08% of total thickness of layers 1-29);
Layer 28: 47.8% LLDPE-1+23.7% MDPE-1+14.5% EVA-1+14% MB-3 (12.5% of total thickness of layers 1-29);
Layer 29: 47.8% LLDPE-1+23.7% MDPE-1+14.5% EVA-1+14% MB-2 (12.5% of total thickness of layers 1-29)

Example 70

A multilayer film in accordance with the present invention was made by the process described above for Example 4, except stretch oriented as a bubble at an orientation ratio of 6×6 (TD×LD). The film had the following twenty nine-layer structure with total film thickness of 0.70 mils:
Layer 1: 47.8% LLDPE-1+23.7% MDPE-1+14.5% EVA-1+ 14% MB-2 (12.5% of total thickness of layers 1-29);
Layer 2: 47.8% LLDPE-1+23.7% MDPE-1+14.5% EVA-1+ 14% MB-3 (12.5% of total thickness of layers 1-29);
Layers 3, 5, 7, 9, 11, 13, 15, 17, 19, 21, 23, 25, 27: LLDPE-1 (1.92% of total thickness of layers 1-29);
Layers 4, 6, 8, 10, 12, 14, 16, 18, 20, 22, 24, 26 60% LLDPE-1+40% MDPE-1 (2.08% of total thickness of layers 1-29);
Layer 28: 47.8% LLDPE-1+23.7% MDPE-1+14.5% EVA-1+14% MB-3 (12.5% of total thickness of layers 1-29);
Layer 29: 47.8% LLDPE-1+23.7% MDPE-1+14.5% EVA-1+14% MB-2 (12.5% of total thickness of layers 1-29)

Example 71

A multilayer film in accordance with the present invention was made by the process described above for Example 4, except stretch oriented as a bubble at an orientation ratio of 6×6 (TD×LD). The film had the following twenty nine-layer structure with total film thickness of 0.66 mils:
Layer 1: 47.8% LLDPE-1+23.7% MDPE-1+14.5% EVA-1+ 14% MB-2 (12.5% of total thickness of layers 1-29);
Layer 2: 47.8% LLDPE-1+23.7% MDPE-1+14.5% EVA-1+ 14% MB-3 (12.5% of total thickness of layers 1-29);
Layers 3, 5, 7, 9, 11, 13, 15, 17, 19, 21, 23, 25, 27: LLDPE-1 (1.92% of total thickness of layers 1-29);
Layers 4, 6, 8, 10, 12, 14, 16, 18, 20, 22, 24, 26 55.6% LLDPE-1+27.6% MDPE-1+16.8% EVA-1 (2.08% of total thickness of layers 1-29);
Layer 28: 47.8% LLDPE-1+23.7% MDPE-1+14.5% EVA-1+14% MB-3 (12.5% of total thickness of layers 1-29);
Layer 29: 47.8% LLDPE-1+23.7% MDPE-1+14.5% EVA-1+14% MB-2 (12.5% of total thickness of layers 1-29)

Example 72

A multilayer film in accordance with the present invention was made by the process described above for Example 4, except that the film was as shown in FIG. 8, with a microlayer section on the outside of the blown tube and bulk layers on the inside of the tube. The blown tube was collapsed and welded together such that the inner bulk layers adhered to one another. The resultant shrink film had a microlayer section on both outer surfaces (skins) of the film, with five bulk layers in the center to form the core of the film, for a total of fifty-five (55) layers and a total film thickness of 1.06 mils.
Layer 1, 3, 5, 7, 9, 11, 13, 15, 17, 19, 21, 23, 25: 80.0% LLDPE-1+20.0% MB-2 (8.14% of total thickness of layers 1-55);
Layer 2, 4, 6, 8, 10, 12, 14, 16, 18, 20, 22, 24: LLDPE-1 (8.14% of total thickness of layers 1-55);
Layer 26: 80.0% LLDPE-1+20.0% MB-3 (5.45% of total thickness of layers 1-55);
Layer 27: LLDPE-1 (25.55% of total thickness of layers 1-55);
Layer 28: EVA-4 (5.45% of total thickness of layers 1-55);
Layer 29: LLDPE-1 (25.55% of total thickness of layers 1-55);
Layer 30: 80.0% LLDPE-1+20.0% MB-3 (5.45% of total thickness of layers 1-55);
Layer 32, 34, 36, 38, 40, 42, 44, 46, 48, 50, 52, 54: LLDPE-1 (8.14% of total thickness of layers 1-55);
Layer 31, 33, 35, 37, 39, 41, 43, 45, 47, 49, 51, 53, 55: 80.0% LLDPE-1+20.0% MB-2 (8.14% of total thickness of layers 1-55)

Example 73

Comparative

A multilayer film in accordance with the present invention was made by the process described above for Comparative Example 1, and had the following five-layer structure with total film thickness of 1.25 mils:
Layer 1: 50.04% LLDPE-1+24.84% MDPE-1+15.12% EVA-1+10.00% MB-2 (7.9% of total thickness of layers 1-5);
Layer 2: 50.04% LLDPE-1+24.84% MDPE-1+15.12% EVA-1+10.00% MB-3 (14.6% of total thickness of layers 1-5);
Layer 3: LLDPE-1 (55.0% of total thickness of layers 1-5);
Layer 4: 50.04% LLDPE-1+24.84% MDPE-1+15.12% EVA-1+10.00% MB-3 (14.6% of total thickness of layers 1-5);
Layer 5: 50.04% LLDPE-1+24.84% MDPE-1+15.12% EVA-1+10.00% MB-2 (7.9% of total thickness of layers 1-5)

Example 74

A multilayer film in accordance with the present invention was made by the process described above for Inventive Example 72, and had the following fifty five-layer structure with total film thickness of 1.20 mils:
Layer 1, 3, 5, 7, 9, 11, 13, 15, 17, 19, 21, 23, 25:
  80.0% LLDPE-1+20.0% MB-2 (8.1% of total thickness of layers 1-55);
Layer 2, 4, 6, 8, 10, 12, 14, 16, 18, 20, 22, 24:
  60% MDPE-1+40% EVA-1 (6.52% of total thickness of layers 1-55);
Layer 26: 80.0% LLDPE-1+20.0% MB-3 (6.52% of total thickness of layers 1-55);
Layer 27: LLDPE-1 (25.59% of total thickness of layers 1-55);
Layer 28: EVA-4 (6.52% of total thickness of layers 1-55);
Layer 29: LLDPE-1 (25.59% of total thickness of layers 1-55);
Layer 30: 80.0% LLDPE-1+20.0% MB-3 (6.52% of total thickness of layers 1-55);
Layer 32, 34, 36, 38, 40, 42, 44, 46, 48, 50, 52, 54:
  60% MDPE-1+40% EVA-1 (6.52% of total thickness of layers 1-55);
Layer 31, 33, 35, 37, 39, 41, 43, 45, 47, 49, 51, 53, 55:
  80.0% LLDPE-1+20.0% MB-2 (8.1% of total thickness of layers 1-55)

Example 75

A multilayer film in accordance with the present invention was made by the process described above for Inventive Example 72, and had the following fifty five-layer structure with total film thickness of 1.26 mils:
Layer 1, 3, 5, 7, 9, 11, 13, 15, 17, 19, 21, 23, 25:
  80.0% LLDPE-1+20.0% MB-2 (8.1% of total thickness of layers 1-55);
Layer 2, 4, 6, 8, 10, 12, 14, 16, 18, 20, 22, 24:
  LLDPE-1 (6.52% of total thickness of layers 1-55);
Layer 26: 80.0% LLDPE-1+20.0% MB-3 (6.52% of total thickness of layers 1-55);
Layer 27: LLDPE-1 (25.59% of total thickness of layers 1-55);
Layer 28: EVA-4 (6.52% of total thickness of layers 1-55);
Layer 29: LLDPE-1 (25.59% of total thickness of layers 1-55);
Layer 30: 80.0% LLDPE-1+20.0% MB-3 (6.52% of total thickness of layers 1-55);
Layer 32, 34, 36, 38, 40, 42, 44, 46, 48, 50, 52, 54:
  LLDPE-1 (6.52% of total thickness of layers 1-55);
Layer 31, 33, 35, 37, 39, 41, 43, 45, 47, 49, 51, 53, 55:
  80.0% LLDPE-1+20.0% MB-2 (8.1% of total thickness of layers 1-55)

Example 76

A multilayer film in accordance with the present invention was made by the process described above for Inventive Example 72, and had the following fifty five-layer structure with total film thickness of 1.34 mils:
Layer 1, 3, 5, 7, 9, 11, 13, 15, 17, 19, 21, 23, 25:
  80.0% LLDPE-1+20.0% MB-2 (8.1% of total thickness of layers 1-55);
Layer 2, 4, 6, 8, 10, 12, 14, 16, 18, 20, 22, 24:
  60.0% MDPE-1+40.0% EVA-1 (6.52% of total thickness of layers 1-55);
Layer 26: LLDPE-1 (6.52% of total thickness of layers 1-55);
Layer 27: LLDPE-1 (25.59% of total thickness of layers 1-55);
Layer 28: EVA-4 (6.52% of total thickness of layers 1-55);
Layer 29: LLDPE-1 (25.59% of total thickness of layers 1-55);
Layer 30: LLDPE-1 (6.52% of total thickness of layers 1-55);
Layer 32, 34, 36, 38, 40, 42, 44, 46, 48, 50, 52, 54:
  60.0% MDPE-1+40.0% EVA-1 (6.52% of total thickness of layers 1-55);
Layer 31, 33, 35, 37, 39, 41, 43, 45, 47, 49, 51, 53, 55:
  80.0% LLDPE-1+20.0% MB-2 (8.1% of total thickness of layers 1-55)

In the following Examples 77-81, the described films were attempted to be made in accordance with Example 4, except that processing problems prevented the films from being oriented.

Example 77

A multilayer film was coextruded through an annular 29-layer die, and had the following structure:
Layers 1: 47.8% LLDPE-1+23.7% MDPE-1+14.5% EVA-1+14% MB-2 (16.05% of total thickness of layers 1-29);
Layers 2: 47.8% LLDPE-1+23.7% MDPE-1+14.5% EVA-1+14% MB-3 (8.90% of total thickness of layers 1-29);
Layers 3, 6, 9, 12, 15, 18, 21, 24, 27:
  LLDPE-1 (2.78% of total thickness of layers 1-29)
Layers 4, 7, 10, 13, 16, 19, 22, 25:
  LLDPE-1 (1.56% of total thickness of layers 1-29)
Layers 5, 8, 11, 14, 17, 20, 23, 26:
  LLDPE-1 (1.56% of total thickness of layers 1-29)
Layers 28: 47.8% LLDPE-1+23.7% MDPE-1+14.5% EVA-1+14% MB-2 (8.90% of total thickness of layers 1-29);
Layers 29: 47.8% LLDPE-1+23.7% MDPE-1+14.5% EVA-1+14% MB-2 (16.05% of total thickness of layers 1-29)

Example 78

A multilayer film was coextruded through an annular 29-layer die, and had the following structure:
Layers 1: 47.8% LLDPE-1+23.7% MDPE-1+14.5% EVA-1+14% MB-2 (12.5% of total thickness of layers 1-29);
Layers 2: 47.8% LLDPE-1+23.7% MDPE-1+14.5% EVA-1+14% MB-3 (7.02% of total thickness of layers 1-29);

Layers 3, 6, 9, 12, 15, 18, 21, 24, 27:
  LLDPE-1 (2.78% of total thickness of layers 1-29)
Layers 4, 7, 10, 13, 16, 19, 22, 25:
  LLDPE-1 (1.56% of total thickness of layers 1-29)
Layers 5, 8, 11, 14, 17, 20, 23, 26:
  LLDPE-1 (1.56% of total thickness of layers 1-29)
Layers 28: 47.8% LLDPE-1+23.7% MDPE-1+14.5% EVA-1+14% MB-2 (19.3% of total thickness of layers 1-29);
Layers 29: 47.8% LLDPE-1+23.7% MDPE-1+14.5% EVA-1+14% MB-2 (12.5% of total thickness of layers 1-29)

Example 79

A multilayer film was coextruded through an annular 29-layer die, and had the following structure:
Layers 1: 43.03% LLDPE-1+21.36% MDPE-1+13.00% EVA-1+22.6% MB-2 (16.07% of total thickness of layers 1-29);
Layers 2: 47.8% LLDPE-1+23.7% MDPE-1+14.5% EVA-1+14% MB-3 (8.93% of total thickness of layers 1-29);
Layers 3, 6, 9, 12, 15, 18, 21, 24, 27:
  LLDPE-1 (2.78% of total thickness of layers 1-29)
Layers 4, 7, 10, 13, 16, 19, 22, 25:
  LLDPE-1 (1.56% of total thickness of layers 1-29)
Layers 5, 8, 11, 14, 17, 20, 23, 26:
  LLDPE-1 (1.56% of total thickness of layers 1-29)
Layers 28: 47.8% LLDPE-1+23.7% MDPE-1+14.5% EVA-1+14% MB-2 (8.93% of total thickness of layers 1-29);
Layers 29: 43.03% LLDPE-1+21.36% MDPE-1+13.00% EVA-1+22.6% MB-2 (16.07% of total thickness of layers 1-29)

Example 80

A multilayer film was coextruded through an annular 29-layer die, and had the following structure:
Layers 1: 43.03% LLDPE-1+21.36% MDPE-1+13.00% EVA-1+22.6% MB-2 (14.29% of total thickness of layers 1-29);
Layers 2: 43.03% LLDPE-1+21.36% MDPE-1+13.00% EVA-1+22.6% MB-2 (7.14% of total thickness of layers 1-29);
Layers 3, 6, 9, 12, 15, 18, 21, 24, 27:
  LLDPE-1 (2.78% of total thickness of layers 1-29)
Layers 4, 7, 10, 13, 16, 19, 22, 25:
  LLDPE-1 (1.56% of total thickness of layers 1-29)
Layers 5, 8, 11, 14, 17, 20, 23, 26:
  LLDPE-1 (1.56% of total thickness of layers 1-29)
Layers 28: 43.03% LLDPE-1+21.36% MDPE-1+13.00% EVA-1+22.6% MB-2 (14.29% of total thickness of layers 1-29);
Layers 29: 43.03% LLDPE-1+21.36% MDPE-1+13.00% EVA-1+22.6% MB-2 (14.29% of total thickness of layers 1-29)

Example 81

A multilayer film was coextruded through an annular 29-layer die, and had the following structure:
Layer 1, 3, 5, 7, 9, 11, 13, 15, 17, 19, 21, 23, 25:
  80.0% LLDPE-1+20.0% MB-2 (6.64% of total thickness of layers 1-55);
Layer 2, 4, 6, 8, 10, 12, 14, 16, 18, 20, 22, 24:
  60.0% MDPE-1+40.0% EVA-1 (8.30% of total thickness of layers 1-55);
Layer 26: LLDPE-1 (6.64% of total thickness of layers 1-55);
Layer 27: LLDPE-1 (25.23% of total thickness of layers 1-55);
Layer 28: EVA-4 (6.47% of total thickness of layers 1-29);
Layer 29: LLDPE-1 (25.23% of total thickness of layers 1-55);
Layer 30: LLDPE-1 (6.64% of total thickness of layers 1-55);
Layer 32, 34, 36, 38, 40, 42, 44, 46, 48, 50, 52, 54:
  60.0% MDPE-1+40.0% EVA-1 (8.30% of total thickness of layers 1-55);
Layer 31, 33, 35, 37, 39, 41, 43, 45, 47, 49, 51, 53, 55:
  80.0% LLDPE-1+20.0% MB-2 (6.64% of total thickness of layers 1-55)

TABLE 9

| Test | Examples | | | | | |
|---|---|---|---|---|---|---|
| | 3[3,4] | 38 | 39 | 40 | 41 | 42 |
| Resin in microlayer 1 | LLDPE-1 | LLDPE-1 | LLDPE-1 + Repro-1 | LLDPE-4 | LLDPE-2 | LLDPE-1 + Repro-2 |
| Resin(s) in microlayer 2 | | LLDPE-1 | LLDPE-1 + Repro-1 | LLDPE-4 | LLDPE-2 | LLDPE-1 + Repro-2 |
| Film Thickness (mils) | 0.6 | 0.6 | 0.6 | 0.6 | 0.6 | 0.6 |
| Tensile Strength at yield[1] (psi × 1000) | 17.8/18.9 | 20.3/18.7 | 20.4/19.5 | 19.7/20.7 | 17.9/16.8 | 16.4/14.9 |
| Tensile Elongation at yield[1] (%) | 86/120 | 140/120 | 115/110 | 94/78 | 120/130 | 110/100 |
| Elmendorf Tear[1] (g/mil) | 23.7/24.8 | 35.2/31.5 | 18.3/17.5 | 14.9/13.3 | 19.0/23.2 | 13.5/14.0 |
| Elmendorf Tear[1] (grams) | 14.2/15.0 | 22.7/20.2 | 11.0/10.6 | 8.4/7.7 | 12.6/15.5 | 8.5/8.9 |
| Young's Modulus[1] (psi × 1000) | 60.4/62.2 | 57.0/62.9 | 63.9/67.1 | 64.8/71.4 | 49.4/60.2 | 70.4/68.3 |
| Tear Resistance (Graves Tear)[1] (g/mil) | 492/478 | 530/509 | 505/490 | 602/595 | 429/485 | 449/495 |
| Tear Propagation (Trouser Tear)[1] (g/mil) | 6.5/8.7 | 10.1/8.9 | 8.0/7.9 | 16.1/18.4 | 9.3/13.9 | 7.8/10.4 |
| Instrumented Impact Strength[2] ($lb_f$) | 18.0 | 16.7 | 16.6 | 12.5 | 15.9 | 12.5 |
| Instrumented Impact Strength[2] ($lb_f$/mil) | 29.0 | 26.5 | 28.4 | 20.9 | 24.8 | 20.5 |

TABLE 9-continued

|  | Examples | | | | | |
|---|---|---|---|---|---|---|
| Test | 3[3,4] | 38 | 39 | 40 | 41 | 42 |
| Total Free Shrink measured at 200° F. | 29 | 30 | 31 | 33 | 34 | 27 |
| Clarity[2] (%) | 79.1 | 74.1 | 73.4 | 82.2 | 81.4 | 3.0 |
| Gloss[2] (%) | 88 | 81 | 85 | 88 | 90 | 63 |
| Haze[2] (%) | 3.0 | 4.9 | 3.6 | 3.3 | 2.7 | 11.9 |

[1]measured at 73° F. MD/TD
[2]measured at 73° F.
[3]Comparative example 3 was made using a standard annular plate die, e.g., as described in U.S. Pat. No. 5,076,776; the resin types indicated in the table reflect the resins used in the single, relatively thick core layer of these comparative films.
[4]Values are derived form an average of 6 samples.

TABLE 10

|  | Examples | | | | | | |
|---|---|---|---|---|---|---|---|
| Test | 43 | 44 | 45 | 46 | 47 | 48 | 49 |
| Resin in microlayer 1 | LLDPE-1 | LLDPE-1 | LLDPE-1 | LLDPE-1 | LLDPE-1 | LLDPE-1 | LLDPE-1 |
| Resin(s) in microlayer 2 | LLDPE-1 | LLDPE-1 | LLDPE-1 | LLDPE-1 | LLDPE-1 + Repro-1 | LLDPE-1 + MDPE-1 | LLDPE-1 + MDPE-1 + EVA-1 |
| Resin(s) in microlayer 3 | — | — | Repro-1 | LLDPE-1 + Repro-1 | LLDPE-1 + Repro-1 | — | — |
| Film Thickness (mils) | 0.6 | 0.6 | 0.6 | 0.6 | 0.6 | 0.6 | 0.6 |
| Tensile Strength at yield[1] (psi × 1000) | 17.5/14.3 | 20.8/25.1 | 20.8/19.1 | 20.5/19.2 | 19.7/18.3 | 19.5/16.7 | 17.4/15.4 |
| Tensile Elongation at yield[1] (%) | 150/180 | 95/62 | 130/97 | 130/120 | 130/110 | 120/120 | 120/130 |
| Elmendorf Tear[1] (g/mil) | 19.5/24.1 | 10.9/7.8 | 58.7/78.7 | 53.7/47.5 | 46.7/38.9 | 46.9/41.8 | 48.3/94.3 |
| Elmendorf Tear[1] (grams) | 13.3/17.0 | 6.0/4.4 | 40.9/52.5 | 35.8/32.2 | 30.6/25.6 | 30.1/26.6 | 32.3/66.2 |
| Young's Modulus[1] (psi × 1000) | 55.9/61.3 | 62.7/64.5 | 60.3/69.2 | 58.1/60.8 | 59.4/60.7 | 63.4/61.4 | 58.3/58.0 |
| Tear Resistance (Graves Tear)[1] (g/mil) | 530/615 | 398/326 | 571/530 | 612/462 | 602/599 | 446/426 | 357/432 |
| Tear Propagation (Trouser Tear)[1] (g/mil) | 16.5/30.9 | 7.0/4.9 | 7.9/9.9 | 9.2/9.5 | 9.3/9.1 | 6.7/8.3 | 6.5/7.4 |
| Instrumented Impact Strength[2] ($lb_f$) | 13.1 | 21.4 | 19.1 | 18.9 | 18.7 | 19.3 | 16.7 |
| Instrumented Impact Strength[2] ($lb_f$/mil) | 18.2 | 39.0 | 28.6 | 28.1 | 27.5 | 30.3 | 23.7 |
| Total Free Shrink measured at 200° F. | 30 | 26 | 33 | 33 | 33 | 27 | 31 |
| Clarity[2] (%) | 71.3 | 85.0 | 73.1 | 75 | 73.2 | 79.7 | 79.0 |
| Gloss[2] (%) | 75 | 91 | 84 | 85 | 82 | 83 | 83 |
| Haze[2] (%) | 5.4 | 2.7 | 4.4 | 4.2 | 4.4 | 3.9 | 3.9 |

[1]measured at 73° F. MD/TD
[2]measured at 73° F.

TABLE 11

|  | Examples | | | | | | |
|---|---|---|---|---|---|---|---|
| Test | 50[3] | 51 | 52[3] | 53 | 54[3] | 55 | 56 |
| Resin 1 in microlayer | LLDPE-1 | LLDPE-1 | LLDPE-1 | LLDPE-1 | LLDPE-1 | LLDPE-1 | LLDPE-1 |
| Resin 2 in microlayer |  | LLDPE-1 + Repro-1 |  | LLDPE-1 + Repro-1 |  | LLDPE-1 + Repro-1 | LLDPE-1 + MDPE-1 |
| Film Thickness (mils) | 0.52 | 0.5 | 0.75 | 0.75 | 1.0 | 1.0 | 1.0 |
| Tensile Strength at yield[1] (psi × 1000) | 18.0/18.3 | 19.9/20.3 | 18.2/18.9 | 19.3/20.0 | 18.7/18.8 | 18.1/16.3 | 17.9/16.7 |
| Tensile Elongation at yield[1] (%) | 75/100 | 120/91 | 91/120 | 110/110 | 140/140 | 140/140 | 160/160 |
| Elmendorf Tear[1] (g/mil) | 17.3/22.3 | 47.8/32.9 | 22.9/22.7 | 44.5/36.8 | 32.6/28.9 | 34.9/44.9 | 67.6/60.9 |
| Elmendorf Tear[1] (grams) | 9.3/11.8 | 29.4/19.7 | 16.7/16.7 | 38.8/32.3 | 35.9/31.9 | 39.2/51.5 | 97.1/85.3 |
| Young's Modulus[1] (psi × 1000) | 63.3/60.5 | 53.5/56.8 | 64.4/65.2 | 56.5/62.6 | 58.7/66.4 | 51.0/61.0 | 59.6/60.2 |
| Tear Resistance (Graves Tear)[1] (g/mil) | 335/450 | 297/296 | 376/421 | 407/375 | N/A | 337/417 | 460/522 |

TABLE 11-continued

| Test | Examples | | | | | | |
|---|---|---|---|---|---|---|---|
| | 50[3] | 51 | 52[3] | 53 | 54[3] | 55 | 56 |
| Tear Propagation (Trouser Tear)[1] (g/mil) | 5.2/7.5 | 5.8/4.3 | 6.3/8.2 | 7.5/5.8 | 9.7/9.7 | 8.5/13.2 | 10.4/9.3 |
| Instrumented Impact Strength[2] ($lb_f$) | 16.6 | 20.8 | 23.2 | 27.4 | 31.6 | 29.9 | 40.1 |
| Instrumented Impact Strength[2] ($lb_f$/mil) | 31.0 | 36.6 | 31.7 | 33.4 | 28.5 | 26.8 | 28.3 |
| Total Free Shrink measured at 200° F. | 31 | 36 | 31 | 33 | 29 | 29 | 30 |
| Clarity[2] (%) | 76.4 | 76.5 | 79.6 | 72.3 | 80.3 | 69.9 | 67.8 |
| Gloss[2] (%) | 87 | 87 | 90 | 84 | 86 | 78 | 74 |
| Haze[2] (%) | 3.9 | 3.5 | 3.0 | 4.5 | 2.6 | 4.9 | 5.1 |

[1]measured at 73° F. MD/TD
[2]measured at 73° F.
[3]Comparative examples 50, 52 and 54 were made using a standard annular plate die, e.g., as described in U.S. Pat. No. 5,076,776; the resin types indicated in the table reflect the resins used in the single, relatively thick core layer of these comparative films.

TABLE 12

| Test | Examples | | | | | | |
|---|---|---|---|---|---|---|---|
| | 57 | 58[3] | 59[3] | 60 | 61 | 62 | 63[4] |
| Resin 1 in microlayer | LLDPE-1 | LLDPE-1 | SBS-1 | LLDPE-1 | LLDPE-1 | LLDPE-1 | LLDPE-1 |
| Resin 2 in microlayer | LLDPE-1 + MDPE-1 + EVA-1 | | | LLDPE-1 + Repro-1 | LLDPE-1 + MDPE-1 | LLDPE-1 + MDPE-1 + EVA-1 | LLDPE-1 + Repro-1 |
| Film Thickness (mils) | 1.0 | 2.0 | 2.0 | 2.0 | 2.0 | 2.0 | 0.6 |
| Tensile Strength at yield[1] (psi × 1000) | 17.3/16.2 | 15.1/13.7 | 11.1/14.3 | 14.0/15.9 | 14.9/15.4 | 13.0/14.0 | 20.1/20.7 |
| Tensile Elongation at yield[1] (%) | 140/130 | 160/190 | 200/190 | 200/170 | 210/190 | 180/200 | 83/91 |
| Elmendorf Tear[1] (g/mil) | 48.5/48.7 | 29.2/40.4 | 62.9/40.6 | 59.8/68.9 | 84.8/70.1 | 71.2/90.9 | 9.8/13.6 |
| Elmendorf Tear[1] (grams) | 59.9/59.0 | 63.6/88.5 | 124.6/80.1 | 114.3/131.3 | 155.0/127.2 | 129.2/159.3 | 5.6/7.8 |
| Young's Modulus[1] (psi × 1000) | 52.5/60.5 | 55.4/56.8 | 36.3/36.9 | 49.5/55.4 | 58.5/57.1 | 53.4/53.0 | 67.4/71.6 |
| Tear Resistance (Graves Tear)[1] (g/mil) | 456/485 | — | 350/388 | 469/437 | 498/439 | 494/472 | 350/404 |
| Tear Propagation (Trouser Tear)[1] (g/mil) | 9.8/11.5 | — | 17.9/16.8 | 21.0/16.0 | 36.3/34.2 | 21.5/18.0 | 8.98/9.99 |
| Instrumented Impact Strength[2] ($lb_f$) | 32.8 | 46.0 | 35.5 | 37.5 | 40.5 | 37.3 | 20.7 |
| Instrumented Impact Strength[2] ($lb_f$/mil) | 26.0 | 21.2 | 17.5 | 19.8 | 22.3 | 19.2 | 31.8 |
| Total Free Shrink measured at 200° F. | 29 | 28 | 51 | 28 | 28 | 29 | 26 |
| Clarity[2] (%) | 75.7 | 61.6 | 67.7 | 60.5 | 65.7 | 64.0 | 79.5 |
| Gloss[2] (%) | 79 | 84 | 88 | 73 | 72 | 68 | 90 |
| Haze[2] (%) | 3.8 | 5.1 | 3.5 | 5.7 | 5.5 | 6.7 | 3.14 |

[1]measured at 73° F. MD/TD
[2]measured at 73° F.
[3]Comparative examples 58 and 59 were made using a standard annular plate die, e.g., as described in U.S. Pat. No. 5,076,776; the resin types indicated in the table reflect the resins used in the single, relatively thick core layer of these comparative films.
[4]Orientation ratio = 6 × 6

TABLE 13

| Test | Examples | | | | | | |
|---|---|---|---|---|---|---|---|
| | 64[3] | 65[3] | 66[3] | 67[3] | 68[3] | 69[3] | 70[3] |
| Resin 1 in microlayer | LLDPE-1 | LLDPE-1 | LLDPE-1 | LLDPE-1 | LLDPE-1 | LLDPE-1 | LLDPE-1 |
| Resin 2 in microlayer | LLDPE-1 + MDPE-1 | LLDPE-1 + MDPE-1 + EVA-1 | LLDPE-1 + Repro-1 | LLDPE-1 + MDPE-1 | LLDPE-1 + MDPE-1 + EVA-1 | LLDPE-1 + Repro-1 | LLDPE-1 + MDPE-1 |
| Film Thickness (mils) | 0.6 | 0.59 | 0.69 | 0.71 | 0.76 | 0.68 | 0.7 |
| Tensile Strength at yield[1] (psi × 1000) | 20.2/22.4 | 20.4/22.6 | 21.2/20.5 | 21.6/18.3 | 21.8/20.6 | 18.8/22.0 | 22.2/23.2 |
| Tensile Elongation at yield[1] (%) | 89/90 | 90/88 | 94/99 | 96/120 | 97/110 | 98/85 | 110/96 |

TABLE 13-continued

| Test | Examples | | | | | | |
|---|---|---|---|---|---|---|---|
| | 64[3] | 65[3] | 66[3] | 67[3] | 68[3] | 69[3] | 70[3] |
| Elmendorf Tear[1] (g/mil) | 16.2/18.9 | 13.9/18.4 | 11.9/15.4 | 17.1/24.2 | 19.8/18.7 | 15.4/11.8 | 16.2/17.9 |
| Elmendorf Tear[1] (grams) | 10.1/11.6 | 7.9/10.4 | 8.3/10.3 | 12.9/19.2 | 14.2/13.3 | 11.2/8.3 | 12.1/13.7 |
| Young's Modulus[1] (psi × 1000) | 63.5/72.5 | 66.9/74.9 | 66.0/71.6 | 64.1/64.3 | 66.3/68.3 | 67.9/76.6 | 68.3/78.6 |
| Tear Resistance (Graves Tear)[1] (g/mil) | 442/288 | 427/413 | 401/407 | 515/437 | 428/469 | 357/380 | 460/404 |
| Tear Propagation (Trouser Tear)[1] (g/mil) | 9.52/9.09 | 8.45/9.01 | 6.9/6.5 | 7.1/6.4 | 6.3/8.8 | 9.94/10.19 | 8.98/11.23 |
| Instrumented Impact Strength[2] ($lb_f$) | 19.1 | 21.2 | 23.6 | 25.2 | 23.8 | 21.9 | 25.6 |
| Instrumented Impact Strength[2] ($lb_f$/mil) | 32.2 | 36.3 | 35.6 | 33.2 | 34.1 | 32.3 | 34.4 |
| Total Free Shrink measured at 200° F. | 26 | 25 | 36 | 33 | 41 | 26 | 25 |
| Clarity[2] (%) | 84.2 | 80.8 | 78.6 | 81.7 | 82.8 | 78.8 | 80.5 |
| Gloss[2] (%) | 91 | 90 | 86.9 | 85.6 | 88.2 | 90 | 89 |
| Haze[2] (%) | 2.83 | 3.07 | 3.35 | 3.26 | 3.23 | 3.37 | 3.72 |

[1] measured at 73° F. MD/TD
[2] measured at 73° F.
[3] Orientation ratio = 6 × 6

TABLE 14

| Test | Examples | | | | | |
|---|---|---|---|---|---|---|
| | 71[4] | 72[5] | 73[3] | 74[5] | 75[5] | 76[5] |
| Resin 1 in microlayer | LLDPE-1 | LLDPE-1 + MB-2 | LLDPE-1 | LLDPE-1 + MB-2 | LLDPE-1 + MB-2 | LLDPE-1 + MB-2 |
| Resin 2 in microlayer | LLDPE-1 + MDPE-1 + EVA-1 | LLDPE-1 | | MDPE-1 + EVA-1 | LLDPE-1 | MDPE-1 + EVA-1 |
| Film Thickness (mils) | 0.66 | 1.06 | 1.25 | 1.20 | 1.26 | 1.34 |
| Tensile Strength at yield[1] (psi × 1000) | 18.7/23.6 | 16.9/15.2 | 15.3/17.9 | 13.6/12.6 | 16.8/17.1 | 18.9/17.2 |
| Tensile Elongation at yield[1] (%) | 93/87 | 100/120 | 190/170 | 130/130 | 110/120 | 120/120 |
| Elmendorf Tear[1] (g/mil) | 14.1/15.3 | 50.8/59.9 | 52.0/42.4 | 26.9/31.3 | 31.7/57.2 | 36.7/25.0 |
| Elmendorf Tear[1] (grams) | 9.6/11.0 | 52.1/66.9 | 79.4/64.8 | 32.7/42.0 | 37.3/74.6 | 46.7/34.9 |
| Young's Modulus[1] (psi × 1000) | 69.3/83.4 | 44.3/44.2 | 48.3/59.0 | 43.7/46.0 | 44.2/46.4 | 46.4/45.1 |
| Tear Resistance (Graves Tear)[1] (g/mil) | 361/403 | 293/281 | 481/429 | 388/360 | 345/365 | 361/316 |
| Tear Propagation (Trouser Tear)[1] (g/mil) | 9.28/10.36 | 5.17/6.49 | 9.8/12.3 | 8.83/8.28 | 6.19/6.56 | 5.88/6.03 |
| Instrumented Impact Strength[2] ($lb_f$) | 22.5 | 34.0 | 36.2 | 21.3 | 40.4 | 41.2 |
| Instrumented Impact Strength[2] ($lb_f$/mil) | 32.7 | 32.0 | 23.5 | 17.5 | 32.1 | 32.3 |
| Total Free Shrink measured at 200° F. | 28 | 38 | 29 | 30 | 34 | 35 |
| Clarity[2] (%) | 82.3 | 22.9 | 76.9 | 56.1 | 30 | 52.4 |
| Gloss[2] (%) | 91 | 81.0 | 80.0 | 75.0 | 90 | 94 |
| Haze[2] (%) | 3.32 | 6.40 | 4.20 | 6.90 | 5.9 | 6.1 |

[1] measured at 73° F. MD/TD
[2] measured at 73° F.
[3] Comparative examples 73 was made using a standard annular plate die, e.g., as described in U.S. Pat. No. 5,076,776; the resin types indicated in the table reflect the resins used in the single, relatively thick core layer of these comparative films.
[4] Orientation ratio = 6 × 6
[5] Microlayers are placed on the outside While the invention has been described with reference to illustrative examples, those skilled in the art will understand that various modifications may be made to the invention as described without departing from the scope of the claims which follow.

What is claimed is:

1. A multilayer, heat-shrinkable film, comprising:
   a. a bulk layer; and
   b. a microlayer section comprising at least ten microlayers, each of said microlayers having a thickness ranging from about 0.001 to 0.015 mil, wherein: each of said microlayers and said bulk layer have a thickness, the ratio of the thickness of any of said microlayers to the thickness of said bulk layer being at least 1:2; said film is stretch-oriented at a ratio of at least 4 in at least one direction along a length or width dimension of said film; and said film has a total free shrink (ASTM D2732-03) of at least about 10% at 200° F.; and said heat-shrinkable film has an Elmendorf Tear value (ASTM D1922-06a) of at least about 30 grams/mil, as measured in at least one direction along a length or width dimension of said film.

2. The film of claim 1, wherein said film is stretch-oriented at a ratio of at least 5 in at least one direction along a length or width dimension of said film.

3. The film of claim 1, wherein, said film has a thickness of less than about 0.7 mil.

4. The heat-shrinkable film of claim 1, wherein at least one of said microlayers comprises recycled polymer.

5. The film of claim 1, wherein said microlayer section comprises a repeating sequence of layers represented by the structure:

A/B, wherein,
   A represents a microlayer comprising one or more polymers,
   B represents a microlayer comprising a blend of two or more polymers, and
   A has a composition that is different from that of B.

6. The film of claim 3, wherein said film has an Elmendorf Tear value (ASTM D1922-06a) of at least 10 grams, as measured in at least one direction along a length or width dimension of said film.

7. The heat-shrinkable film of claim 4, wherein said microlayer section comprises between 1 and 50 weight percent recycled polymer, based on the total weight of the film.

8. The film of claim 5, wherein A and B comprise one or more of ethylene/alpha-olefin copolymer, ethylene/vinyl acetate copolymer, polypropylene homopolymer or copolymer, ethylene/methacrylic acid copolymer, maleic-anhydride-grafted polyethylene, polyamide, or low density polyethylene.

9. The heat-shrinkable film of claim 5, wherein B comprises between 1 and 50 weight percent recycled polymer, based on the total weight of the film.

* * * * *